(12) United States Patent
Ogura et al.

(10) Patent No.: US 8,263,714 B2
(45) Date of Patent: Sep. 11, 2012

(54) EPOXY RESIN COMPOSITION, CURED ARTICLE THEREOF, SEMICONDUCTOR SEALING MATERIAL, NOVEL PHENOL RESIN, NOVEL EPOXY RESIN, METHOD FOR PRODUCING NOVEL PHENOL RESIN, AND METHOD FOR PRODUCING NOVEL EPOXY RESIN

(75) Inventors: Ichiro Ogura, Ichihara (JP); Yoshiyuki Takahashi, Ichihara (JP); Kazuo Arita, Ichihara (JP); Kunihiro Morinaga, Ichihara (JP); Yutaka Satou, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 13/157,926

(22) Filed: Jun. 10, 2011

(65) Prior Publication Data

US 2011/0275739 A1 Nov. 10, 2011

Related U.S. Application Data

(62) Division of application No. 11/661,095, filed as application No. PCT/JP2005/015867 on Aug. 31, 2005, now Pat. No. 7,985,822.

(30) Foreign Application Priority Data

Sep. 1, 2004 (JP) ................................. 2004-254144
Sep. 1, 2004 (JP) ................................. 2004-254145

(51) Int. Cl.
*C08L 63/00* (2006.01)
*C08L 61/06* (2006.01)
*C08G 59/00* (2006.01)
*C08G 8/04* (2006.01)
*C08G 14/02* (2006.01)
*C08G 65/38* (2006.01)

(52) U.S. Cl. .......... 525/396; 525/507; 525/523; 528/87; 528/96; 528/97; 528/98; 528/129; 528/212

(58) Field of Classification Search ...................... 528/98
See application file for complete search history.

(56) References Cited

U.S. PATENT DOCUMENTS 3,787,451 A 1/1974 Mah
(Continued)

FOREIGN PATENT DOCUMENTS

JP 4-277518 A 10/1992
(Continued)

OTHER PUBLICATIONS

English machine translation of JP 2004-010700 A, Taihichi et al, Jan. 15, 2004.*

(Continued)

*Primary Examiner* — Mark Eashoo
*Assistant Examiner* — David Karst
(74) *Attorney, Agent, or Firm* — Westerman, Hattori, Daniels & Adrian, LLP

(57) ABSTRACT

An epoxy resin composition including an epoxy resin and a curing agent as essential components, in which the curing agent comprises a phenol resin which has each structural moiety of a phenolic hydroxyl group-containing aromatic hydrocarbon group (P), an alkoxy group-containing aromatic hydrocarbon group (B) and a divalent aralkyl group (X), and also has, in a molecular structure, a structure in which the phenolic hydroxyl group-containing aromatic hydrocarbon group (P) and the alkoxy group-containing aromatic hydrocarbon group (B) are bonded with the other phenolic hydroxyl group-containing aromatic hydrocarbon group (P) or alkoxy group-containing aromatic hydrocarbon group (B) via the divalent aralkyl group (X).

6 Claims, 38 Drawing Sheets

U.S. PATENT DOCUMENTS

| | | | |
|---|---|---|---|
| 4,464,521 | A | 8/1984 | Gruber |
| 5,597,876 | A | 1/1997 | Murata et al. |
| 5,677,397 | A | 10/1997 | Nakamura et al. |
| 6,117,536 | A | 9/2000 | Poutasse |
| 6,660,811 | B2 * | 12/2003 | Ogura et al. ............ 525/523 |
| 6,784,228 | B2 | 8/2004 | Ogura et al. |
| 2002/0156189 | A1 | 10/2002 | Ogura et al. |
| 2004/0265596 | A1 | 12/2004 | Maeda |

FOREIGN PATENT DOCUMENTS

| | | |
|---|---|---|
| JP | 8-301980 A | 11/1996 |
| JP | 11-140167 A | 5/1999 |
| JP | 2000-212238 A | 8/2000 |
| JP | 2001-064340 A | 3/2001 |
| JP | 2003-201333 A | 7/2003 |
| JP | 2004-10700 A | 1/2004 |

OTHER PUBLICATIONS

International Search Report of PCT/JP2005/015867, dated Nov. 8, 2005.

Supplementary European Search Report dated Apr. 6, 2009, issued in European Patent Application No. 05776808.7.

International Search Report of PCT/JP2006/303902, dated Apr. 18, 2006.

Supplementary European Search Report dated Apr. 6, 2009, issued in European Patent Application No. 06715019.3.

Non-Final Office Action dated Mar. 8, 2010, issued in related U.S. Appl. No. 11/817,535.

U.S. Office Action dated May 3, 2012, issued in U.S. Appl. No. 12/634,259.

* cited by examiner

EPOXY RESIN COMPOSITION, CURED ARTICLE THEREOF, SEMICONDUCTOR SEALING MATERIAL, NOVEL PHENOL RESIN, NOVEL EPOXY RESIN, METHOD FOR PRODUCING NOVEL PHENOL RESIN, AND METHOD FOR PRODUCING NOVEL EPOXY RESIN

CROSS-REFERENCE TO RELATED APPLICATIONS

This Application is a Division of application Ser. No. 11/661,095 filed on Jan. 30, 2008, which is a national stage of international application no. PCT/JP2005/015867 filed on Aug. 31, 2005. Application Ser. No. 11/661,095 claims priority for Application 2004-254145 filed on Sep. 1, 2004 in Japan, and priority for Application 2004-254144 filed on Sep. 1, 2004 in Japan.

TECHNICAL FIELD

The present invention relates to an epoxy resin composition which is excellent in heat resistance and dielectric characteristics of the resulting cured article as well as curability during the curing reaction and also can be preferably used for semiconductor sealing materials, printed circuit boards, coating materials and castings, and to a cured article thereof, a novel phenol resin and a method for producing the same, and a novel epoxy resin and a method for producing the same.

BACKGROUND ART

An epoxy resin composition comprising an epoxy resin and a curing agent as essential components is excellent in various physical properties such as high heat resistance, constitutional and low viscosity and is therefore widely used for electronic and electrical components such as semiconductor sealing material and printed circuit board, conductive adhesives such as conductive paste, adhesives, matrixes for composite material, coating materials, photoresist materials and color developing materials.

In various uses, particularly advanced materials, further improvement in performances such as high heat resistance and high moisture resistance has recently been required. In the field of semiconductor sealing materials, surface mounting packages such as BGA and CSP are developed and also a reflow treatment temperature increases due to the use of a lead-free solder, and thus electronic component sealing resin materials having excellent resistance to moisture and soldering have been required furthermore.

As a technique for producing the electronic component sealing resin material which meets these required characteristics, for example, there is known a technique in which a methoxy group-containing phenol resin obtained by methoxylating a phenolic hydroxyl group in a resol resin and converting the resulting methoxylated resol resin into a novolak resin in the presence of an acid catalyst is used as a curing agent for epoxy resin, thereby to improve fluidity and to impart moderate pliability to a cured article, and thus improving moisture resistance and impact resistance of the cured article itself (see, for example, Japanese Unexamined Patent Application, First Publication No. 2004-10700).

However, such a curing agent for epoxy resin is inferior in reactivity during the curing reaction because the number of functional groups per molecule decreases.

It is of urgent necessity for a high frequency device to enable high frequency operation in the field of electronic components, and therefore electronic component-related materials such as semiconductor sealing material have low dielectric constant and materials having low dielectric dissipation factor, which have never been obtained, have recently been required. Main factor for an increase in a dielectric constant and a dielectric dissipation factor in an epoxy resin cured article is a secondary hydroxyl group, which appears during the curing reaction, and therefore lower concentration of a functional group serving as a crosslinking point is more advantageous for dielectric characteristics. In this respect, although the hydroxyl group concentration of the curing agent for epoxy resin is decreased, there has never been realized recent required level of low dielectric constant and low dielectric dissipation factor.

As a technique for producing an epoxy resin which exhibits excellent heat resistance, for example, there has been known a technique in which an aromatic compound such as anthracene as an epoxy resin used for a composite material matrix is reacted with an excess crosslinking agent such as p-xylene glycol to obtain a reaction intermediate and the resulting reaction intermediate is reacted with a phenol compound to obtain a phenol resin in which an aralkyl structure and an aromatic compound are alternately arranged, and then the resulting phenol resin is epoxidated by reacting with epichlorohydrin and used (see, for example, Japanese Unexamined Patent Application, First Publication No. Hei 8-301980).

Such an epoxy resin certainly exhibits excellent heat resistance because of high content of an aromatic structure moiety in a polymer structure. However, when the epoxy resin is used as an electronic component sealing material, there has never been realized required level of low dielectric constant and low dielectric dissipation factor. It is considered to further decrease the concentration of a functional group by further introducing an aromatic structure into the polymer chain of the epoxy resin so as to decrease the dielectric constant and dielectric dissipation factor in the epoxy resin. However, it becomes impossible to avoid drastic deterioration of curability as a result of drastic decrease in concentration of the functional group.

As described above, in the field of the electronic component-related material, there has never been obtained an epoxy resin composition having dielectric characteristics capable of coping with recent high frequency operation without causing curing hindrance.

DISCLOSURE OF INVENTION

It is therefore an object of the present invention to provide an epoxy resin composition capable of realizing low dielectric constant and low dielectric dissipation factor suited for a recent high frequency type electronic component-related material without deteriorating curability during the curing reaction, and a cured article thereof, as well as a novel epoxy resin and a novel phenol resin which give these performances, and a method for producing these resins.

The present inventors have intensively studied so as to attain the above object and found that very low dielectric constant and dielectric dissipation factor can be realized while exhibiting good curability by introducing an aralkyl structural unit and an alkoxy group-substituted aromatic structural unit into the molecular skeleton of the epoxy resin or phenol resin so as to form a predetermined bond by these units. Thus, the present invention has been completed.

The present invention is directed to an epoxy resin composition comprising an epoxy resin and a curing agent as essential components, wherein the curing agent comprises a phenol resin which has each structural moiety of a phenolic hydroxyl group-containing aromatic hydrocarbon group (P), an alkoxy group-containing aromatic hydrocarbon group (B) and a divalent aralkyl group (X), and also has, in a molecular structure, a structure in which the phenolic hydroxyl group-containing aromatic hydrocarbon group (P) and the alkoxy group-containing aromatic hydrocarbon group (B) are bonded with the other phenolic hydroxyl group-containing aromatic hydrocarbon group (P) or alkoxy group-containing aromatic hydrocarbon group (B) via the divalent aralkyl group (X) (this epoxy resin composition is abbreviated to an "epoxy resin composition (I)" hereinafter).

Furthermore, the present invention is directed to an epoxy resin cured article obtained by the curing reaction of the epoxy resin composition (I).

Furthermore, the present invention is directed to a novel phenol resin having each structural moiety of a phenolic hydroxyl group-containing aromatic hydrocarbon group (P), an alkoxy group-containing aromatic hydrocarbon group (B) and a divalent aralkyl group (X), and also having, in a molecular structure, a structure in which the phenolic hydroxyl group-containing aromatic hydrocarbon group (P) and the alkoxy group-containing aromatic hydrocarbon group (B) are bonded with the other phenolic hydroxyl group-containing aromatic hydrocarbon group (P) or alkoxy group-containing aromatic hydrocarbon group (B) via the divalent aralkyl group (X), wherein a melt viscosity at 150° C. as measured by an ICI viscometer is from 0.3 to 5.0 dPa·s and a hydroxyl group equivalent is from 150 to 500 g/eq.

Furthermore, the present invention is directed to an epoxy resin composition comprising an epoxy resin and a curing agent as essential components, wherein the epoxy resin has each structure of a glycidyloxy group-containing aromatic hydrocarbon group (E), an alkoxy group-containing aromatic hydrocarbon group (B) and a divalent aralkyl group (X), and also has, in a molecular structure, a structure in which the glycidyloxy group-containing aromatic hydrocarbon group (E) and the alkoxy group-containing aromatic hydrocarbon group (B) are bonded to the other glycidyloxy group-containing aromatic hydrocarbon group (E) or alkoxy group-containing aromatic hydrocarbon group (B) via the divalent aralkyl group (X) (this epoxy resin composition is abbreviated to an "epoxy resin composition (II)" hereinafter).

Furthermore, the present invention is directed to a novel epoxy resin having each structure of a gycidyloxy group-containing aromatic hydrocarbon group (E), an alkoxy group-containing aromatic hydrocarbon group (B), and a divalent aralkyl group (X), and also having, in a molecular structure, a structure in which the glycidyloxy group-containing aromatic hydrocarbon group (E) and the alkoxy group-containing aromatic hydrocarbon group (B) are bonded to the other glycidyloxy group-containing aromatic hydrocarbon group (E) or alkoxy group-containing aromatic hydrocarbon group (B) via the divalent aralkyl group (X), wherein a melt viscosity at 150° C. as measured by an ICI viscometer is from 0.3 to 5.0 dPa·s and an epoxy group equivalent is from 200 to 700 g/eq.

Furthermore, the present invention is directed to a semiconductor sealing material comprising the epoxy resin composition (I) or (II), the epoxy resin composition (I) or (II) further comprising 70 to 95% by mass of an inorganic filler, in addition to the epoxy resin and the curing agent.

Furthermore, the present invention is directed to a method for producing a novel phenol resin, which comprises reacting a hydroxy group-containing aromatic compound (a1), an alkoxy group-containing aromatic compound (a2), and a compound (a3) having the following structural formula (a3-a), (a3-b) or (a3-c):

[Chemical Formula 1]

$$XCH_2-Ar-CH_2X \qquad (a3\text{-}a)$$

$$R_2OCH_2-Ar-CH_2OR_2 \qquad (a3\text{-}b)$$

$$H_2C=CH-Ar-CH=CH_2 \qquad (a3\text{-}c)$$

wherein, in the formula (a3-b), $R_2$ represents a hydrogen atom or a hydrocarbon group having 1 to 6 carbon atoms in a single stage.

Furthermore, the present invention is directed to a method for producing a novel epoxy resin, which comprises reacting the novel phenol resin obtained by the above method with epichlorohydrin.

According to the present invention, there can be provided an epoxy resin composition capable of realizing low dielectric constant and low dielectric dissipation factor suited for a recent high frequency type electronic component-related material without deteriorating curability during the curing reaction, and a cured article thereof, as well as a novel epoxy resin and a novel phenol resin which give these performances, and a method capable of industrially producing these resins in a simple manner.

BEST MODE FOR CARRYING OUT THE INVENTION

Figure 1:
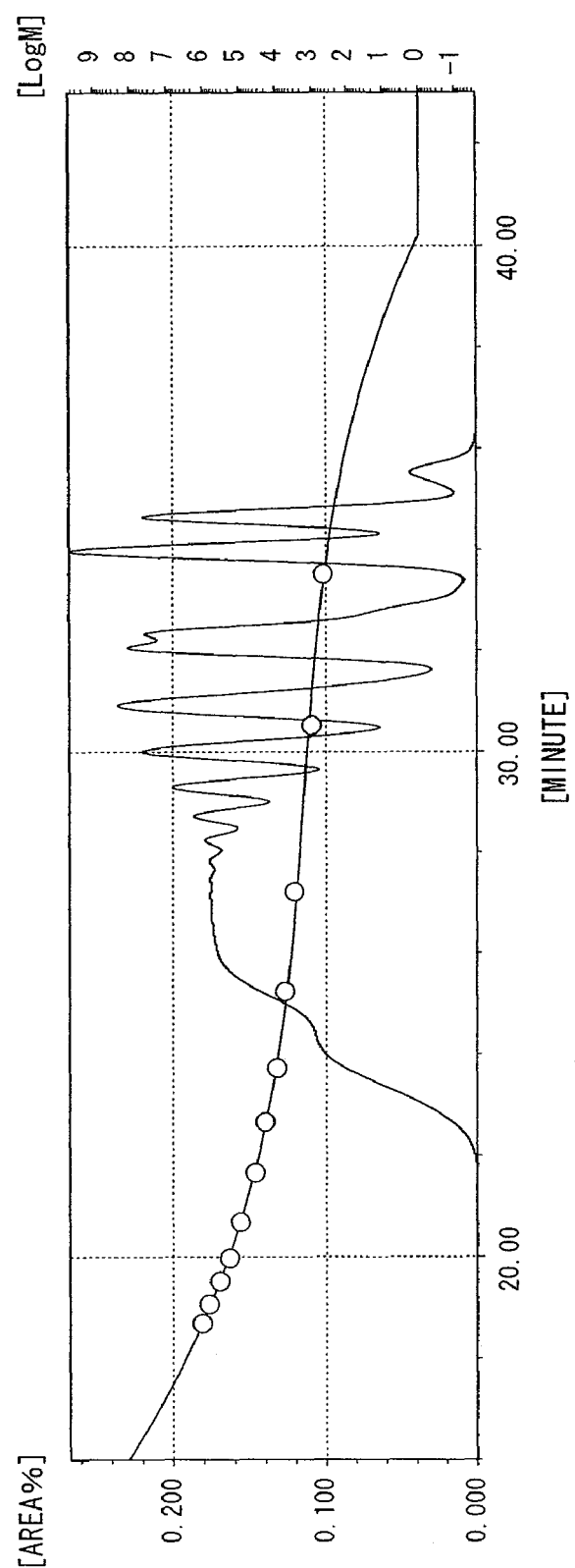
FIG. 1 is a graph showing a GPC chart of a phenol resin obtained in Example 1.

The present invention will now be described in detail.

First, the epoxy resin composition (I) of the present invention comprises an epoxy resin and a curing agent as essential components, wherein the curing agent comprises a phenol resin which has each structural moiety of a phenolic hydroxyl group-containing aromatic hydrocarbon group (P), an alkoxy group-containing aromatic hydrocarbon group (B) and a divalent aralkyl group (X), and also has, in a molecular structure, a structure in which the phenolic hydroxyl group-containing aromatic hydrocarbon group (P) and the alkoxy group-containing aromatic hydrocarbon group (B) are bonded with the other phenolic hydroxyl group-containing aromatic hydrocarbon group (P) or alkoxy-containing aromatic hydrocarbon group (B) via the divalent aralkyl group (X).

That is, when structural units of the phenolic hydroxyl group-containing aromatic hydrocarbon group (P), the alkoxy group-containing aromatic hydrocarbon group (B) and the divalent aralkyl group (X) are represented by "P", "B" and "X", respectively, the phenol resin essentially has, in a molecular structure, a structural moiety A1 or structural moieties A2 and A3 among the following structural moieties A1 to A3.

[Chemical Formula 2]

—P—X—B—                  A1

—P—X—P—                  A2

—B—X—B—                  A3

In the present invention, because of such a characteristic chemical structure, the aromatic content in the molecular structure increases and excellent heat resistance is exhibited. Furthermore, the hydroxyl group concentration can be moderately decreased and also the dielectric constant and the dielectric dissipation factor can be decreased by introducing an alkoxy group into the molecular structure without drastically decreasing the hydroxyl group concentration. When the phenol resin is used as a curing agent for epoxy resin, curability does not deteriorate. It is worthy of special mention that excellent dielectric characteristics are exhibited, although a functional group having comparatively high polarity such as alkoxy group is introduced.

The molecular structure of the phenol resin may vary according to the number of balances of "P" and "B" and examples thereof include the following structures (1) to (5):

1) a linear alternating copolymer having, as a repeating unit, a structure represented by the following structural formula A4:

[Chemical Formula 3]

—P—X—B—X—              A4

2) a branched alternating copolymer having, as a repeating unit, structures represented by the following structural formulas A5 to A7:

[Chemical Formula 4]

$$\begin{array}{c}
-\!\!\!\underset{\underset{X}{|}}{P}\!\!-\!\!X\!\!-\!\!B\!\!-\!\!X\!\!-\!\!\! \qquad\qquad A5 \\[1em]
-\!\!\!P\!\!-\!\!X\!\!-\!\!\underset{\underset{X}{|}}{B}\!\!-\!\!X\!\!-\!\!\! \qquad\qquad A6 \\[1em]
-\!\!\!\underset{\underset{X}{|}}{P}\!\!-\!\!X\!\!-\!\!\underset{\underset{X}{|}}{B}\!\!-\!\!X\!\!-\!\!\! \qquad\qquad A7
\end{array}$$

3) a linear or branched random polymer having all structural moieties A1 to A3, 4) a polymer having a structure in which a polymer block comprising structural units P and structural units X bonded alternately with each other and plural structural units P in the polymer block are knotted with a structural unit B via the structural unit X, and 5) a polymer comprising a polymer block comprising structural units P and structural units X bonded alternately with each other, and a polymer block comprising structural units B and structural units X bonded alternately with each other.

The phenolic hydroxyl group-containing aromatic hydrocarbon group (P) can have various structures. For example, preferred examples thereof are phenols and naphthols represented by the following structural formulas P1 to P16, and aromatic hydrocarbon groups formed from a compound having an alkyl group as a substituent on the aromatic nucleus of them because of excellent dielectric performances.
[Chemical Formula 5]
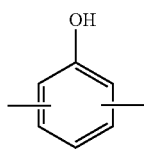
P1
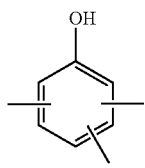
P2
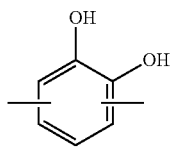
P3
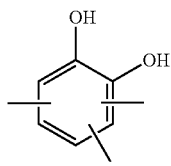
P4
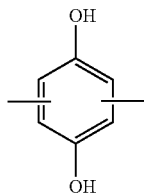
P5
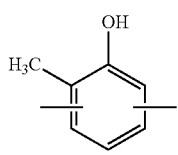
P6
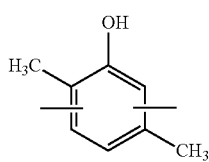
P7
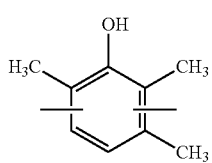
P8
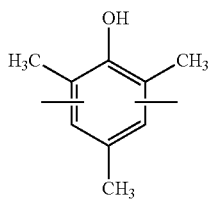
P9
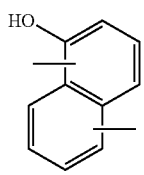
P10
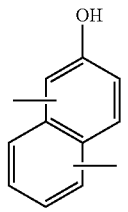
P11
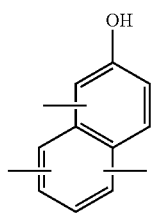
P12
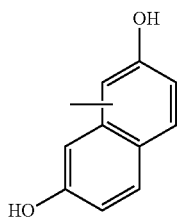
P13
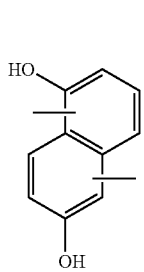
P14
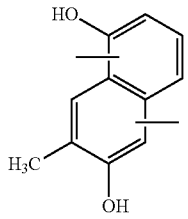
P15
-continued

P16

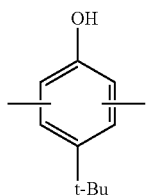

When each of these structures is located on a molecular end, a monovalent aromatic hydrocarbon group is formed. Among these structures, regarding those having two or more positions of bonding with the other structural moiety on a naphthalene skeleton, the bonding position may be on the same or different nucleus.

Among the phenolic hydroxyl group-containing aromatic hydrocarbon groups (P) described in detail, preferred examples are phenols and naphthols represented by the above structural formulas P1 to P15, and divalent or trivalent aromatic hydrocarbon groups formed from a molecular structure selected from a compound having a methyl group as a substituent on the aromatic nucleus of them because excellent flame retardancy can be imparted to the epoxy resin cured article itself and it becomes possible to design a halogen-free material which has strongly been required in the field of electronic components, recently.

In the present invention, it is preferred to have a structure represented by the following structural formula (2) or (3) because excellent flame retardancy can be imparted to the epoxy resin cured article itself.

[Chemical Formula 6]

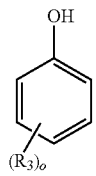
(2)

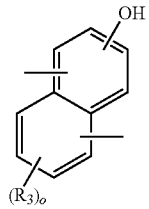
(3)

In the formulas (2) and (3), $R_3$ represents a hydrogen atom or a methyl group, and o represents an integer of 1 to 3.

Specific structures represented by the structural formula (2) are those represented by the structural formulas P1 and P6 to P9. Specific structures represented by the structural formula (3) are those represented by the structural formulas P10 and P11.

The alkoxy group-containing aromatic hydrocarbon group (B) contained in the phenol resin structure is a monovalent or polyvalent aromatic hydrocarbon group having an alkoxy group as a substituent on the aromatic nucleus, and specific examples thereof include alkoxybenzene type structures represented by the following structural formulas B1 to B18 and alkoxynaphthalene type structures represented by the following structural formulas B19 to B33.

[Chemical Formula 7]

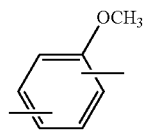
B1

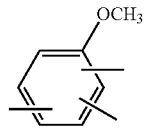
B2

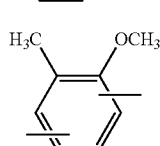
B3

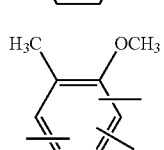
B4

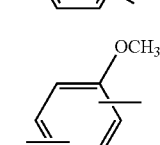
B5

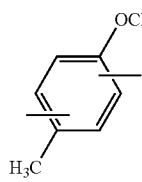
B6

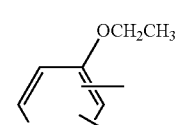
B7

B8

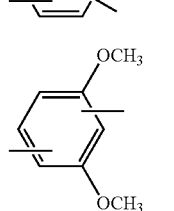
B9

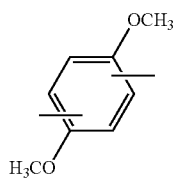
B10

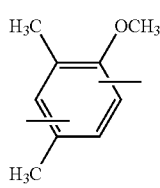

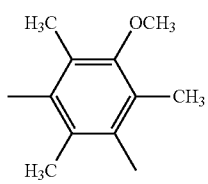
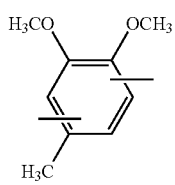
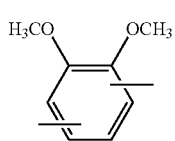
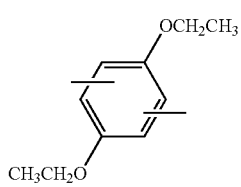
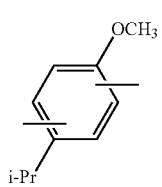
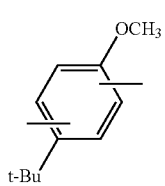
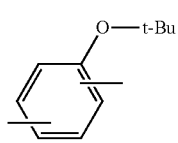
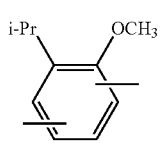
[Chemical Formula 8]
B11 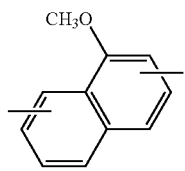 B20
B12 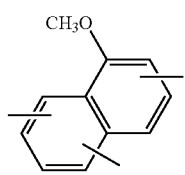 B21
B13 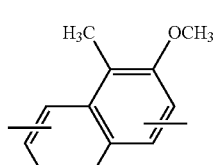 B22
B14 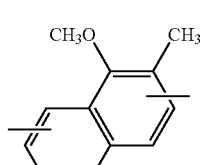 B23
B15 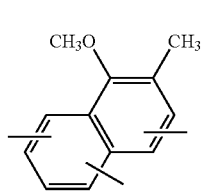 B24
B16
B17
B18 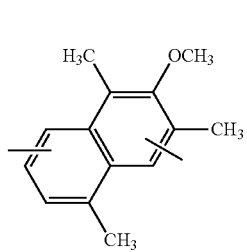 B25
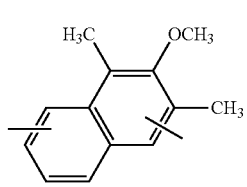 B26
B19 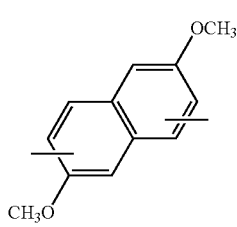 B27

-continued

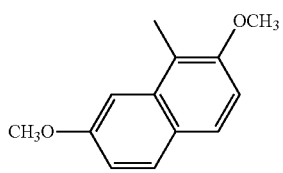
B28

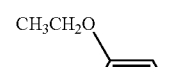
B29

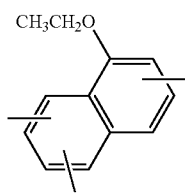
B30

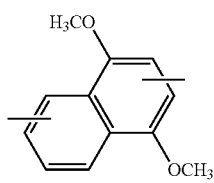
B31

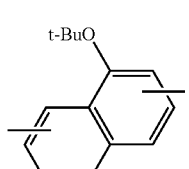
B32

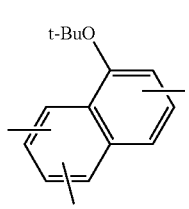
B33

When each of these structures is located on a molecular end, a monovalent aromatic hydrocarbon group is formed. Among these structures, regarding those having two or more positions of bonding with the other structural moiety on a naphthalene skeleton, the bonding position may be on the same or different nucleus.

Among the phenolic hydroxyl group-containing aromatic hydrocarbon groups (P) described in detail, preferred examples are methoxybenzene, methoxynaphthalene, ethoxybenzene and ethoxynaphthalene represented by the structural formula B1 to B14 and the structural formula B19 to B31, and divalent or polyvalent aromatic hydrocarbon groups formed from a molecular structure selected from a compound having a methyl group as a substituent on the aromatic nucleus of them because excellent flame retardancy can be imparted to the epoxy resin cured article itself and it becomes possible to design a halogen-free material which has strongly been required in the field of electronic components, recently. Particularly, divalent or trivalent aromatic hydrocarbon groups are preferable in view of curability and dielectric characteristics.

Among these, divalent or trivalent aromatic hydrocarbon groups formed from a molecular structure selected from a compound having a methyl group as a substituent on the aromatic nucleus are preferable because remarkable effect of imparting flame retardancy to an epoxy resin cured article is exerted, and structures represented by the following formula (2) are more preferable because fluidity of the composition is improved.

[Chemical Formula 9]

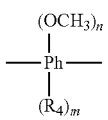

(4)

In the structural formula (4), $R_4$ represents a hydrogen atom or a methyl group, Ph represents a benzene ring or a naphthalene ring, n represents an integer of 1 or 2, and m represents an integer of 1 to 3. Specific examples of the structure represented by the structural formula (2) include structures represented by the structural formulas B1, B3, B5, B8, B9, B10, B11, B12, B13, B19, B20, B21, B23, B24, B25, B26, B27 and B31. Furthermore, the structure of the structural formula (4) in which a structural moiety represented by Ph is a naphthalene ring is preferable because excellent dielectric characteristics are attained.

Specific examples of the divalent aralkyl group (X) contained in a phenol resin structure include those of the following structural formulas X1 to X12.

[Chemical Formula 10]

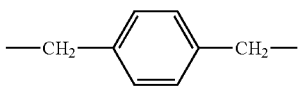
X1

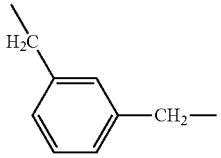
X2

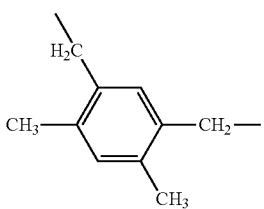
X3

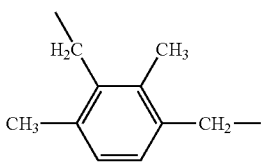
X4

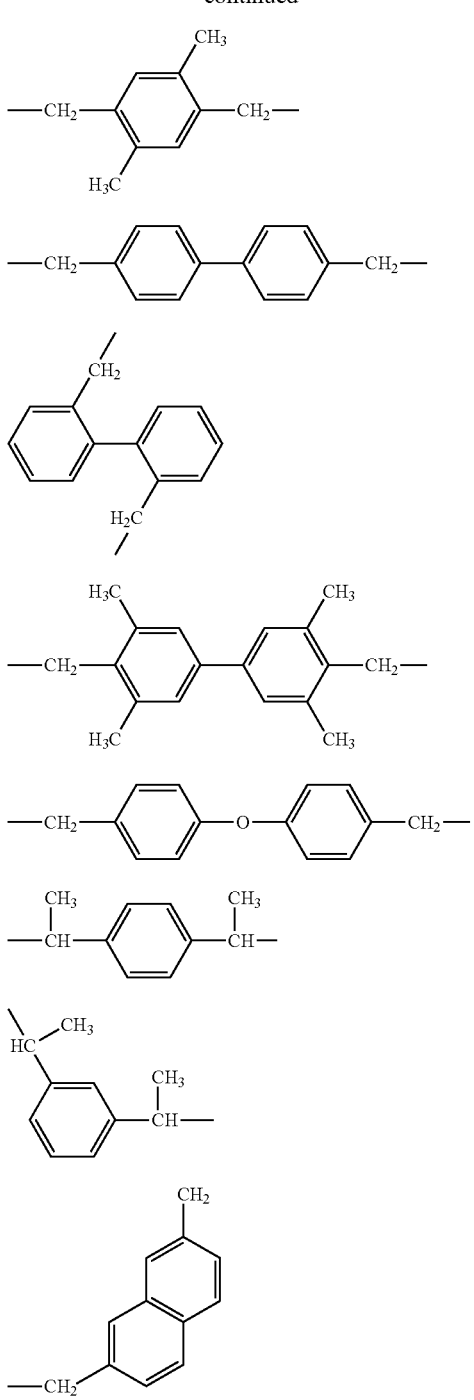

Among these divalent aralkyl groups (X), those represented by the following structural formula (1) are preferable in view of excellent flame retardant effect.

[Chemical Formula 11]

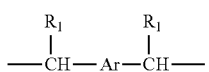
(1)

In the above formula, $R_1$ represents a hydrogen atom or a methyl group, Ar represents a phenylene group, a biphenylene group, a diphenyl ether-4,4'-diyl group, a naphthylene group, or a structure having a methyl group as a substituent on the aromatic nucleus of them. Specific examples of the structure of the structural formula (1) include structures X1 to X9 and structure X12. In view of flame retardancy, $R_1$ is particularly preferably a hydrogen atom in the structural formula (1).

The phenol resin used in the present invention can have optional combinations of structures described in the above specific examples of the structural moieties (P), (B) and (X).

In the field of the epoxy resin composition, a halogen-free flame retardant system has strongly been required, recently, because of a problem of dioxin. As described above, flame retardancy of a cured article is remarkably improved according to the selection of the structure of the phenol resin.

Specifically, when the alkoxy group-containing aromatic hydrocarbon group (B) is a monovalent or polyvalent aromatic hydrocarbon group formed from a molecular structure selected from methoxybenzene, methoxynaphthalene, ethoxybenzene, ethoxynaphthalene, and a compound having a methyl group as a substituent on the aromatic nucleus of them, the divalent aralkyl group (X) is a divalent hydrocarbon group having a structure represented by the following structural formula (1):

[Chemical Formula 12]

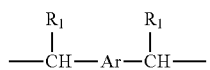
(1)

wherein $R_1$ represents a hydrogen atom or a methyl group, and Ar represents a phenylene group, a biphenylene group, a diphenyl ether-4,4'-diyl group or a naphthylene group, and the phenolic hydroxyl group-containing aromatic hydrocarbon group (P) is a divalent or trivalent aromatic hydrocarbon group formed from a molecular structure selected from phenol, naphthol, and a compound having a methyl group as a substituent on the aromatic nucleus of them, flame retardancy of the phenol resin itself is remarkably improved and it becomes possible to prepare a halogen-free material as an electronic component-related material. The alkoxy group-containing aromatic hydrocarbon group (B) is particularly preferably a divalent or trivalent aromatic hydrocarbon group in view of curability and dielectric characteristics.

The phenol resin preferably has a hydroxyl group equivalent within a range from 150 to 500 g/eq. because flame retardancy and dielectric characteristics of the cured article are more improved. A phenol resin having a melt viscosity at 150° C. as measured by an ICI viscometer within a range from 0.3 to 5.0 dPa·s is preferable because of excellent fluidity during molding and heat resistance of the cured article. In the present invention, a novel phenol resin of the present invention is obtained from those having the hydroxyl group equivalent and melt viscosity within the above range. When the hydroxyl group equivalent is within a range from 200 to 350 g/eq, the resulting cured article is particularly excellent in balance between dielectric characteristics and curability of the composition.

In the phenol resin, an abundance ratio of the phenolic hydroxyl group-containing aromatic monovalent or divalent hydrocarbon group (P) to the alkoxy group-containing divalent aromatic hydrocarbon group (B), the former/the latter, is preferably within a range from 30/70 to 98/2 because flame retardancy and dielectric characteristics of the cured article are more improved.

The phenol resin can be produced by the method described in detail below. The method for producing the phenol resin will now be described in detail.

The phenol resin can be produced by reacting a hydroxy group-containing aromatic compound (a1), an alkoxy group-containing aromatic compound (a2) and a compound (a3) represented by the following structural formula (a3-a), (a3-b) or (a3-c):

[Chemical Formula 13]

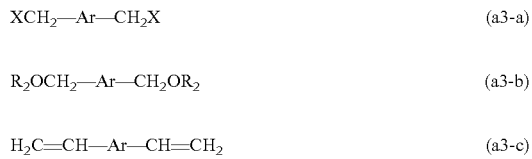

wherein, in the formula (a3-b), $R_2$ represents a hydrogen atom or a hydrocarbon group having 1 to 6 carbon atoms.

It is worthy of special mention that the reaction smoothly proceeds without causing hydrolysis, though the hydroxy group-containing aromatic compound (a1) is used as a raw material. As an alkoxy group obtained by alkoxylating a phenolic hydroxyl group is widely used for a technique for protection of a phenolic hydroxyl group, the alkoxy group is easily hydrolyzed under a strong acidic environment, whereas, the alkoxy group can be introduced into a phenol resin structure without causing any hydrolysis in the present invention.

Specific examples of the hydroxy group-containing aromatic compound (a1) used in the above method include non-substituted phenols such as phenol, resorcinol and hydroquinone; monosubstituted phenols such as cresol, phenylphenol, ethylphenol, n-propylphenol, iso-propylphenol and t-butylphenol; disubstituted phenols such as xylenol, methylpropylphenol, methylbutylphenol, methylhexylphenol, dipropylphenol and dibutylphenol; and trisubstituted phenols such as mesitol, 2,3,5-trimethylphenol and 2,3,6-trimethylphenol; and naphthols such as 1-naphthol, 2-naphthol and methylnaphthol.

These compounds may be used in combination.

Among these compounds, as described above, 1-naphthol, 2-naphthol, cresol and phenol are preferable in view of dielectric characteristics and flame retardancy of the cured article.

Specific examples of the alkoxy group-containing aromatic compound (a2) include monoalkoxybenzenes such as anisole and ethoxybenzene; dialkoxybenzenes such as 1,2-dimethoxybenzene, 1,3-dimethoxybenzene, 1,4-dimethoxybenzene, 1,4-diethoxybenzene and 1-methoxy-2-isopropoxybenzene; mono alkoxynaphthalenes such as 1-methoxynaphthalene and 2-methoxynaphthalene; dialkoxynaphthalenes such as 1,4-dimethoxynaphthalene, 2,6-dimethoxynaphthalene and 2,7-dimethoxynaphthalene; substituted alkoxybenzenes such as 1-methoxy-4-propylbenzene, 1-(4-methoxyphenyl)-1-propane and 1-propyl-2-methoxy-4-methylbenzene; and anisaldehyde.

These compounds may be used in combination. Among these compounds, dimethoxybenzene, anisole, 1,2-dimethoxybenzene, 1,3-dimethoxybenzene, 1,4-dimethoxybenzene, 1-methoxynaphthalene and 2-methoxynaphthalene are particularly preferable because the resulting cured article is particularly excellent in flame retardancy.

Since a cured article having particularly excellent dielectric characteristics can be obtained, anisole, 1-methoxynaphthalene and 2-methoxynaphthalene are particularly preferable.

Specific examples of the compound represented by the structural formula (a3-a), which serves as a crosslinking agent, include 1,2-di(chloromethyl)benzene, 1,2-di(bromomethyl)benzene, 1,3-di(chloromethyl)benzene, 1,3-di(fluoromethyl)benzene, 1,4-di(chloromethyl)benzene, 1,4-di(bromomethyl)benzene, 1,4-di(fluoromethyl)benzene, 1,4-di(chloromethyl)-2,5-dimethylbenzene, 1,3-di(chloromethyl)-4,6-dimethylbenzene, 1,3-di(chloromethyl)-2,4-dimethylbenzene, 4,4'-bis(chloromethyl)biphenyl, 2,2'-bis(chloromethyl)biphenyl, 2,4'-bis(chloromethyl)biphenyl, 2,3'-bis(chloromethyl)biphenyl, 4,4'-bis(bromomethyl)biphenyl, 4,4'-bis(chloromethyl)diphenyl ether and 2,7-di(chloromethyl)naphthalene. Specific examples of the compound represented by the structural formula (a3-b) include p-xylylene glycol, m-xylene glycol, 1,4-di(2-hydroxy-2-ethyl)benzene, 4,4'-bis(dimethylol)biphenyl, 2,4'-bis(dimethylol)biphenyl, 4,4'-bis(2-hydroxy-2-propyl)biphenyl, 2,4'-bis(2-hydroxy-2-propyl)biphenyl, 1,4'-di(methoxymethyl)benzene, 1,4'-di(ethoxymethyl)benzene, 1,4'-di(isopropoxy)benzene, 1,4'-di(butoxy)benzene, 1,3'-di(methoxymethyl)benzene, 1,3'-di(ethoxymethyl)benzene, 1,3'-di(isopropoxy)benzene, 1,3'-di(butoxy)benzene, 1,4-di(2-methoxy-2-ethyl)benzene, 1,4-di(2-hydroxy-2-ethyl)benzene, 1,4-di(2-ethoxy-2-ethyl)benzene, 4,4'-bis(methoxymethyl)biphenyl, 2,4'-bis(methoxymethyl)biphenyl, 2,2'-bis(methoxymethyl)biphenyl, 2,3'-bis(methoxymethyl)biphenyl, 3,3'-bis(methoxymethyl)biphenyl, 3,4'-bis(methoxymethyl)biphenyl, 4,4'-bis(ethoxymethyl)biphenyl, 2,4'-bis(ethoxymethyl)biphenyl, 4,4'-bis(isopropoxy)methylbiphenyl, 2,4'-bis(isopropoxy)methylbiphenyl, bis(1-methoxy-1-ethyl)biphenyl, bis(1-methoxy-1-ethyl)biphenyl, bis(1-isopropoxy-1-ethyl)biphenyl, bis(2-hydroxy-2-propyl)biphenyl, bis(2-methoxy-2-propyl)biphenyl and bis(2-isopropoxy-2-propyl)biphenyl.

Specific examples of the compound represented by the structural formula (a3-c) include bis(vinyl)biphenyls such as p-divinylbenzene, m-divinylbenzene and 4,4'-bis(vinyl)biphenyl.

The method for reacting the hydroxy group-containing aromatic compound (a1), the alkoxy group-containing aromatic compound (a2) and the compound (a3) represented by the structural formula (a3-a), (a3-b) or (a3-c) (the compound is abbreviated to a "compound (a3)", hereinafter) include the following methods 1 and 2.

Method 1: method comprising previously reacting an alkoxy group-containing aromatic compound (a2) with a compound (a3) and reacting the resulting intermediate reaction product with a hydroxy group-containing aromatic compound (a1)

Method 2: method comprising reacting a hydroxy group-containing aromatic compound (a1), an alkoxy group-containing aromatic compound (a2) and a compound (a3) in a single stage.

According to the methods 1 and 2, the objective phenol resin can be obtained by heating with stirring in the presence of a polymerization catalyst. This polymerization catalyst is preferably an acid catalyst and examples thereof include inorganic acids such as hydrochloric acid, sulfuric acid and phosphoric acid; organic acids such as methanesulfonic acid, p-toluenesulfonic acid and oxalic acid; and Lewis acids such as boron trifluoride, anhydrous aluminum chloride and zinc chloride. The content is preferably within a range from 0.1 to 5% by weight based on the total weight of raw materials to be charged.

The method 1 is preferably a method comprising reacting 1 mol of an alkoxy group-containing aromatic compound (a2) with 2 to 30 mols of a compound (a3) and charging and reacting a hydroxy group-containing aromatic compound (a1). Regarding a ratio of the hydroxy group-containing aromatic compound (a1) when charged, a ratio of the total number of mols of the hydroxy group-containing aromatic compound (a1) and the alkoxy group-containing aromatic compound (a2) to the number of mols of the compound (a3), {(a1)+(a2)}/(a3), is preferably within a range from 51/49 to 97/3. According to this method, the molecular structure of the objective phenol resin can be alternate-copolymerized, and thus the alkoxy group can be introduced into the molecular structure more efficiently.

In the method 2, regarding a ratio of the hydroxy group-containing aromatic compound (a1), the alkoxy group-containing aromatic compound (a2) and the compound (a3) when charged for reaction, a molar ratio of the hydroxy group-containing aromatic compound (a1) to the alkoxy group-containing aromatic compound (a2), (a1)/(a2), is from 30/70 to 98/2 and a ratio of the total number of mols of the hydroxy group-containing aromatic compound (a1) and the alkoxy group-containing aromatic compound (a2) to the number of mols of the compound (a3), {(a1)+(a2)}/(a3), is preferably within a range from 51/49 to 97/3. When these conditions are satisfied, a cured article having more excellent flame retardancy and dielectric characteristics can be obtained. The single stage reaction in the method 2 is, for example, a method of charging all raw materials before the reaction is accelerated by heating.

In the present invention, since alkoxy group-containing aromatic compound (a2) is remarkably excellent in reactivity, an alkoxy structure can be easily introduced into a phenol resin structure by the method 2. Therefore, the method 2 is preferably in view of simplicity of the method.

In case of reacting by the method 1 or 2, organic solvents can be used, if necessary. Specific examples of usable organic solvent include methyl cellosolve, ethyl cellosolve, toluene, xylene and methyl isobutyl ketone. The content of the organic solvent is usually from 10 to 500% by weight, and preferably from 30 to 250% by weight, based on the total weight of the raw materials to be charged.

The reaction temperature is usually within a range from 40 to 250° C., and preferably from 100 to 200° C. The reaction time is usually from 1 to 10 hours.

When a compound represented by the structural formula (a3-a) is used as the compound (a3), the reaction constitutes a condensation reaction system and a hydrogen halide gas such as hydrochloric acid gas is generated with the proceeding of the reaction, and thus it is preferred that the hydrogen halide gas is quickly discharged out of the system and trapped with an alkali treatment outside the system.

Even when a compound represented by the structural formula (a3-b) is used, the reaction constitutes a condensation reaction system and water and methanol are generated with the proceeding of the reaction, and thus it is preferred to quickly discharge them out of the system so as to increase a reaction rate.

When a compound represented by the structural formula (a3-c) is used, the reaction constitutes an addition reaction system and therefore a treatment for by-products is not required.

When the resulting phenol resin is severely colored, antioxidants and reducing agents may be added so as to suppress coloring. Examples of the antioxidant include hindered phenol-based compound such as 2,6-dialkylphenol derivative, divalent phosphorus-based compound, and phosphite ester-based compound having a trivalent phosphorus atom. Examples of the reducing agent include, but are not limited to, hypophosphorous acid, phosphorous acid, thiosulfuric acid, sulfurous acid, hydrosulfite, and mixtures thereof and zinc.

After the completion of the reaction, the reaction mixture is neutralized or subjecting to a washing treatment until the pH is adjusted within a range from 3 to 7, and preferably from 4 to 7. The neutralization treatment and washing treatment may be conducted according to a conventional method. For example, when the acid catalyst is used, basic substances such as sodium hydroxide, potassium hydroxide, sodium carbonate, ammonia, triethylenetetramine and aniline can be used as a neutralizer. In case of the neutralization, phosphoric acid such as buffer may be previously incorporated, and that pH may be adjusted within a range from 3 to 7 using oxalic acid after the system was made basic. The objective phenol can be obtained by subjecting to the neutralization or washing treatment, and distilling off the unreacted raw materials containing mainly a hydroxy group-containing aromatic compound (a1) and an alkoxy group-containing aromatic compound (a2), an organic solvent and by-products with heating under reduced pressure, thereby to concentrate the product. The unreacted raw materials thus recovered can be recycled. It is preferred to introduce a precise filtration step into the treatment after the completion of the reaction because inorganic salts and foreign matters can be removed by purification.

In the epoxy resin composition (I) of the present invention, the phenol resin may be used alone, or other curing agents may be used s far as the effects of the present invention are not adversely affected. The other curing agent can be used in combination so that the content of the phenol resin is 30% by weight or more, and preferably 40% by weight or more, based on the total mass of the curing agent.

Examples of the other curing agent, which can be used in combination of the phenol resin of the present invention include, but are not limited to, amine-based compound, amide-based compound, acid anhydride-based compound, phenol-based compound other than the above-described phenol resins, and polyhydric phenol compound of aminotriazine-modified phenol resin (polyhydric phenol compound in which the phenol nucleus is combined by melamine or benzoguanamine).

Among these compounds, phenol novolak resin, cresol novolak resin, aromatic hydrocarbon formaldehyde resin-modified phenol resin, phenol aralkyl resin, naphthol aralkyl resin, naphthol novolak resin, naphthol-phenol condensed novolak resin, naphthol-cresol condensed novolak resin, biphenyl-modified phenol resin, biphenyl-modified naphthol resin and aminotriazine-modified phenol resin are preferable because of excellent flame retardancy. It is particularly preferable to use compounds, for example, high aromatic and hydroxyl group equivalent phenol resins such as phenol aralkyl resin, naphthol aralkyl resin, biphenyl-modified phenol resin and biphenyl-modified naphthol resin, and nitrogen atom-containing aminotriazine-modified phenol resins because the resulting cured article is excellent in flame retardancy and dielectric characteristics.

Examples of the epoxy resin (B) used in the epoxy resin composition (I) of the present invention include bisphenol A type epoxy resin, bisphenol F type epoxy resin, biphenyl type epoxy resin, tetramethyl biphenyl type epoxy resin, phenol novolak type epoxy resin, cresol novolak type epoxy resin, bisphenol A novolak type epoxy resin, triphenylmethane type epoxy resin, tetraphenylethane type epoxy resin, dicyclopentadiene-phenol addition reaction type epoxy resin, phenol aralkyl type epoxy resin, naphthol novolak type epoxy resin, naphthol aralkyl type epoxy resin, naphthol-phenol-condensed novolak type epoxy resin, naphthol-cresol-condensed novolak type epoxy resin, aromatic hydrocarbon formaldehyde resin-modified phenol resin type epoxy resin and biphenyl novolak type epoxy resin. These epoxy resins may be used alone or in combination.

Among these epoxy resins, biphenyl type epoxy resin, naphthalene type epoxy resin, phenol aralkyl type epoxy resin, biphenyl novolak type epoxy resin and xanthene type epoxy resin are particularly preferable because of excellent flame retardancy and dielectric characteristics.

The amounts of epoxy resin (B) and the curing agent to be used in the epoxy resin composition (I) of the present invention are not specifically limited, and are controlled so that the amount of an active group in the curing agent containing the phenol resin (A) is from 0.7 to 1.5 equivalents based on 1 equivalent of the total amount of epoxy groups of the epoxy resin (B) because the cured article is excellent in characteristics.

If necessary, curing accelerators can be used in combination in the epoxy resin composition (I) of the present invention. Various curing accelerators can be used and examples thereof include phosphorus-based compound, tertiary amine, imidazole, organic acid metal salt, Lewis acid and amine complex. When used for semiconductor sealing materials, phosphorus-based compounds such as triphenylphosphine and tertiary amines such as 1,8-diazabicyclo-[5.4.0]-undecene (DBU) are preferably used because of excellent curability, heat resistance, electrical characteristics and moisture-resistant reliability.

Another epoxy resin composition (II) of the present invention is an epoxy resin composition comprising an epoxy resin and a curing agent as essential components, wherein the epoxy resin has each structure of a glycidyloxy group-containing aromatic hydrocarbon group (E), an alkoxy group-containing aromatic hydrocarbon group (B) and a divalent aralkyl group (X), and also has, in a molecular structure, a structure in which the glycidyloxy group-containing aromatic hydrocarbon group (E) and the alkoxy group-containing aromatic hydrocarbon group (B) are bonded to the other glycidyloxy group-containing aromatic hydrocarbon group (E) or alkoxy group-containing aromatic hydrocarbon group (B) via the divalent aralkyl group (X).

That is, the epoxy resin in the epoxy resin composition (II) is epoxidated by reacting a phenol resin constituting the epoxy resin composition (I) with epihalohydrin and has the same base skeleton as that of the phenol resin. Therefore, similar to the case of the phenol resin, since the aromatic content in the molecular structure increases, thereby making it possible to impart excellent heat resistance to the cured article and moderately decrease the epoxy group concentration, and the molecular structure has an alkoxy group therein, the dielectric constant and dielectric dissipation factor of the cured article can be decreased without adversely affecting curability.

Similar to the case of the phenol resin, when structural units of the glycidyloxy group-containing aromatic hydrocarbon group (E), the alkoxy group-containing aromatic hydrocarbon group (B) and the divalent aralkyl group (X) are represented by "E", "B" and "X", respectively, the epoxy resin essentially has, in a molecular structure, a structural moiety Y1 or structural moieties Y2 and Y3 among the following structural moieties Y1 to Y3.

[Chemical Formula 14]

—E—X—B—     Y1

—E—X—E—     Y2

—B—X—B—     Y3

In the present invention, because of such a characteristic chemical structure, the aromatic content in the molecular structure increases and excellent heat resistance is exhibited. Furthermore, the hydroxyl group concentration can be moderately decreased and also the dielectric constant and the dielectric dissipation factor can be decreased by introducing an alkoxy group into the molecular structure without drastically decreasing the hydroxyl group concentration. When the phenol resin is used as a curing agent for epoxy resin, curability does not deteriorate. It is worthy of special mention that excellent dielectric characteristics are exhibited, although a functional group having comparatively high polarity such as alkoxy group is introduced.

The molecular structure of the epoxy resin may vary according to the number of balances of "Y" and "B" and examples thereof include the following structures (1) to (5):
1) a linear alternating copolymer having, as a repeating unit, a structure represented by the following structural formula Y4:

[Chemical Formula 15]

—E—X—B—X—     Y4

2) a branched alternating copolymer having, as a repeating unit, structures represented by the following structural formulas Y5 to Y7:

[Chemical Formula 16]

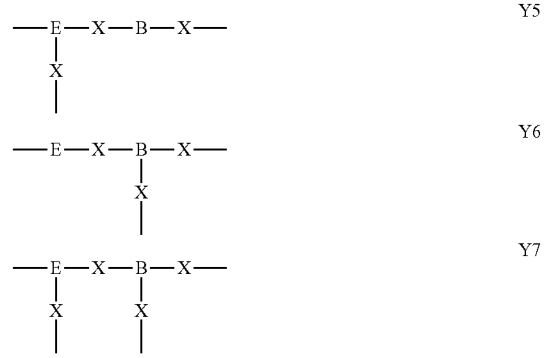

3) a linear or branched random polymer having all structural moieties Y1 to Y3,
4) a polymer having a structure in which a polymer block comprising structural units Y and structural units X bonded alternately with each other and plural structural units Y in the polymer block are knotted with a structural unit B via the structural unit X, and
5) a polymer comprising a polymer block comprising structural units Y and structural units X bonded alternately with each other, and a polymer block comprising structural units B and structural units X bonded alternately with each other.

The glycidyloxy group-containing aromatic hydrocarbon group (E) is not specifically limited and may be preferably aromatic hydrocarbon groups represented by the following structural formulas E1 to E16 because of excellent dielectric performances.

[Chemical Formula 17]
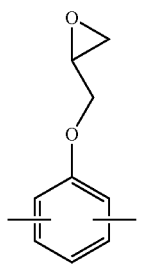
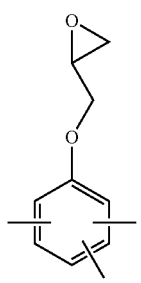
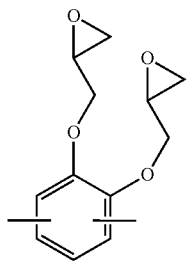
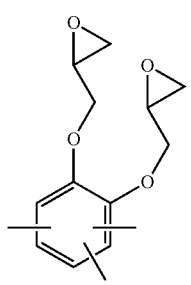
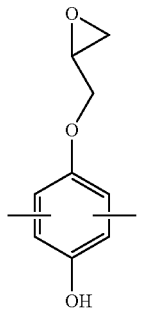
E1
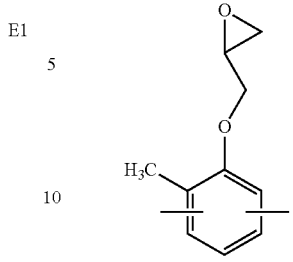
E2
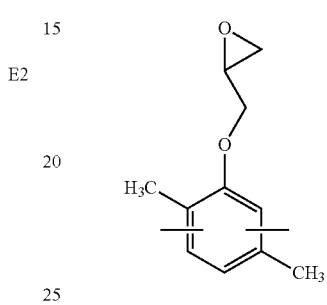
E3
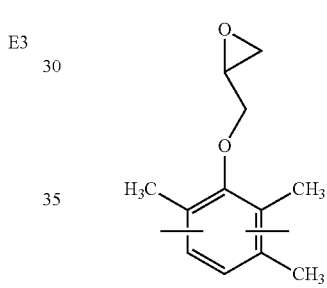
E4
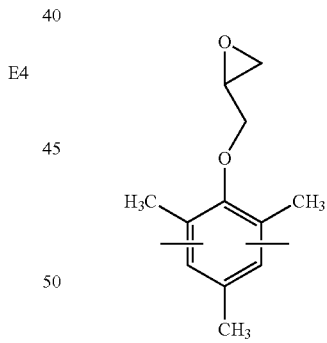
E5
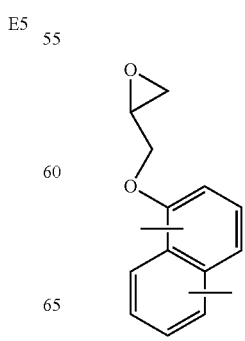
E6
E7
E8
E9
E10

E11 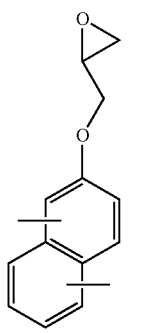

E12 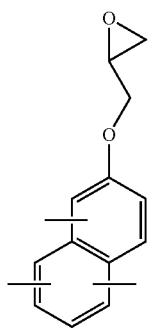

E13 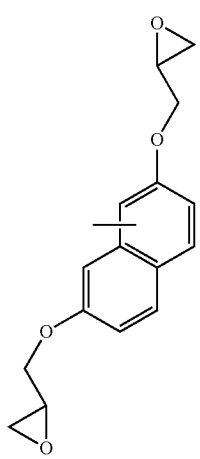

E14 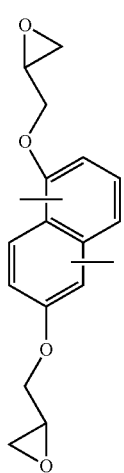

E15 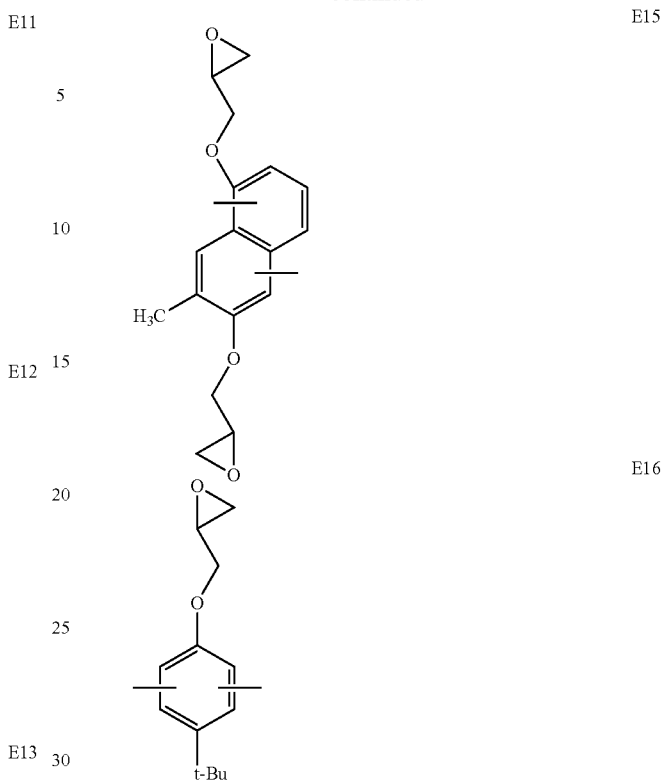

E16

When each of these structures is located on a molecular end, a monovalent aromatic hydrocarbon group is formed. Among these structures, regarding those having two or more positions of bonding with the other structural moiety on a naphthalene skeleton, the bonding position may be on the same or different nucleus.

Among the glycidyloxy group-containing aromatic hydrocarbon groups (E) described in detail, preferred examples are glycidyloxybenzenes and glycidyloxynaphthalenes represented by the above structural formulas E1 to E15, and divalent or trivalent aromatic hydrocarbon groups formed from a molecular structure selected from a compound having a methyl group as a substituent on the aromatic nucleus of them because excellent flame retardancy can be imparted to the epoxy resin cured article itself and it becomes possible to design a halogen-free material which has strongly been required in the field of electronic components, recently.

In the present invention, it is preferred to have a structure represented by the following structural formula (5) or (6) because excellent flame retardancy can be imparted to the epoxy resin cured article itself.

[Chemical Formula 18]                                      (5)

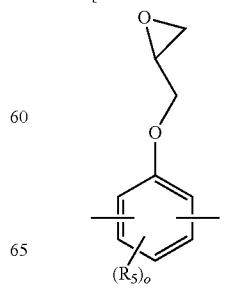

-continued

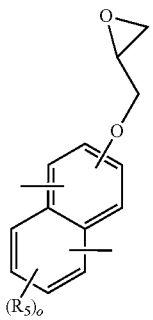

(6)

wherein, in the formulas (5) and (6), $R_5$ represents a hydrogen atom or a methyl group, and o represents an integer of 1 to 3.

Specific structures represented by the structural formula (5) are those represented by the structural formulas E1 and E6 to E9. Specific structures represented by the structural formula (6) are those represented by the structural formulas E10 and E11.

The alkoxy group-containing divalent aromatic hydrocarbon group (B) contained in the epoxy resin structure is specifically the same as those in the phenol resin of the epoxy resin composition (I).

The divalent aralkyl group (X) contained in the epoxy resin structure is specifically the same as those in the phenol resin of the epoxy resin composition (I).

The epoxy resin used in the present invention can have optional combinations of structures described in the above specific examples of the structural moieties (E), (B) and (X).

As described above, also in the epoxy resin composition (II), flame retardancy of a cured article is remarkably improved according to the selection of the structure of the epoxy resin.

Specifically, when the alkoxy group-containing aromatic hydrocarbon group (B) is a monovalent or polyvalent aromatic hydrocarbon group formed from a molecular structure selected from methoxybenzene, methoxynaphthalene, ethoxybenzene, ethoxynaphthalene, and a compound having a methyl group as a substituent on the aromatic nucleus of them, the divalent aralkyl group (X) is a divalent hydrocarbon group having a structure represented by the following structural formula (1):

[Chemical Formula 3]

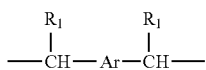

(1)

wherein $R_1$ represents a hydrogen atom or a methyl group, and Ar represents a phenylene group, a biphenylene group, a diphenyl ether-4,4'-diyl group or a naphthylene group, and the glycidyloxy group-containing aromatic hydrocarbon group (E) is a divalent or trivalent aromatic hydrocarbon group formed from a molecular structure selected from glycidyloxybenzene, glycidyloxynaphthalene, and a compound having a methyl group as a substituent on the aromatic nucleus of them, flame retardancy of the epoxy resin itself is remarkably improved and it becomes possible to prepare a halogen-free material as an electronic component-related material.

The alkoxy group-containing aromatic hydrocarbon group (B) is particularly preferably a divalent or trivalent aromatic hydrocarbon group in view of curability and dielectric characteristics.

The epoxy resin preferably has an epoxy group equivalent within a range from 200 to 700 g/eq. because flame retardancy and dielectric characteristics of the cured article are more improved. An epoxy resin having a melt viscosity at 150° C. as measured by an ICI viscometer within a range from 0.3 to 5.0 dPa·s is preferable because of excellent fluidity during molding and heat resistance of the cured article. In the present invention, a novel epoxy resin of the present invention is obtained from those having the hydroxyl group equivalent and melt viscosity within the above range. When the epoxy group equivalent is within a range from 260 to 420 g/eq, the resulting cured article is particularly excellent in balance between dielectric characteristics and curability of the composition.

In the epoxy resin, an abundance ratio of the glycidyl group-containing aromatic monovalent or divalent hydrocarbon group (E) to the alkoxy group-containing divalent aromatic hydrocarbon group (B), the former/the latter, is preferably within a range from 30/70 to 98/2 because flame retardancy and dielectric characteristics of the cured article are more improved.

The epoxy resin can be produced by the method described in detail below.

Specifically, the objective epoxy resin can be produced by producing a phenol resin in the epoxy resin composition (I) by the above-described method and reacting the phenol resin with epihalohydrin. For example, there can be exemplified a method comprising adding 2 to 10 mols of epihalohydrin to 1 mol of a phenolic hydroxyl group in the phenol resin and reacting at a temperature of 20 to 120° C. for 0.5 to 10 hours while adding 0.9 to 2.0 mols of a basic catalyst to 1 mol of a phenolic hydroxyl group at a time or gradually. This basic catalyst may be used in the form of solid or an aqueous solution. When using an aqueous solution, there may be employed a method comprising adding the basic catalyst continuously, distilling off water and epihalohydrins continuously from the reaction mixture under reduced or normal pressure, separating the reaction mixture to remove water, and returning epihalohydrins into the reaction mixture continuously.

In case of industrial production, although all epihalohydrins to be charged in an initial batch for production of an epoxy resin are new ones, it is preferable to use epihalohydrins recovered from the crude reaction product in combination with new epihalohydrins in the amount corresponding to those consumed in the reaction in the following batch. The epihalohydrin to be used is not specifically limited and examples thereof include epichlorohydrin, epibromohydrin and β-methylepichlorohydrin. Among these epihalohydrins, epichlorohydrin is preferable because it is commercially available with ease.

Specific examples of the basic catalyst include alkali earth metal hydroxide, alkali metal carbonate and alkali metal hydroxide. Among these basic catalysts, alkali metal hydroxide is preferable because it is excellent in catalytic activity of the epoxy resin synthesis reaction, and examples thereof include sodium hydroxide and potassium hydroxide. Before use, these basic catalysts may be used in the form of an aqueous solution having a concentration of about 10 to 55% by weight, or may be used in the form of solid. The reaction rate in the synthesis of the epoxy resin can be enhanced by using in combination with an organic solvent. Examples of the organic solvent include, but are not limited to, ketones such as acetone and methyl ethyl ketone; alcohols such as methanol, ethanol, 1-propyl alcohol, isopropyl alcohol, 1-butanol, secondary butanol and tertiary butanol; cellosolves such as methyl cellosolve and ethyl cellosolve; ethers such as tetrahydrofuran, 1,4-dioxane, 1,3-dioxane and diethoxyethane; and aprotic polar solvents such as acetonitrile, dimethyl sulfoxide and dimethylformamide. These organic solvents may be used alone or in combination so as to control polarity.

phenol aralkyl type epoxy resin, biphenyl novolak type epoxy resin, naphthalene skeleton-containing naphthol novolak type epoxy resin, naphthol aralkyl type epoxy resin, naphthol-phenol-condensed novolak type epoxy resin, naphthol-cresol-condensed novolak type epoxy resin, crystalline biphenyl type epoxy resin, tetramethylbiphenyl type epoxy resin, and xanthene type epoxy resin represented by the following structural formula:

[Chemical Formula 19]

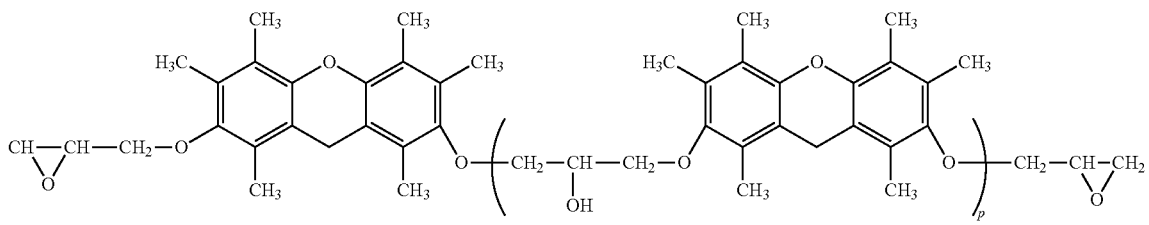

After washing the reaction product of the epoxidation reaction with water, the unreacted epihalohydrin and the organic solvent are distilled off by heating under reduced pressure. In order to reduce the content of hydrolyzable halogen in the epoxy resin, the resulting epoxy resin is dissolved again in an organic solvent such as toluene, methyl isobutyl ketone or methyl ethyl ketone and an aqueous solution of an alkali metal hydroxide such as sodium hydroxide or potassium hydroxide, and then the reaction can be conducted. In this case, for the purpose of improving the reaction rate, the reaction may be conducted in the presence of a phase transfer catalyst such as quaternary ammonium salt or crown ether. When using the phase transfer catalyst, the content is preferably within a range from 0.1 to 3.0% by weight based on the epoxy resin. A high purity epoxy resin can be obtained by filtering or washing the reaction mixture with water to remove a salt produced after the completion of the reaction, and distilling off a solvent such as toluene or methyl isobutyl ketone with heating under reduced pressure.

In the epoxy resin composition (II) of the present invention, the epoxy resin (A) obtained by the method of the present invention can be used alone or in combination with the other epoxy resin as far as the effects of the present invention are not adversely affected. When using in combination with the other epoxy resin, the content of the epoxy resin of the present invention in the entire epoxy resin is preferably 30% by weight or more, and particularly preferably 40% by weight or more.

As the other epoxy resin, which can be used in combination with the epoxy resin of the present invention, various epoxy resins can be used. Examples thereof include bisphenol A type epoxy resin, bisphenol F type epoxy resin, biphenyl type epoxy resin, tetramethylbiphenyl type epoxy resin, phenol novolak type epoxy resin, cresol novolak type epoxy resin, bisphenol A novolak type epoxy resin, triphenylmethane type epoxy resin, tetraphenylethane type epoxy resin, dicyclopentadiene-phenol addition reaction type epoxy resin, phenolaralkyl type epoxy resin, naphthol novolak type epoxy resin, naphthol aralkyl type epoxy resin, naphthol-phenol-condensed type epoxy resin, naphthol-cresol-condensed novolak type epoxy resin, aromatic hydrocarbon formaldehyde resin-modified phenol resin type epoxy resin and biphenyl novolak type epoxy resin. Among these epoxy resins, are particularly preferable because a cured article having excellent flame retardancy and dielectric characteristics can be obtained.

The curing agent used in the epoxy resin composition (II) of the present invention may be known various curing agents for epoxy resin, for example, curing agents such as amine-based compounds, amide-based compounds, acid anhydride-based compounds and phenol-based compounds. Specific examples of the amine-based compound include diaminodiphenylmethane, diethylenetriamine, triethylenetetramine, diaminodiphenylsulfone, isophoronediamine, imidazole, $BF_3$-amine complex and guanidine derivative. Specific examples of the amide-based compound include dicyandiamide, and polyamide resin synthesized from a dimer of linolenic acid and ethylenediamine Specific examples of the acid anhydride-based compound include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride and methylhexahydrophthalic anhydride. Specific examples of the phenol-based compound include polyhydric phenol compounds such as phenol novolak resin, cresol novolak resin, aromatic hydrocarbon formaldehyde resin-modified phenol resin, dicyclopentadienephenol addition type resin, phenol aralkyl resin (popular name: Xylok resin), naphthol aralkyl resin, trimethylolmethane resin, tetraphenylolethane resin, naphthol novolak resin, naphthol-phenol condensed novolak resin, naphthol-cresol condensed novolak resin, biphenyl-modified phenol resin (polyhydric phenol compound in which the phenol nucleus is combined by a bismethylene group), biphenyl-modified naphthol resin (polyhydric naphthol compound in which the phenol nucleus is combined by a bismethylene group), aminotriazine-modified phenol resin (polyhydric phenol compound in which the phenol nucleus is combined by melamine or benzoguanamine).

Among these compounds, those containing a lot of aromatic skeletons in the molecular structure are preferable in view of flame retardant effect. Specifically, phenol novolak resin, cresol novolak resin, aromatic hydrocarbon formaldehyde resin-modified phenol resin, phenol aralkyl resin, naphthol aralkyl resin, naphthol novolak resin, naphthol-phenol condensed novolak resin, naphthol-cresol condensed novolak resin, biphenyl-modified phenol resin, biphenyl-modified naphthol resin and aminotriazine-modified phenol resin are preferably because of excellent flame retardancy. However, in the present invention, since remarkable effect of decreasing the dielectric constant and dielectric dissipation factor is exerted, a phenol resin, used as an essential component in the epoxy resin composition (I), particularly a novel phenol resin of the present invention is preferable. Furthermore, when the phenol resin is composed of an aromatic hydrocarbon group (B) having an alkoxy group represented by the structural formula (1'), a divalent aralkyl group (X) represented by the structural formula (2') and a phenolic hydroxyl group-containing aromatic hydrocarbon group (P) represented by the formula (3) or (4), it is particularly preferable because excellent flame retardant effect is exerted.

The contents of the epoxy resin and the curing agent in the epoxy resin composition (II) of the present invention are not specifically limited and the content of the active group in the curing agent is preferably from 0.7 to 1.5 equivalents based on 1 equivalent of the total epoxy groups in the epoxy resin because the resulting cured article is excellent in characteristics.

If necessary, the epoxy resin composition (II) of the present invention can be appropriately used in combination with a curing accelerator. Various curing accelerators can be used and examples thereof include phosphorus-based compound, tertiary amine, imidazole, organic acid metal salt, Lewis acid and amine complex. When using for semiconductor sealing materials, phosphorus-based compounds such as triphenylphosphine and tertiary amines such as 1,8-diazabicyclo-[5.4.0]-undecene (DBU) are preferably used because of excellent curability, heat resistance, electrical characteristics and moisture-resistant reliability.

Regarding the epoxy resin compositions (I) and (II) of the present invention described in detail, since the resin itself has effect of imparting excellent flame retardancy according to the selection of the molecular weight of the epoxy resin or the curing agent, the resulting cured article is excellent in flame retardancy even if a conventionally used flame retardant is not incorporated. However, in order to exhibit more excellent flame retardancy, a halogen-free flame retardant (C) containing substantially no halogen atom may be incorporated in the filed of semiconductor sealing materials as far as moldability in the sealing step and reliability of the semiconductor device do not deteriorate.

The epoxy resin composition containing the halogen-free flame retardant (C) substantially contains no halogen atom, but may contain a trace amount (5000 ppm or less) of halogen atom of impurities derived from epihalohydrin contained in the epoxy resin.

Examples of the halogen-free flame retardant (C) include, but are not limited to, phosphorus-based flame retardant, nitrogen-based flame retardant, silicone-based flame retardant, inorganic flame retardant and organic metal salt-based flame retardant. These flame retardants may be used alone or the same kinds of flame retardants may be used in combination, or different kinds of flame retardants may be used in combination.

Examples of the phosphorus-based flame retardant include, but are not limited to, inorganic and organic compounds. Examples of the inorganic compound include ammonium phosphates such as red phosphorus, monoammonium phosphate, deiammonium phosphate, triammonium phosphate and ammonium polyphosphate; and inorganic nitrogen-containing phosphorus compounds such as phosphoric acid amide.

The red phosphorus is preferably subjected to a surface treatment for the purpose of preventing hydrolysis. Examples of the surface treatment method include (i) a method of coating with an inorganic compound such as magnesium hydroxide, aluminum hydroxide, zinc hydroxide, titanium hydroxide, bismuth oxide, bismuth hydroxide, bismuth nitrate or a mixture thereof, (ii) a method of coating with an inorganic compound, such as magnesium hydroxide, aluminum hydroxide, zinc hydroxide or titanium hydroxide, and a mixture of a thermosetting resin such as phenol resin, and (iii) a method of double-coating a coating film made of an inorganic compound such as magnesium hydroxide, aluminum hydroxide, zinc hydroxide or titanium hydroxide with a thermosetting resin such as phenol resin.

Examples of the organic phosphorus-based compound include commodity organic phosphorus-based compounds such as phosphoric acid ester compound, phosphonic acid compound, phosphinic acid compound, phosphine oxide compound, phosphorane compound and organic nitrogen-containing phosphorus compound; cyclic organic phosphorus compounds such as 9,10-dihydro-9-oxa-10-phosphaphenanthrene=10-oxide, 10-(2,5-dihydrooxyphenyl)-10H-9-oxa-10-phosphaphenanthrene=10-oxide and 10-(2,7-dihydrooxynaphthyl)-10H-9-oxa-10-phosphaphenanthrene=10-oxide; and derivatives obtained by reacting these compounds with a compound such as epoxy resin or phenol resin.

Each amount is appropriately selected according to the kind of the phosphorus-based flame retardant, other components of the epoxy resin composition and the degree of desired flame retardancy. When the red phosphorus is used as the halogen-free flame retardant, the amount is preferably within a range from 0.1 to 2.0 parts by weight based on 100 parts by weight of the epoxy resin composition containing an epoxy resin, a curing agent, a halogen-free flame retardant and other fillers and additives. When using the organic phosphorus compound, the amount is preferably within a range from 0.1 to 10.0 parts by weight, and particularly from 0.5 to 6.0 parts by weight.

When using the phosphorus-based flame retardant, the phosphorus-based flame retardant may be used in combination with hydrotalcite, magnesium hydroxide, boride compound, zirconium oxide, black dye, calcium carbonate, zeolite, zinc molybdate and active carbon.

Examples of the nitrogen-based flame retardant include triazine compound, cyanuric acid compound, isocyanuric acid compound and phenothiazine, and triazine compound, cyanuric acid compound and isocyanuric acid compound are preferable.

Examples of the triazine compound include melamine, acetoguanamine, benzoguanamine, melon, melum, succinoguanamine, ethylenedimelamine, polyphosphoric acid-melamine, triguanamine, (i) aminotriazine sulfate compounds such as guanylmelamine sulfate, melem sulfate and melam sulfate, (ii) cocondensates of phenols such as phenol, cresol, xylenol, butylphenol and nonylphenol with melamines and formaldehyde such as melamine, benzoguanamine, acetoguanamine and formguanamine, (iii) mixtures of the cocondensates (ii) and phenol resins such as phenol-formaldehyde condensate, and (iv) compounds obtained by modifying the compounds (ii) and (iii) with tung oil or isomerized linseed oil.

Specific examples of the cyanuric acid compound include cyanuric acid and cyanuric acid melamine The amount of the nitrogen-based flame retardant is appropriately selected according to the kind of the nitrogen-based flame retardant, other components of the epoxy resin composition and the degree of desired flame retardancy. The amount is preferably within a range from 0.05 to 10 parts by weight, and particularly preferably from 0.1 to 5 parts by weight, based on 100 parts by weight of the epoxy resin composition containing an epoxy resin, a curing agent, a halogen-free flame retardant and other fillers and additives.

When using the nitrogen-based flame retardant, a metal hydroxide and a molybdenum compound may be used in combination.

The silicone-based flame retardant is not specifically limited as far as it is an organic compound containing a silicon atom, and examples thereof include silicone oil, silicone rubber and silicone resin.

The amount of the silicone-based flame retardant is appropriately selected according to the kind of the silicone-based flame retardant, other components of the epoxy resin composition and the degree of the flame retardancy. The amount is preferably within a range from 0.05 to 20 parts by weight based on 100 parts by weight of an epoxy resin composition containing an epoxy resin, a curing agent, a halogen-free flame retardant and other fillers and additives. When using the silicone-based flame retardant, a molybdenum compound and alumina may be used in combination.

Examples of the inorganic flame retardant include metal hydroxide, metal oxide, metal carbonate compound, metal powder, boron compound and low-melting glass.

Specific examples of the metal hydroxide include aluminum hydroxide, magnesium hydroxide, dolomite, hydrotalcite, calcium hydroxide, barium hydroxide and zirconium oxide.

Specific examples of the metal oxide include zinc molybdate, molybdenum trioxide, zinc stannate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide and tungsten oxide.

Specific examples of the metal carbonate compound include zinc carbonate, magnesium carbonate, calcium carbonate, barium carbonate, basic magnesium carbonate, aluminum carbonate, iron carbonate, cobalt carbonate and titanium carbonate.

Specific examples of the metal powder include powders of aluminum, iron, titanium, manganese, zinc, molybdenum, cobalt, bismuth, chromium, nickel, copper, tungsten and tin.

Specific examples of the boron compound include zinc borate, zinc metaborate, barium metaborate, boric acid and borax.

Specific examples of the low-melting glass include glassy compounds such as Sea Pree (Bokusui brown Co.), hydrated glass $SiO_2$—$MgO$—$H_2O$, $PbO$—$B_2O_3$ compound, $ZnO$—$P_2O_5$—$MgO$ compound, $P_2O_5$—$B_2O_3$—$PbO$—$MgO$ compound, P—Sn—O—F compound, $PbO$—$V_2O_5$—$TeO_2$ compound, $Al_2O_3$—$H_2O$ compound and lead borosilicate.

The amount of the inorganic flame retardant is appropriately selected according to the kind of the inorganic flame retardant, other components of the epoxy resin composition and the degree of flame retardancy. The amount is preferably within a range from 0.05 to 20 parts by weight, and particularly preferably from 0.5 to 15 parts by weight, based on 100 parts by weight of the epoxy resin composition containing an epoxy resin, a curing agent, a halogen-free flame retardant and other fillers and additives.

Examples of the organic metal salt-based flame retardant include ferrocene, acetylacetonate metal complex, organic metal carbonyl compound, organic cobalt salt compound, organic sulfonic acid metal salt, and compound in which a metal atom and an aromatic compound or a heterocyclic compound are ionic-bonded or coordinate-bonded.

The amount of the organic metal salt-based flame retardant is appropriately selected according to the kind of the organic metal salt-based flame retardant, other components of the epoxy resin composition and the degree of flame retardancy. The amount is preferably within a range from 0.005 to 10 parts by weight based on 100 parts by weight of the epoxy resin composition containing an epoxy resin, a curing agent, a halogen-free flame retardant and other fillers and additives.

If necessary, the epoxy resin of the present invention composition can contain inorganic fillers. Examples of the inorganic filler include fused silica, crystalline silica, alumina, silicon nitride and aluminum hydroxide. When the amount of the inorganic filler is particularly increased, fused silica is preferably used. Ground or spherical fused silica may be used. In order to increase the amount of the fused silica and to suppress an increase in melt viscosity of a molding material, spherical fused silica is preferably used. In order to increase the amount of the spherical silica, particle size distribution of the spherical silica is preferably adjusted. The filling ratio is preferably high in view of flame retardancy and is particularly preferably 65% by weight or higher based on the total amount of the epoxy resin composition. When used for a conductive paste, conductive fillers such as silver powder and copper powder can be used.

To the epoxy resin composition (I) or (II) of the present invention, various compounding agents such as silane coupling agents, releasants, pigments and emulsifiers can be added, if necessary.

The epoxy resin composition (I) or (II) of the present invention can be obtained by uniformly mixing the respective components described above. The epoxy resin of the present invention, which contains an epoxy resin of the present invention, a curing agent and, if necessary, a curing accelerator, can be easily converted into a cured article by the same method as that which has conventionally been known. Examples of the cured article include molded cured articles such as laminated article, casted article, adhesive layer, coating film and film.

Examples of the application of the epoxy resin of the present invention composition include coating materials such as semiconductor sealing materials, resin compositions used for laminate and electronic circuit board, resin casting materials, adhesives, interlayer insulation materials for build-up substrate and insulating coating materials. The epoxy resin is preferably used for semiconductor sealing materials.

In order to produce an epoxy resin composition for semiconductor sealing material, an epoxy resin and compounding agents such as curing agent and filler are well mixed uniformly using an extruder, a kneader or a roll to obtain a melt-mixing type epoxy resin composition. In that case, silica is usually used as the filler. The filling ratio of the filler is preferably within a range from 30 to 95% by weight based on 100 parts by weight of the epoxy resin composition, and is particularly preferably 70 parts by weight or more so as to improve flame retardancy, moisture resistance and solder cracking resistance and to decrease a linear expansion coefficient. When the filling ratio of the filler is 80 parts by weight or more, the effect is further enhanced. Semiconductor package molding is conducted by a method comprising casting or molding the composition using a transfer molding machine or an injection molding machine and heating at 50 to 200° C. fro 2 to 10 hours to obtain a semiconductor device as a molded article.

In order to convert the epoxy resin of the present invention composition into a composition for printed circuit board, the epoxy resin can be converted into a resin composition for prepreg. It is possible to obtain the resin composition for prepreg without using a solvent according to viscosity of the epoxy resin composition. However, the resin composition for prepreg is preferably obtained by preparing a varnish using an organic solvent. As the organic solvent, polar solvents having a boiling point of 160° C. or lower such as methyl ethyl ketone, acetone and dimethylformamide are preferably used. These solvents can be used alone or in combination. A prepreg as the cured article can be obtained by impregnating various reinforcement base materials such as paper, glass cloth, glass nonwoven fabric, aramid paper, aramid cloth, glass mat and glass lobing cloth with the resulting varnish and heating to a heating temperature suited for the kind of the solvent, preferably 50 to 170° C. A weight ratio of the resin composition to the reinforcement base material is not specifically limited and the resin content in the prepreg is preferably controlled within a range form 20 to 60% by weight. When a copper-cladded laminate is produced by using the epoxy resin composition, the copper-cladded laminate is obtained by laminating the prepregs thus obtained using a conventional method, appropriately laying a copper foil thereon and contact-bonding them with heating at 170 to 250° C. under pressure of 1 to 10 MPa for 10 minutes to 3 hours.

When the epoxy resin of the present invention composition is used as a resist ink, there can be used a method comprising using a cationic polymerization catalyst as a curing agent of the epoxy resin composition (II), adding a pigment, a talc and a filler to obtain a composition for resist ink and applying the composition on a printed board using a screen printing system to obtain a resist ink cured article.

When the epoxy resin of the present invention composition is used as a conductive paste, there can be used a method comprising dispersing fine conductive particles in an epoxy resin composition to obtain a composition for anisotropic conductive layer, and a method comprising converting into a paste resin composition or an anisotropic conductive adhesive, which is liquid at normal temperature.

An interlayer insulation material for build-up substrate is obtained from the epoxy resin of the present invention composition by the following procedure. That is, the curable resin composition containing a rubber and a filler is applied on a wiring board with a circuit formed thereon using a spray coating method or a curtain coating method and then cured. If necessary, the wiring board is provided with predetermined through holes, treated with a roughening agent, washed with hot water to form unevenness on the surface, and then subjected to a plating treatment using metal such as copper. The plating method is preferably an electroless plating or electrolytic plating method, and examples of the roughening agent include oxidizing agent, alkali and organic solvent. A build-up substrate can be obtained by optionally repeating such an operation and alternately building-up resin insulating layers and conductive layers having a predetermined circuit pattern. Through holes are formed after forming an outermost resin insulating layer. When a copper foil with a resin obtained by semicuring the resin composition on the copper foil is contact-bonded on a wiring board with a circuit formed thereon with heating at 170 to 250° C. to form a roughened surface, a build-up substrate can be produced without being subjected to the step of a plating treatment.

A cured article of the present invention may be obtained by a conventional method of curing an epoxy resin composition. The heating temperature conditions may be appropriately selected according to the kind and application of curing agents to be used in combinations, and the composition obtained by the above method may be heated within a range from room temperature to about 250° C. As the molding method, a conventional method of molding an epoxy resin composition is used and conditions peculiar to the epoxy resin of the present invention composition are not required.

Therefore, it is possible to obtain an environmentally safe epoxy resin material capable of exhibiting high flame retardancy without using a halogen-based flame retardant by using the phenol resin. Excellent dielectric characteristics can realize high operation speed of a high frequency device. The phenol resin can be efficiently produced by the method of the present invention, and enables molecular design according to the level of the above objective performances.

EXAMPLES

The present invention will now be described by way of examples and comparative examples. In the following examples, parts and percentages are by weight unless otherwise specified. Melt viscosity at 150° C., GPC, NMR and MS spectrum were measured under the following conditions.
1) Melt viscosity at 150° C.: according to ASTM D4287
2) Softening point measuring method: JIS K7234
3) GPC:
   Apparatus: HLC-8220 GPC manufactured by Tosoh Corporation, Column: TSK-GEL G2000HXL+G2000HXL+G3000HXL+G4000HXL manufactured by Tosoh Corporation
   Solvent: tetrahydrofuran
   Flow rate: 1 ml/min
   Detector: RI
4) NMR: NMR GSX270 manufactured by JEOL, Ltd.
5) MS: double focusing type mass spectrograph AX505H (FD505H) manufactured by JEOL, Ltd.

Example 1

Synthesis of Phenol Resin (A-1)

In a flask equipped with a thermometer, a cooling tube, a distilling tube, a nitrogen gas introducing tube and a stirrer, 125.2 g (1.33 mols) of phenol, 72.5 g (0.67 mols) of anisole and 166.2 g (1.00 mols) of paraxylene dimethoxide were charged and 3.6 g (0.038 mols) of methanesulfonic acid was added. After heating to 150° C., the mixture was reacted for 2 hours while collecting methanol as by-product using a distilling tube. After the completion of the reaction, 1500 g of methyl isobutyl ketone was further added and the reaction solution was transferred to a separatory funnel and then washed with water. After washing with water until rinse water is neutralized, unreacted phenol, anisole and methyl isobutyl ketone were removed from the organic layer under reduced pressure to obtain 226 g of a phenol resin (A-1) having a structural unit represented by the following structural formula.

[Chemical Formula 20]

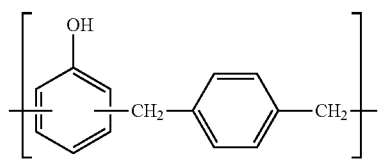

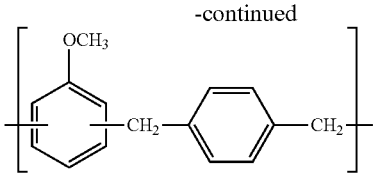

Figure 2:
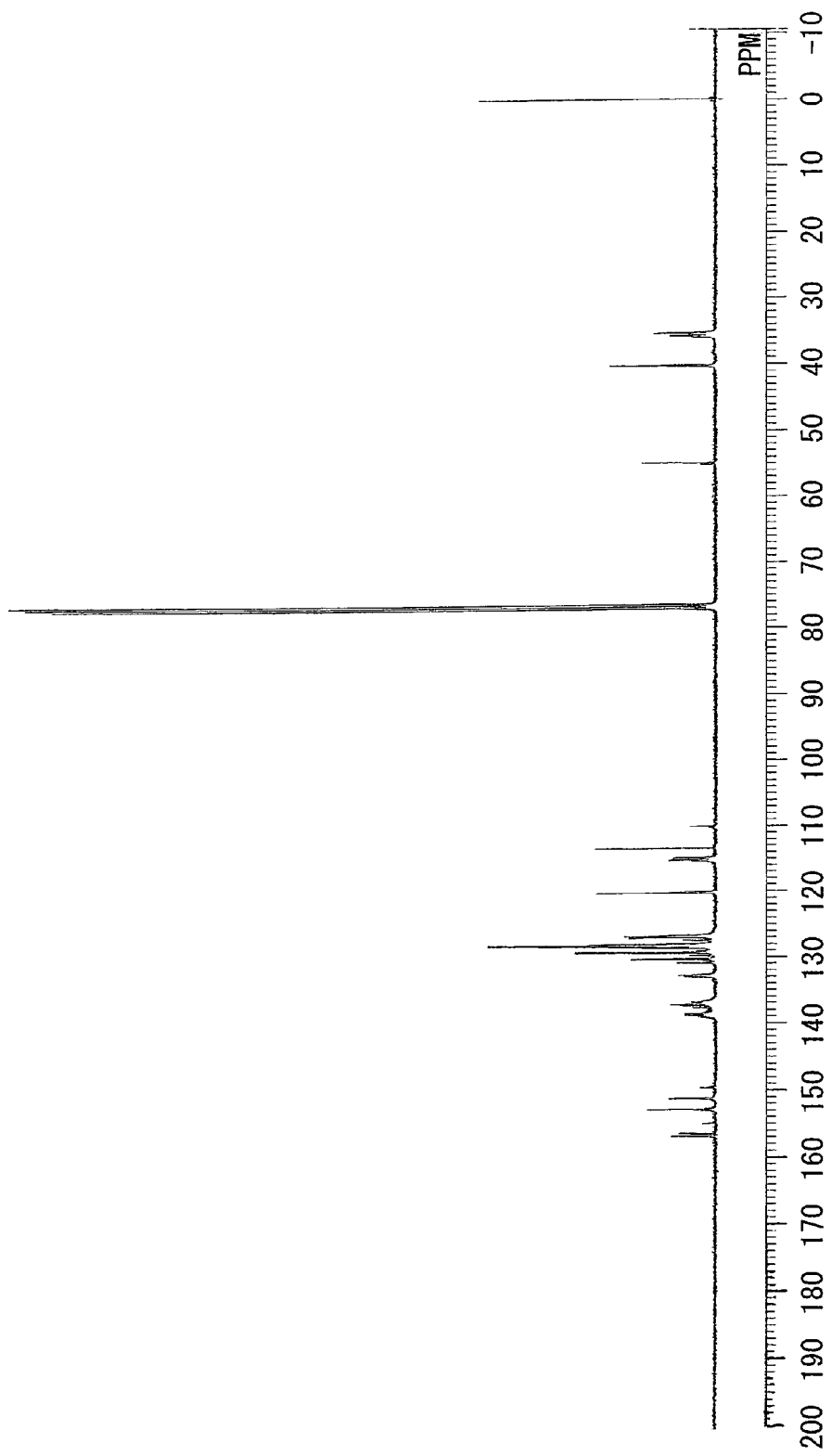
FIG. 2 is a graph showing a $^{13}$C-NMR spectrum of a phenol resin obtained in Example 1.
Figure 3:
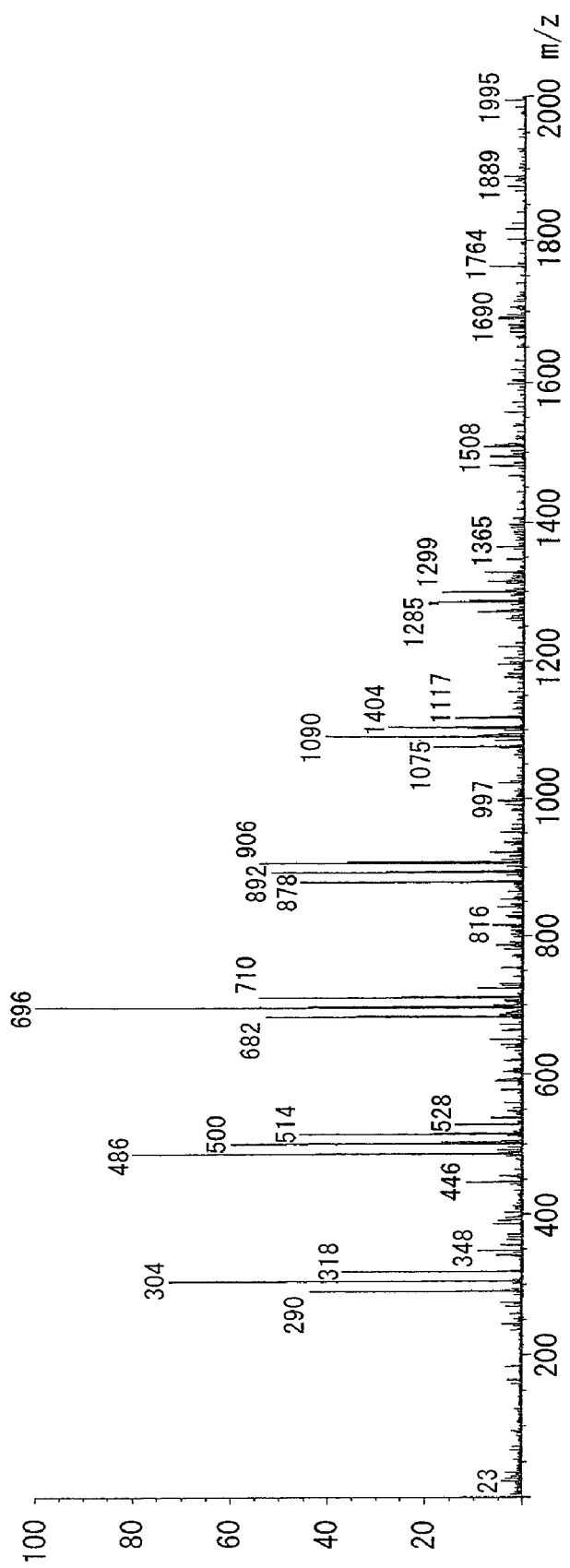
FIG. 3 is a graph showing a mass spectrum of a phenol resin obtained in Example 1.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 76/24. The resulting phenol resin had a softening point of 75° C. (B&R method), a melt viscosity (measuring method: ICI viscometer method, measuring temperature: 150° C.) of 3.9 dPa·s, and a hydroxyl group equivalent of 233 g/eq. A GPC chart of the resulting phenol resin is shown in FIG. 1, a $C^{13}$ NMR chart is shown in FIG. 2, and a MS spectrum is shown in FIG. 3. A signal assignable to a methoxy group observed at 55 ppm in NMR and a hydroxyl group equivalent revealed that the methoxy group in the compound is not decomposed.

Example 2

Synthesis of Phenol Resin (A-2)

In the same manner as in Example 1, except that the amount of phenol was replaced by 133.5 g (1.42 mols) and 72.5 g (0.67 mols) of anisole was replaced by 98.0 g (0.71 mols) of 1,2-dimethoxybenzene in Example 1, 254 g of a phenol resin (A-2) having a structural unit represented by the following structural formula was obtained.

[Chemical Formula 21]

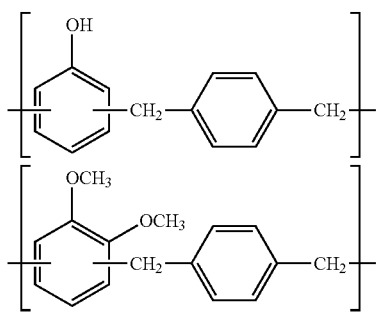

Figure 4:
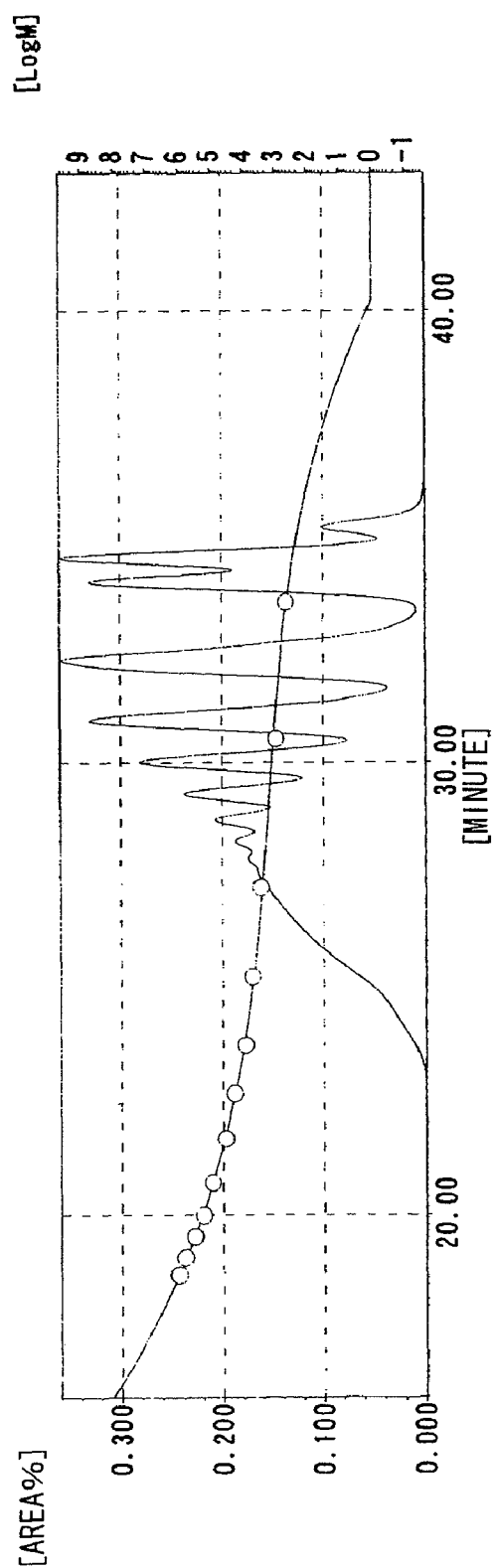
FIG. 4 is a graph showing a GPC chart of a phenol resin obtained in Example 2.
Figure 5:
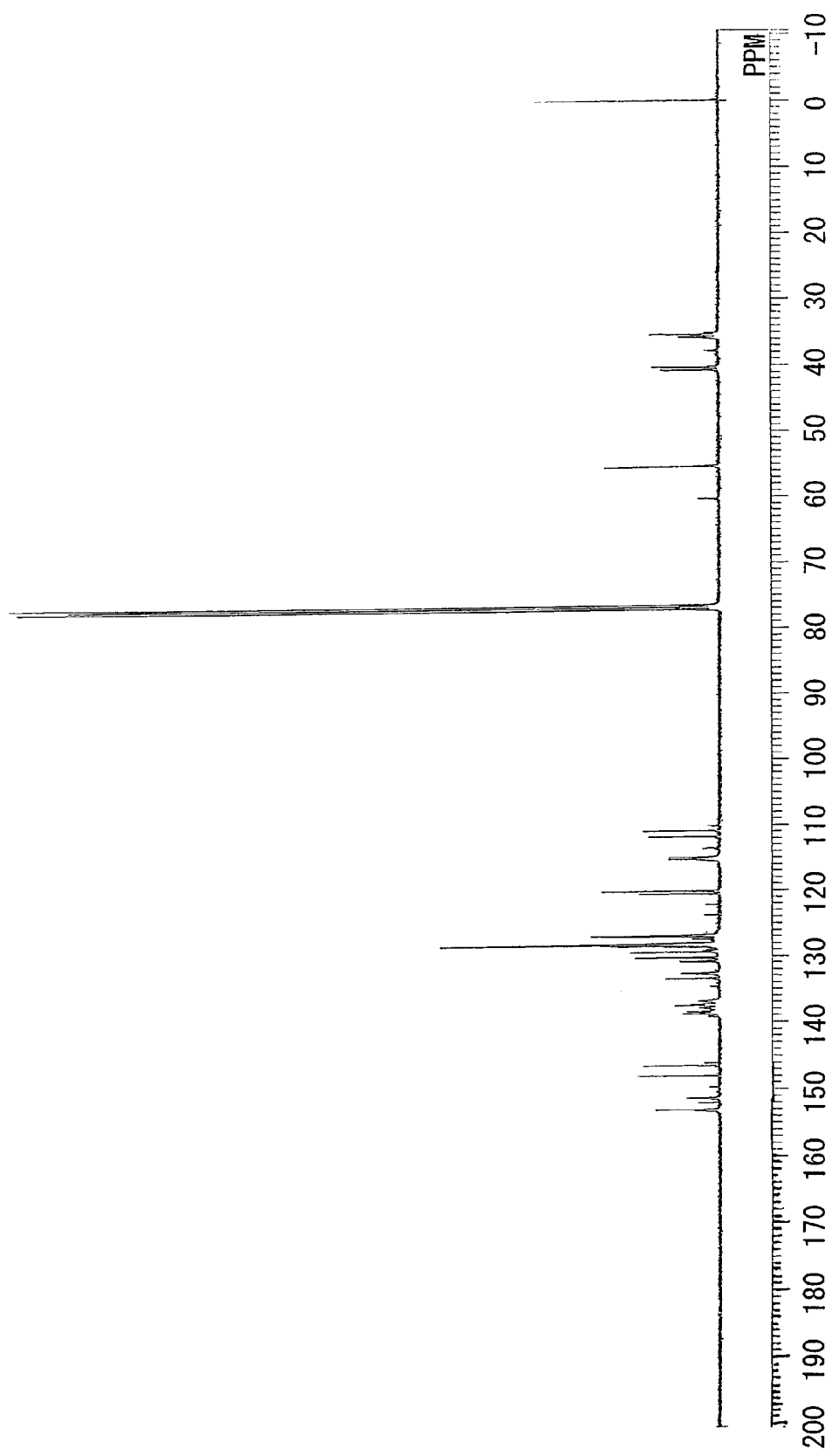
FIG. 5 is a graph showing a $^{13}$C-NMR spectrum of a phenol resin obtained in Example 2.
Figure 6:
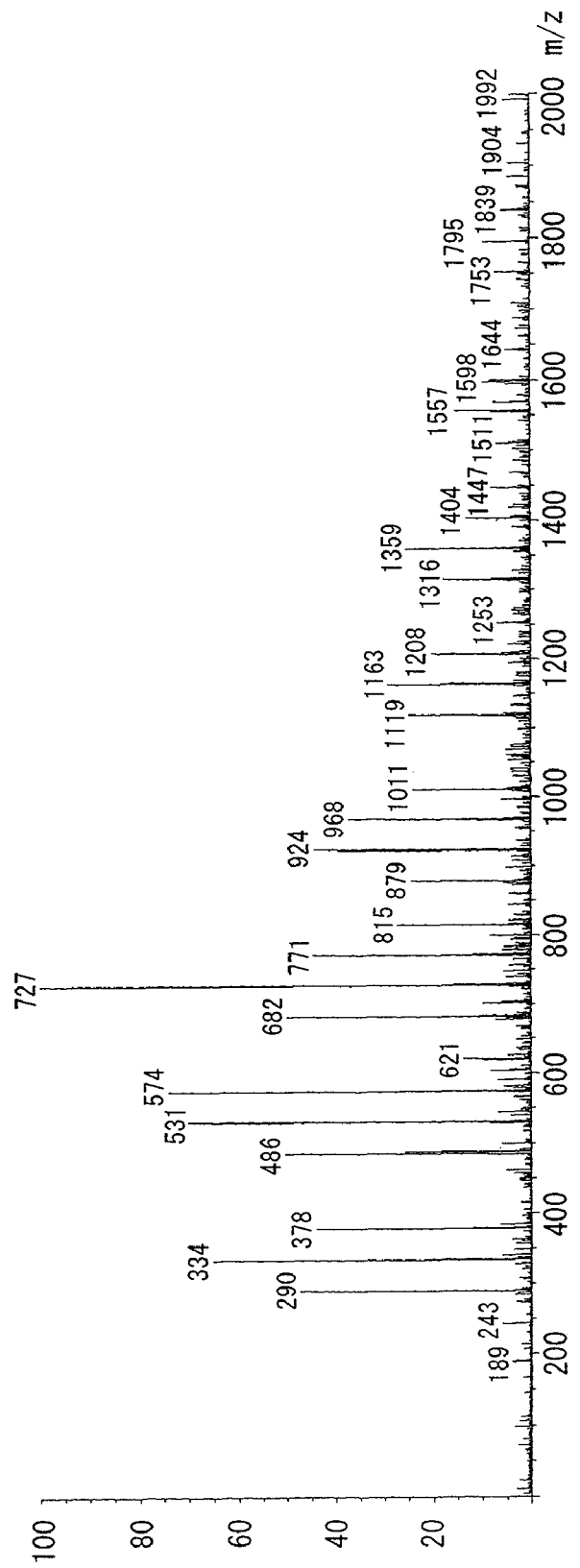
FIG. 6 is a graph showing a mass spectrum of a phenol resin obtained in Example 2.

As a result of the measurement results of the weight of the recovered unreacted phenol and 1,2-dimethoxybenzene, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 67/33. The resulting phenol resin had a softening point of 74° C. (B&R method), a melt viscosity (measuring method: ICI viscometer method, measuring temperature: 150° C.) of 2.6 dPa·s, and a hydroxyl group equivalent of 254 g/eq. A GPC chart of the resulting phenol resin is shown in FIG. 4, a $C^{13}$ NMR chart is shown in FIG. 5, and a MS spectrum is shown in FIG. 6. A signal assignable to a methoxy group observed at 55 ppm in NMR and a hydroxyl group equivalent revealed that the methoxy group in the compound is not decomposed.

Example 3

Synthesis of Phenol Resin (A-3)

In the same manner as in Example 1, except that 125.2 g (1.33 mols) of phenol was replaced by 143.8 g (1.33 mols) of o-cresol in Example 1, 239 g of a phenol resin (A-3) having a structural unit represented by the following structural formula was obtained.

[Chemical Formula 22]

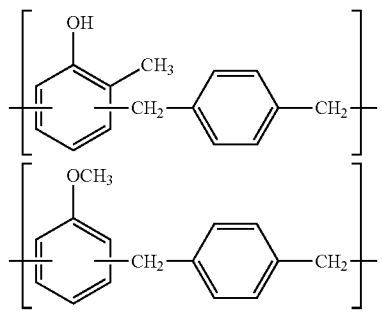

Figure 7:
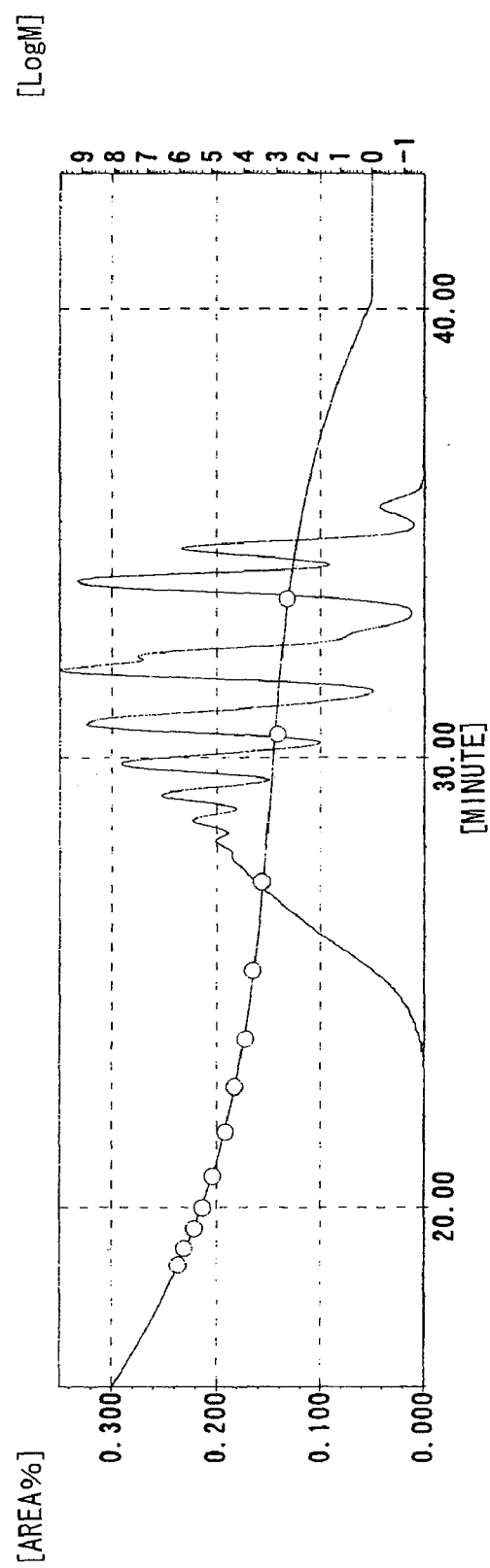
FIG. 7 is a graph showing a GPC chart of a phenol resin obtained in Example 3.
Figure 8:
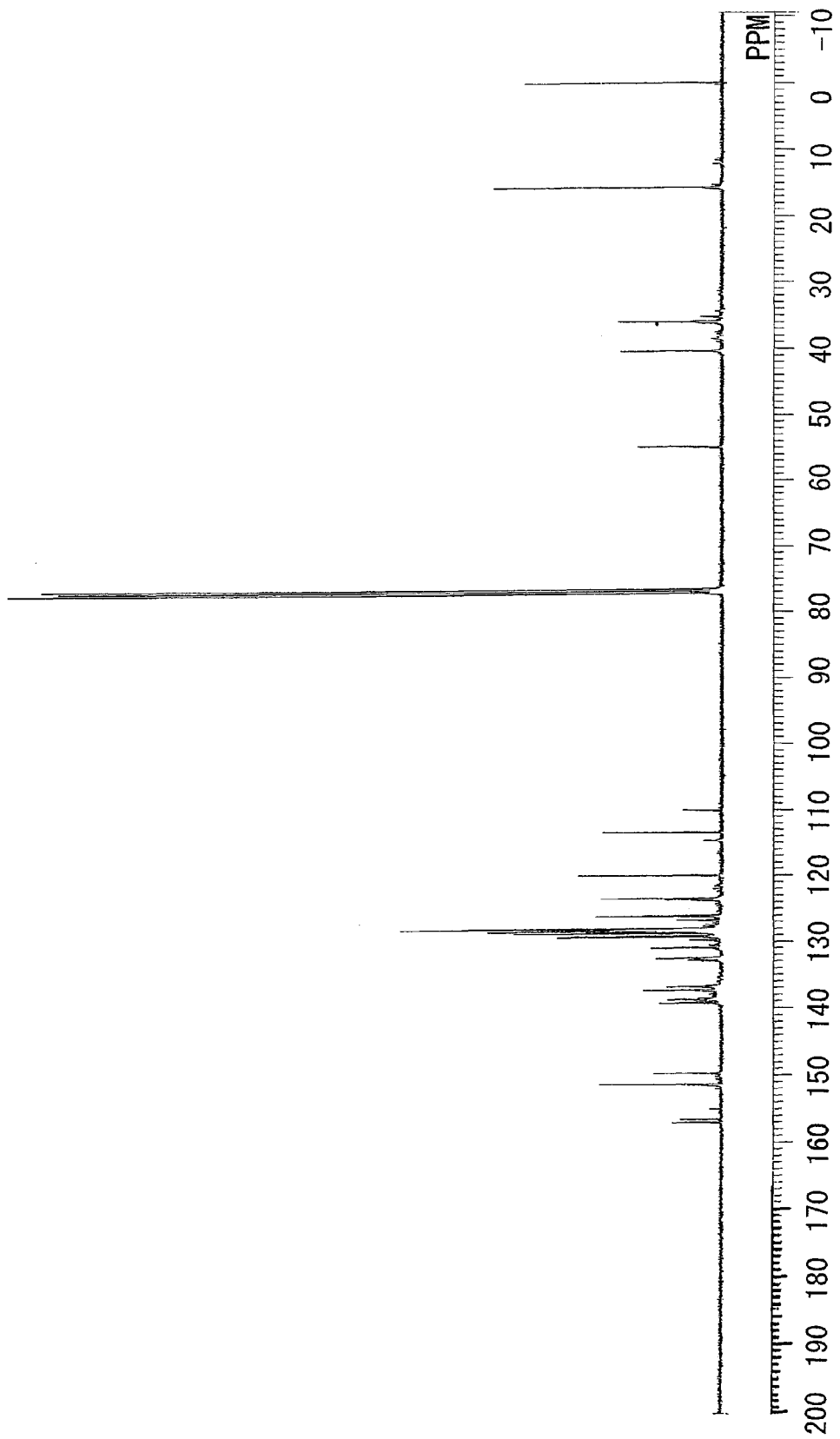
FIG. 8 is a graph showing a $^{13}$C-NMR spectrum of a phenol resin obtained in Example 3.
Figure 9:
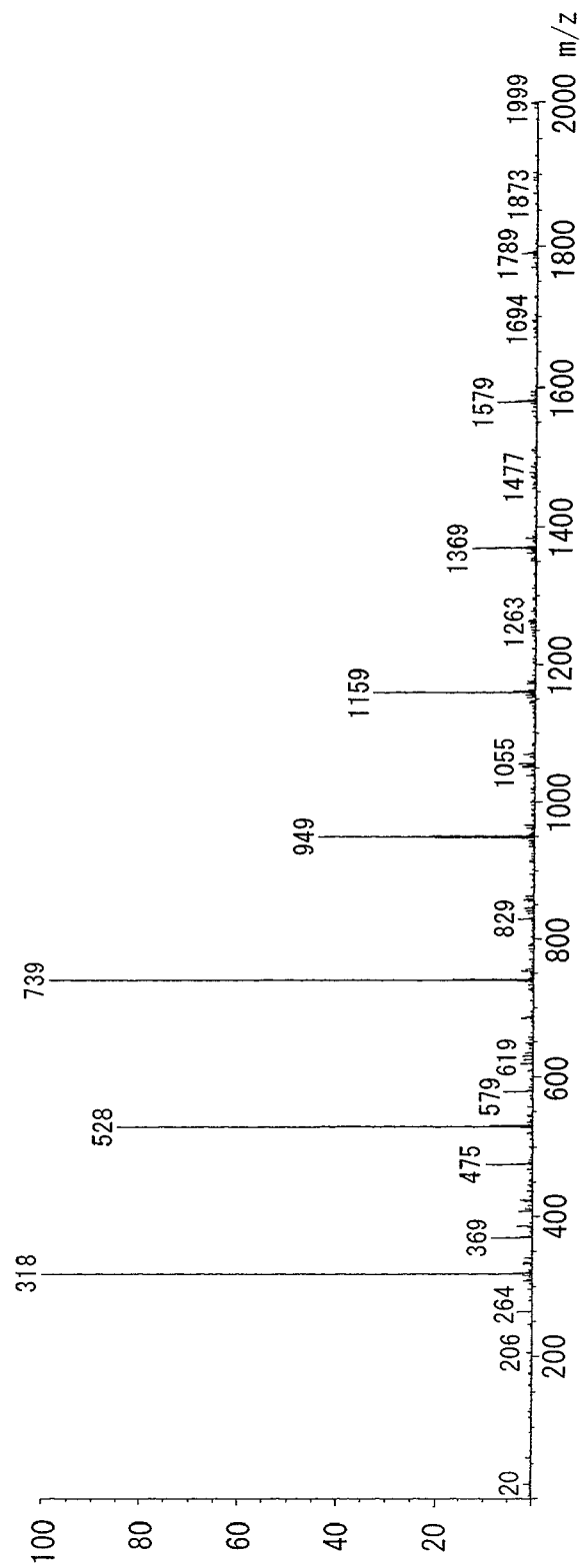
FIG. 9 is a graph showing a mass spectrum of a phenol resin obtained in Example 3.

As a result of the measurement results of the weight of the recovered unreacted o-cresol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 81/19. The resulting phenol resin had a softening point of 64° C. (B&R method), a melt viscosity (measuring method: ICI viscometer method, measuring temperature: 150° C.) of 1.2 dPa·s, and a hydroxyl group equivalent of 230 g/eq. A GPC chart of the resulting phenol resin is shown in FIG. 7, a $C^{13}$ NMR chart is shown in FIG. 8, and a MS spectrum is shown in FIG. 9. A signal assignable to a methoxy group observed at 55 ppm in NMR and a hydroxyl group equivalent revealed that the methoxy group in the compound is not decomposed.

Example 4

Synthesis of Phenol Resin (A-4)

In the same manner as in Example 1, except that 166.2 g (1.00 mols) of paraxylene dimethoxide was replaced by 242.3 g (1.00 mols) of 4,4'-bismethoxymethylbiphenyl in Example 1, 284 g of a phenol resin (A-4) having a structural unit represented by the following structural formula was obtained.

[Chemical Formula 23]

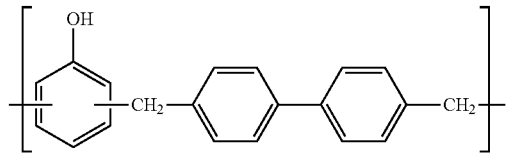

-continued

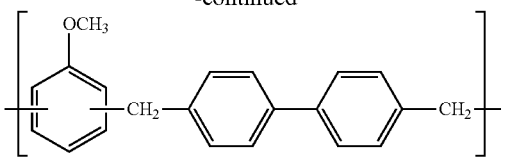

Figure 10:
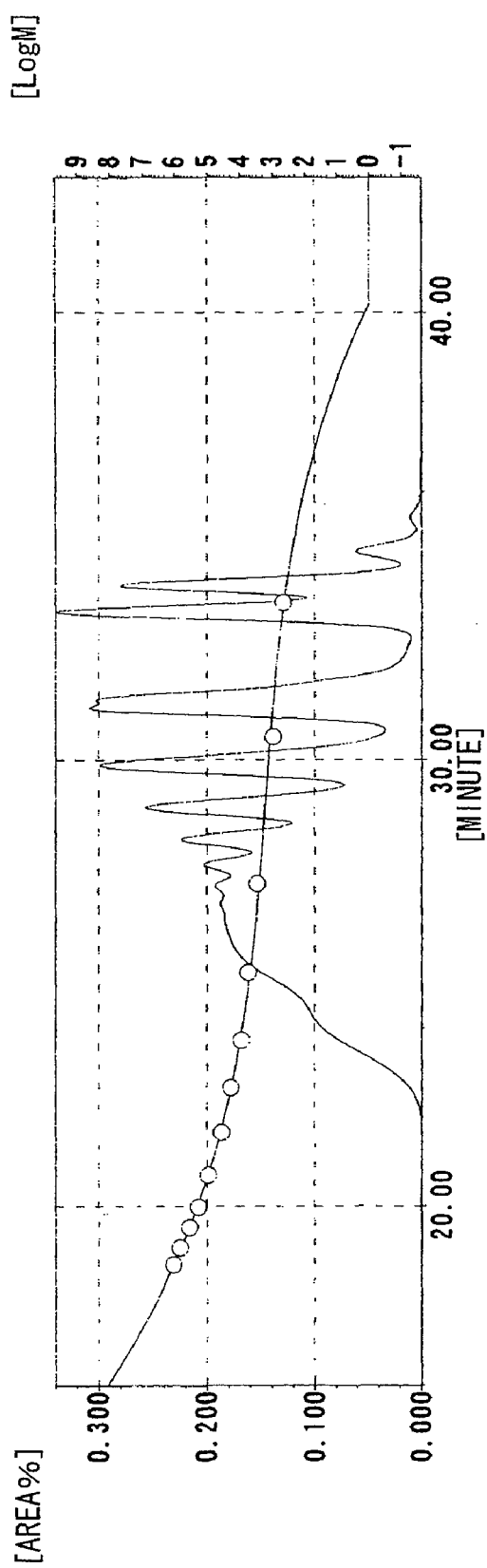
FIG. 10 is a graph showing a GPC chart of a phenol resin obtained in Example 4.
Figure 11:
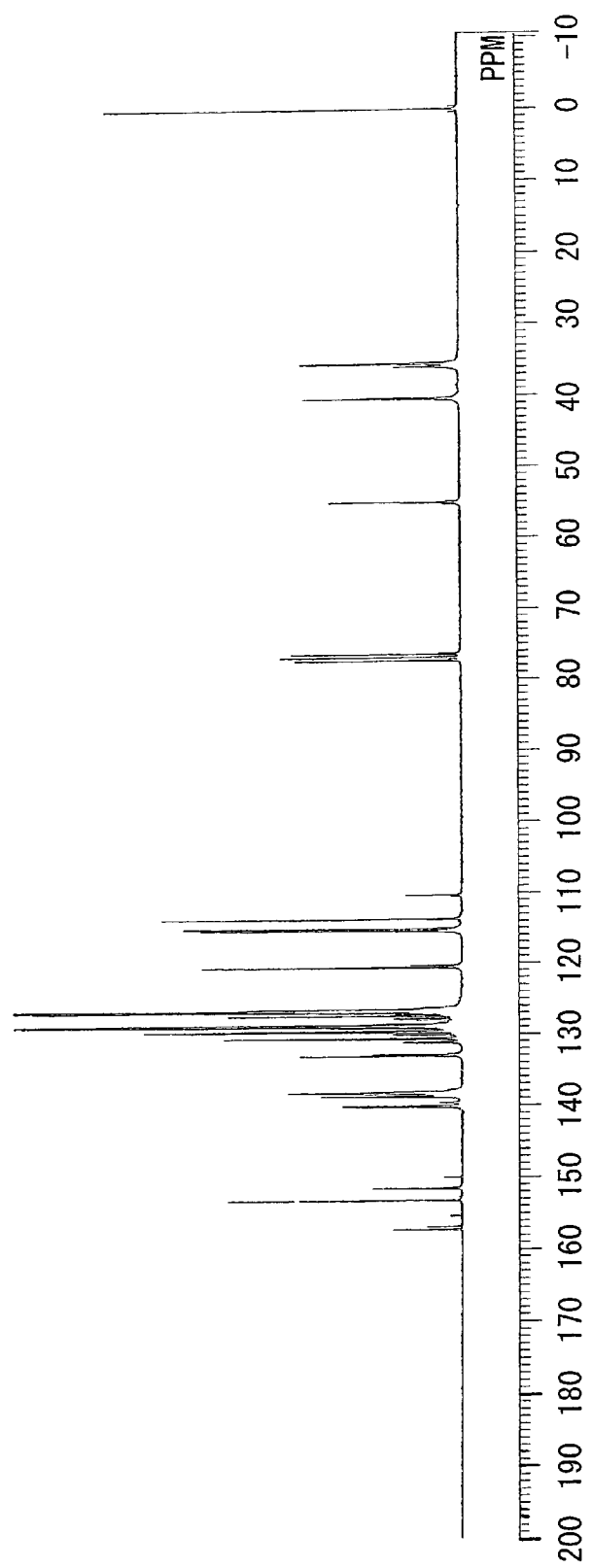
FIG. 11 is a graph showing a $^{13}$C-NMR spectrum of a phenol resin obtained in Example 4.
Figure 12:
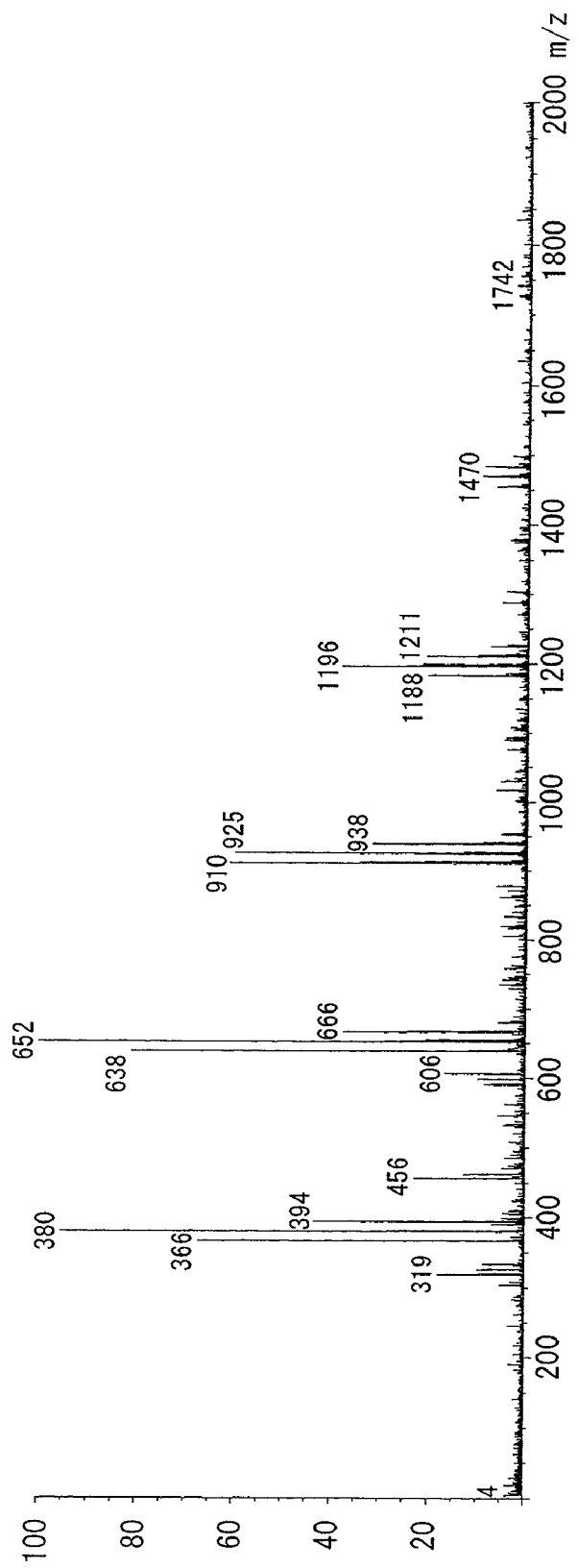
FIG. 12 is a graph showing a mass spectrum of a phenol resin obtained in Example 4.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 75/25. The resulting phenol resin had a softening point of 97° C. (B&R method), a melt viscosity (measuring method: ICI viscometer method, measuring temperature: 150° C.) of 21 dPa·s, and a hydroxyl group equivalent of 296 g/eq. A GPC chart of the resulting phenol resin is shown in FIG. 10, a $C^{13}$ NMR chart is shown in FIG. 11, and a MS spectrum is shown in FIG. 12. A signal assignable to a methoxy group observed at 55 ppm in NMR and a hydroxyl group equivalent revealed that the methoxy group in the compound is not decomposed.

Example 5

Synthesis of Phenol Resin (A-5)

In the same manner as in Example 1, except that the amount of phenol was replaced by 150.6 g (1.60 mols) and the amount of anisole was replaced by 43.2 g (0.40 mols) in Example 1, 190 g of a phenol resin (A-5) having a structural unit represented by the following structural formula was obtained.

[Chemical Formula 24]

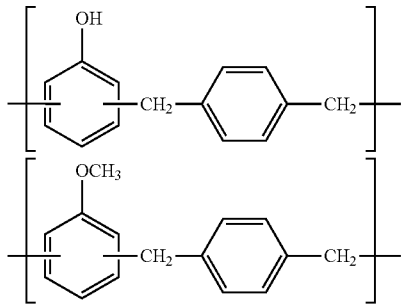

Figure 13:
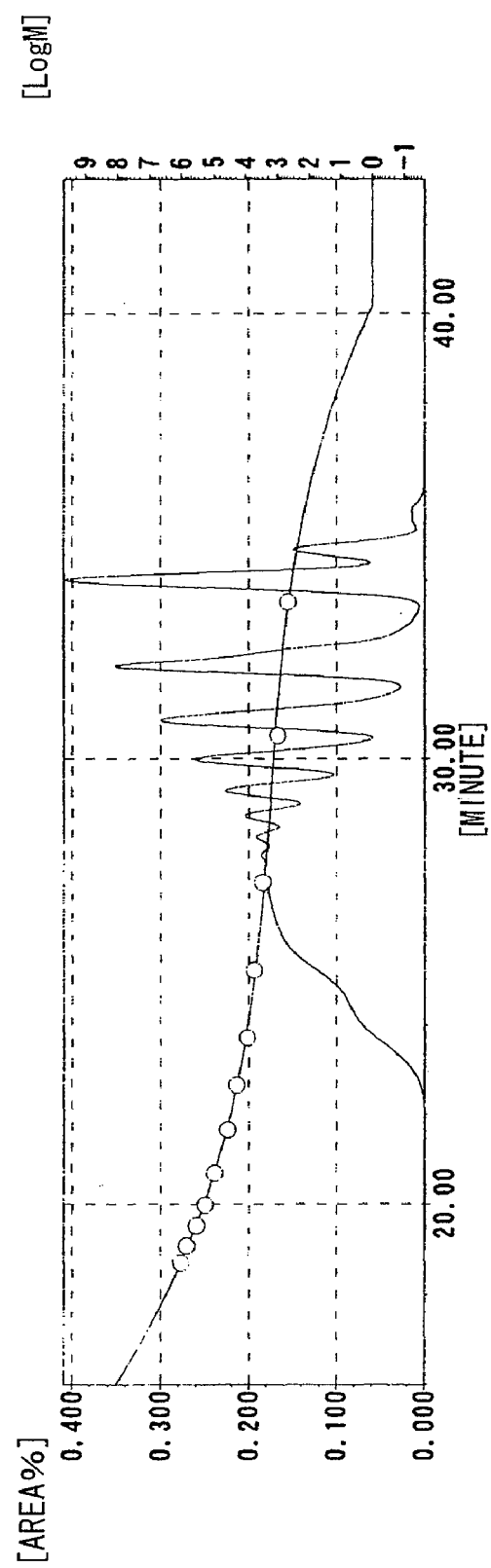
FIG. 13 is a graph showing a GPC chart of a phenol resin obtained in Example 5.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 79/21. The resulting phenol resin had a softening point of 75° C. (B&R method), a melt viscosity (measuring method: ICI viscometer method, measuring temperature: 150° C.) of 3.3 dPa·s, and a hydroxyl group equivalent of 202 g/eq. A GPC chart of the resulting phenol resin is shown in FIG. 13.

Example 6

Synthesis of Phenol Resin (A-6)

In the same manner as in Example 1, except that the amount of phenol was replaced by 94.1 g (1.00 mols) and the amount of anisole was replaced by 108.1 g (1.00 mols) in Example 1, 213 g of a phenol resin (A-6) having a structural unit represented by the following structural formula was obtained.

[Chemical Formula 25]

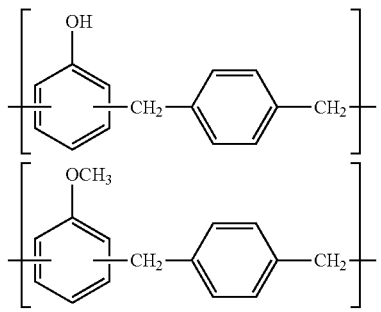

Figure 14:
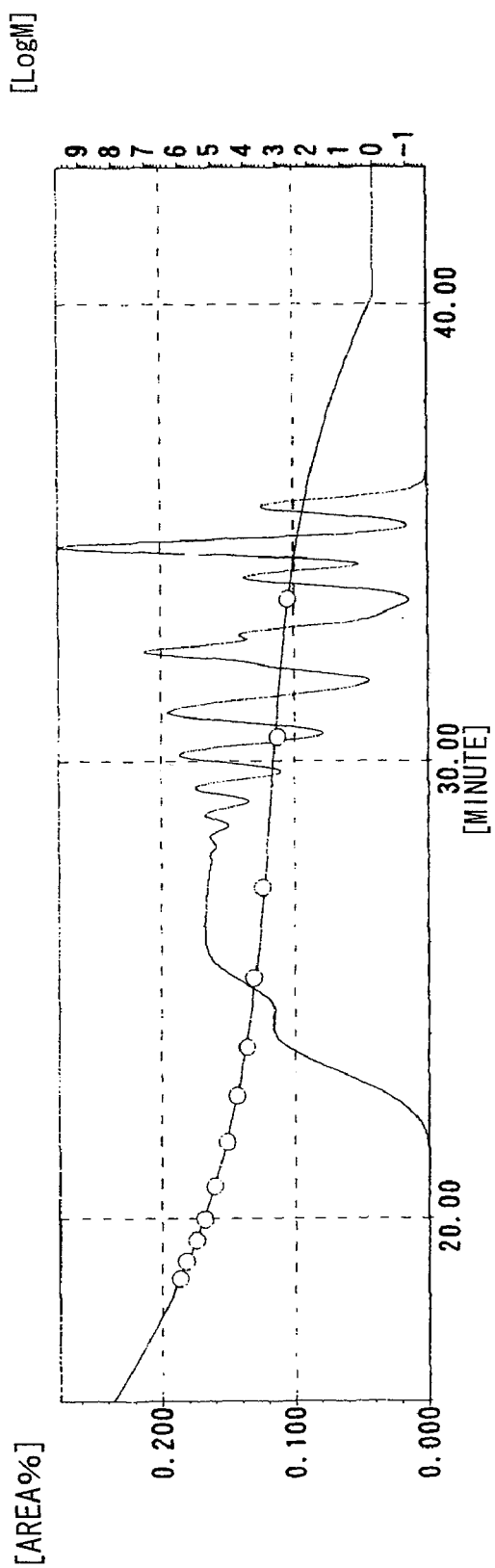
FIG. 14 is a graph showing a GPC chart of a phenol resin obtained in Example 6.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 53/47. The resulting phenol resin had a softening point of 76° C. (B&R method), a melt viscosity (measuring method: ICI viscometer method, measuring temperature: 150° C.) of 4.5 dPa·s, and a hydroxyl group equivalent of 279 g/eq. A GPC chart of the resulting phenol resin is shown in FIG. 14.

Example 7

Synthesis of Phenol Resin (A-7)

In the same manner as in Example 1, except that the amount of phenol was replaced by 313.4 g (3.33 mols), the amount of anisole was replaced by 180.5 (1.67 mols) and paraxylene dimethoxide was replaced by 242.3 g (1.00 mols) of 4,4'-bis(methoxymethyl)biphenyl in Example 1, 275 g of a phenol resin (A-7) having a structural unit represented by the following structural formula was obtained.

[Chemical Formula 26]

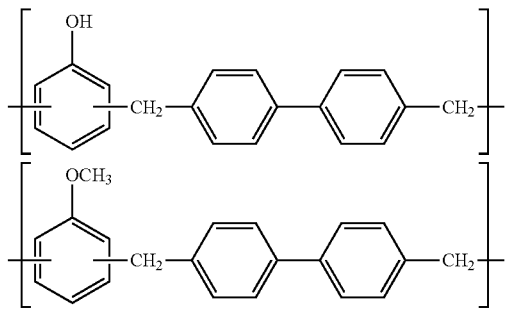

Figure 15:
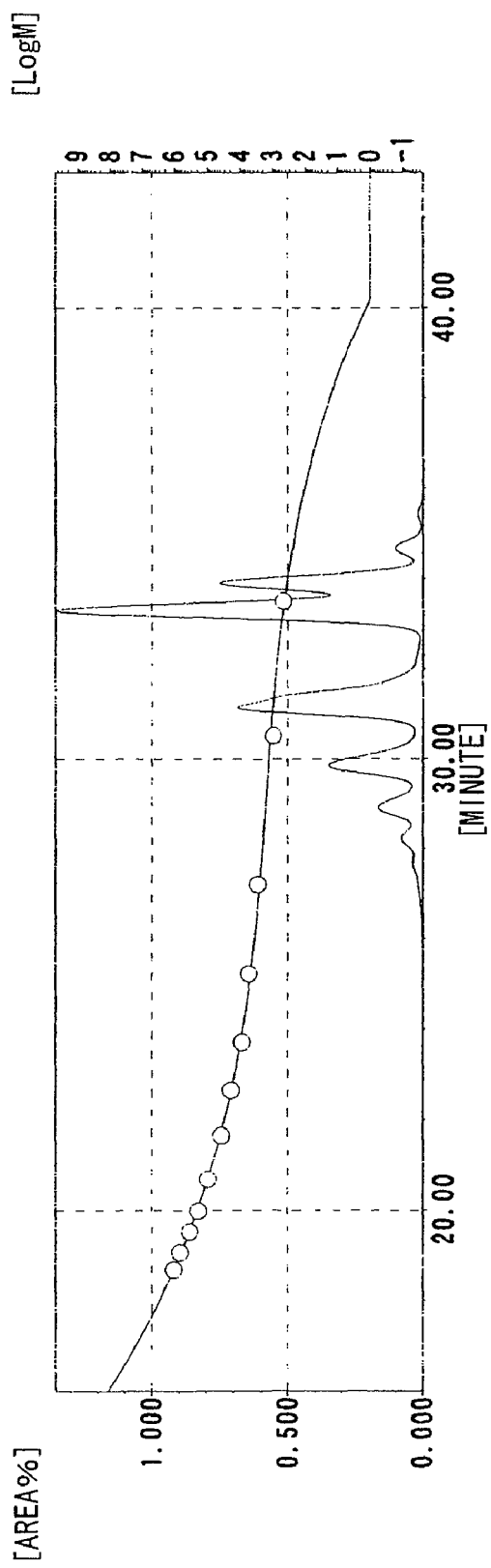
FIG. 15 is a graph showing a GPC chart of a phenol resin obtained in Example 7.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 84/16. The resulting phenol resin had a softening point of 58° C. (B&R method), a melt viscosity (measuring method: ICI viscometer method, measuring temperature: 150° C.) of 0.7 dPa·s, and a hydroxyl group equivalent of 257 g/eq. A GPC chart of the resulting phenol resin is shown in FIG. 15.

Example 8

Synthesis of Phenol Resin (A-8)

In a flask equipped with a thermometer, a cooling tube, a nitrogen gas introducing tube and a stirrer, 125.2 g (1.33 mols) of phenol, 72.5 g (0.67 mols) of anisole, 175.5 g (1.00 mols) of 1,4-di(chloromethyl)benzene and 23.7 g of an aqueous 36% HCl solution were charged and then reacted with stirring in a nitrogen gas flow at a temperature within a range from 70 to 120° C. over 2 hours while removing hydrogen chloride generated under heating out of the system. The reaction was further conducted at 140° C. for 2 hours. After the completion of the reaction, 1500 g of methyl isobutyl ketone was added and the reaction solution was transferred to a separatory funnel and then washed with water. After washing with water until rinse water is neutralized, unreacted phenol, anisole and methyl isobutyl ketone were removed from the organic layer under reduced pressure to obtain 226 g of a phenol resin (A-8) having a structural unit represented by the following structural formula.

[Chemical Formula 27]

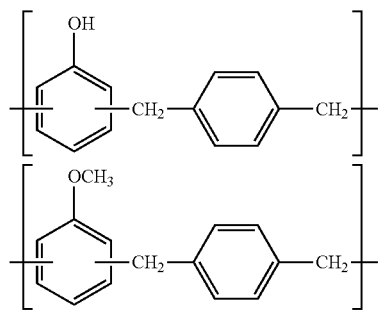

Figure 16:
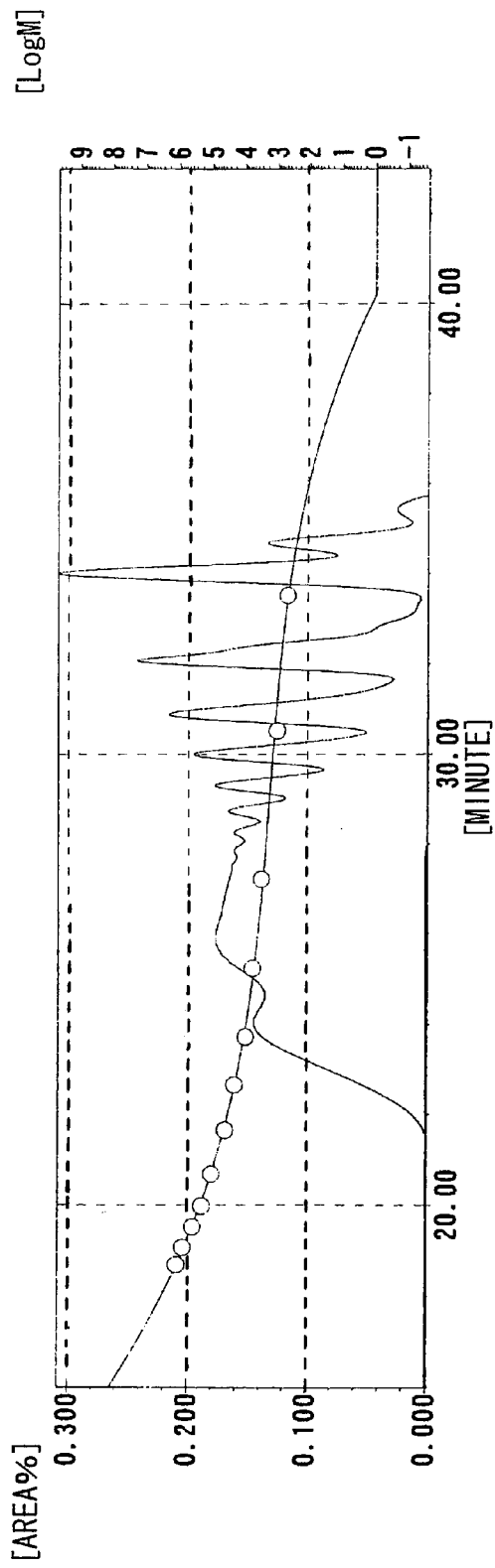
FIG. 16 is a graph showing a GPC chart of a phenol resin obtained in Example 8.

As a result of the measurement results of the weight of the recovered unreacted phenol and anisole, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 76/24. The resulting phenol resin had a softening point of 74° C. (B&R method), a melt viscosity (measuring method: ICI viscometer method, measuring temperature: 150° C.) of 3.8 dPa·s, and a hydroxyl group equivalent of 229 g/eq. A GPC chart of the resulting phenol resin is shown in FIG. 16.

Example 9

Synthesis of Phenol Resin (A-9)

In the same manner as in Example 1, except that the amount of phenol was replaced by 188.2 g (2.00 mols), 72.5 g (0.67 mols) of anisole was replaced by 79.1 g (0.50 mols) of 2-methoxynaphthalene, and 3.6 g of methanesulfonic acid was replaced by 4.3 g of paratoluenesulfonic acid in Example 1, 183 g of a phenol resin (A-9) having a structural unit represented by the following structural formula was obtained.

[Chemical Formula 28]

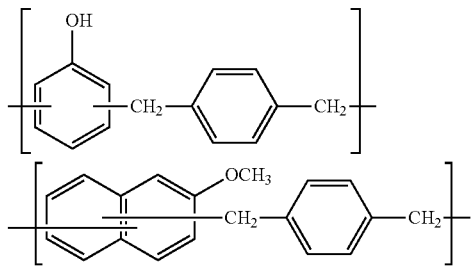

Figure 17:
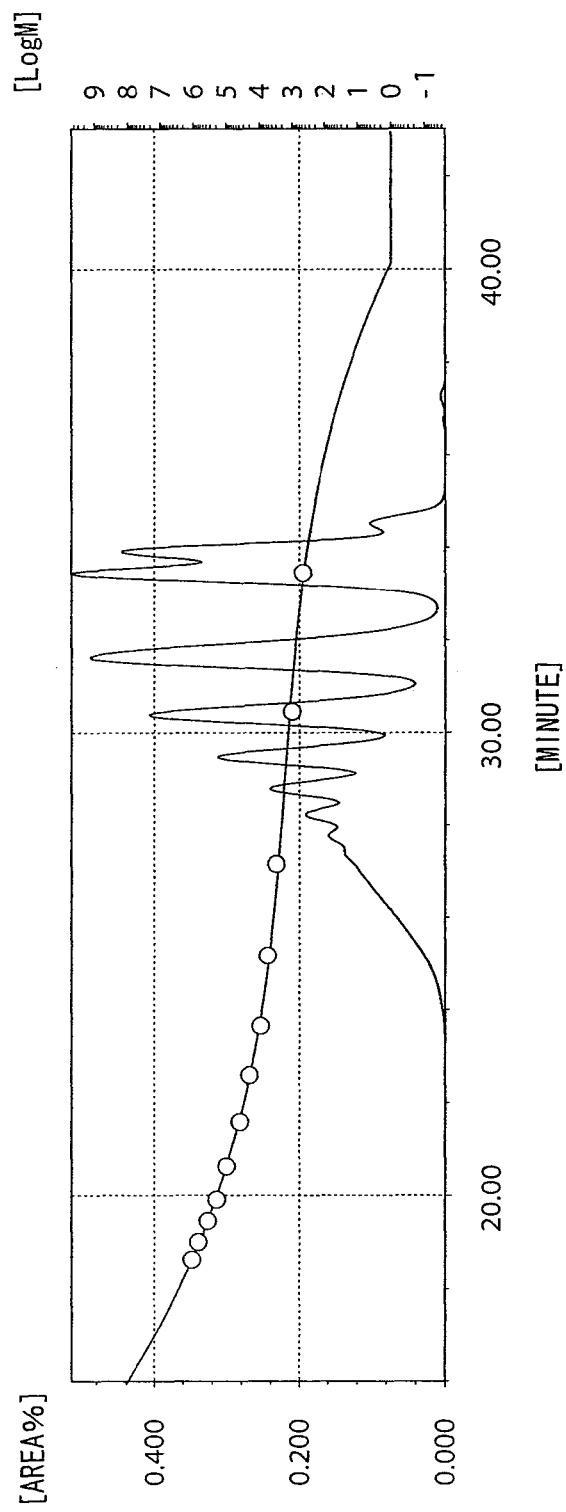
FIG. 17 is a graph showing a GPC chart of a phenol resin obtained in Example 9.
Figure 18:
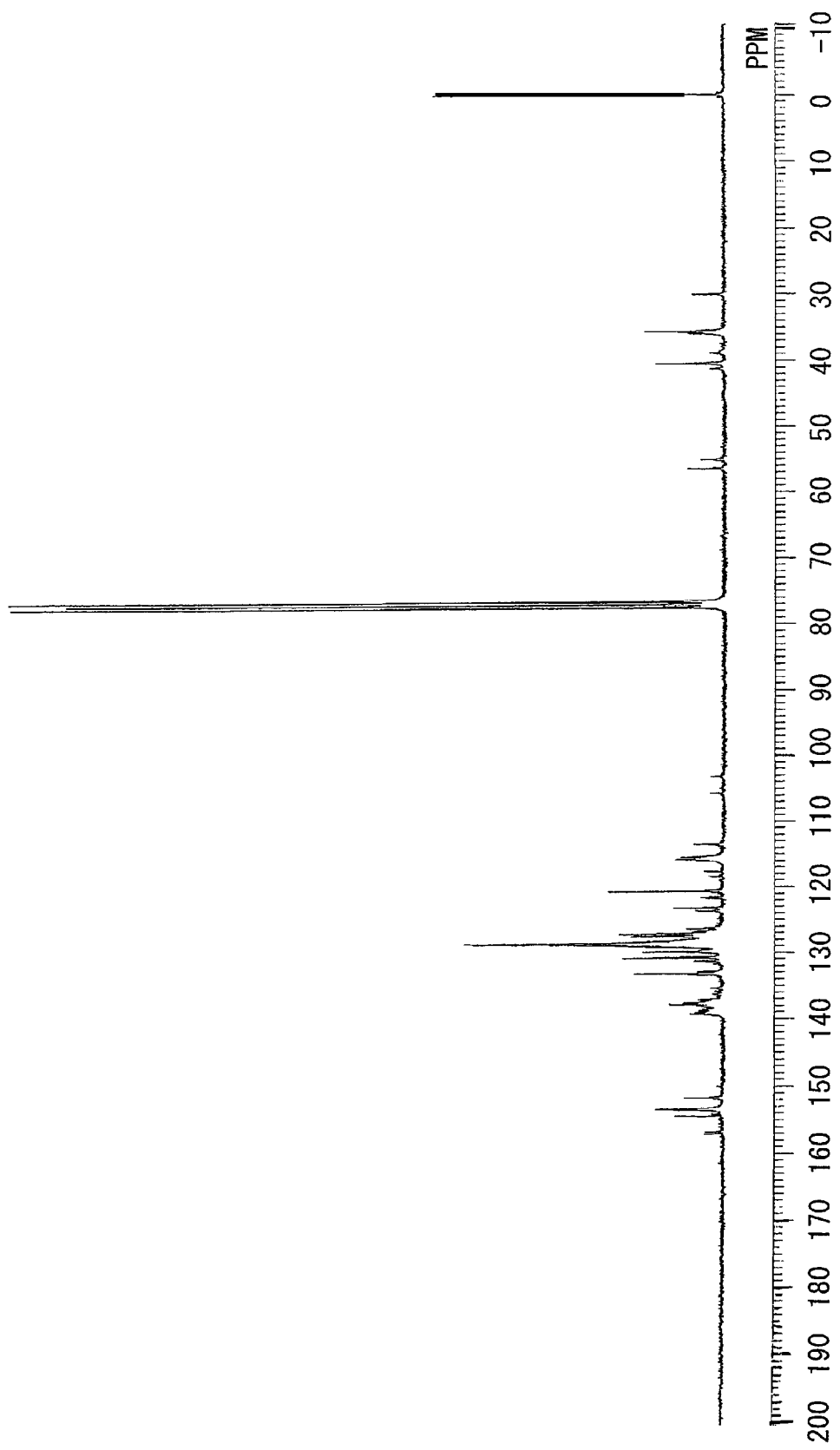
FIG. 18 is a graph showing a $^{13}$C-NMR spectrum of a phenol resin obtained in Example 9.
Figure 19:
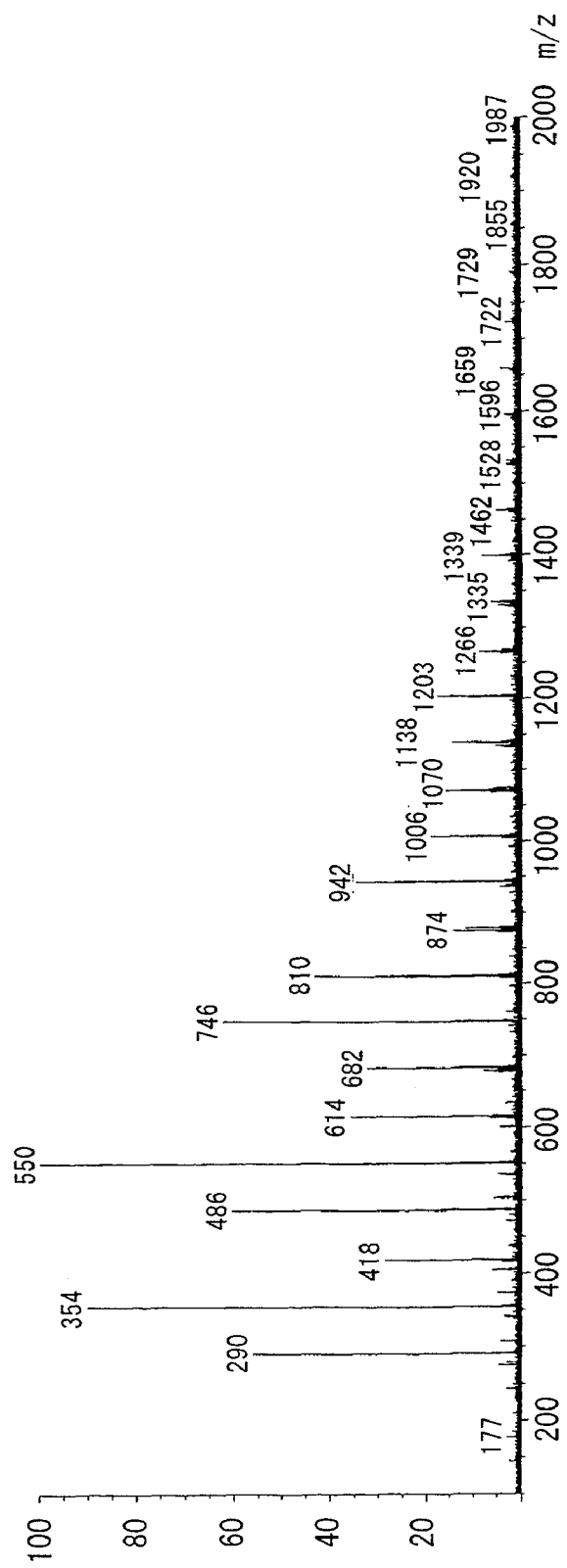
FIG. 19 is a graph showing a mass spectrum of a phenol resin obtained in Example 9.

As a result of the measurement results of the weight of the recovered unreacted phenol and 2-methoxynaphthalene, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 72/28. The resulting phenol resin had a softening point of 68° C. (B&R method), a melt viscosity (measuring method: ICI viscometer method, measuring temperature: 150° C.) of 1.2 dPa·s, and a hydroxyl group equivalent of 240 g/eq. A GPC chart of the resulting phenol resin is shown in FIG. 17, a $C^{13}$ NMR chart is shown in FIG. 18, and a MS spectrum is shown in FIG. 19. A signal assignable to a methoxy group observed at 55 ppm in NMR and a hydroxyl group equivalent revealed that the methoxy group in the compound is not decomposed.

Example 10

Synthesis of Phenol Resin (A-10)

In the same manner as in Example 9, except that the amount of phenol was replaced by 157.2 g (1.67 mols) and the amount of 2-methoxynaphthalene was replaced by 131.3 g (0.83 mols) in Example 9, 237 g of a phenol resin (A-10) having a structural unit represented by the following structural formula was obtained.

[Chemical Formula 29]

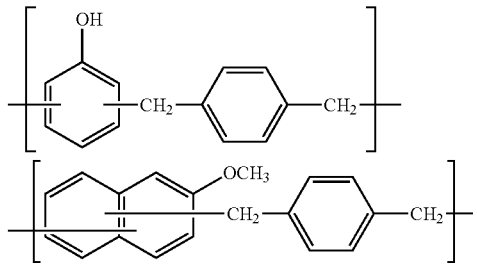

As a result of the measurement results of the weight of the recovered unreacted phenol and 2-methoxynaphthalene, and the measurement results of a hydroxyl group of the resulting phenol resin, a molar ratio of a structural unit of a hydroxyl group-containing aromatic hydrocarbon group to a structural unit of a methoxy group-containing aromatic hydrocarbon group in the phenol resin, the former/the latter, was 63/37.

Figure 20:
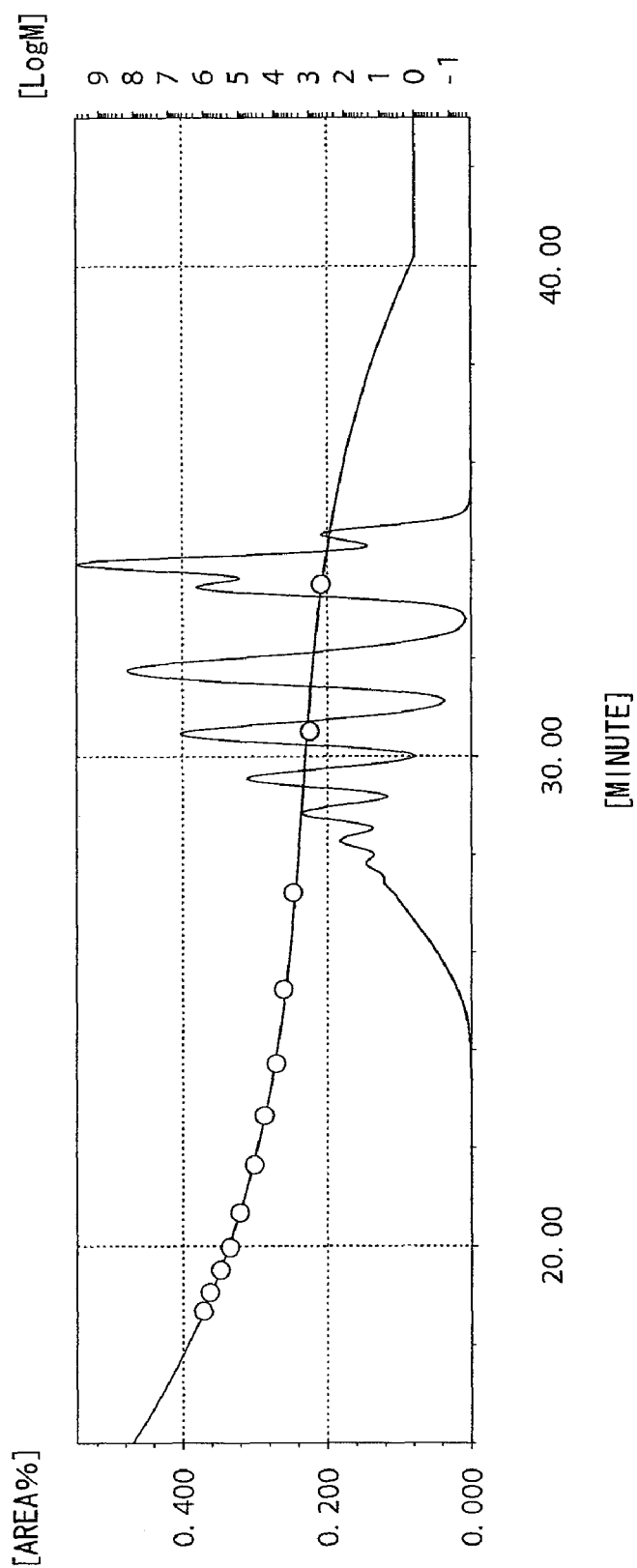
FIG. 20 is a graph showing a GPC chart of a phenol resin obtained in Example 10.
Figure 21:
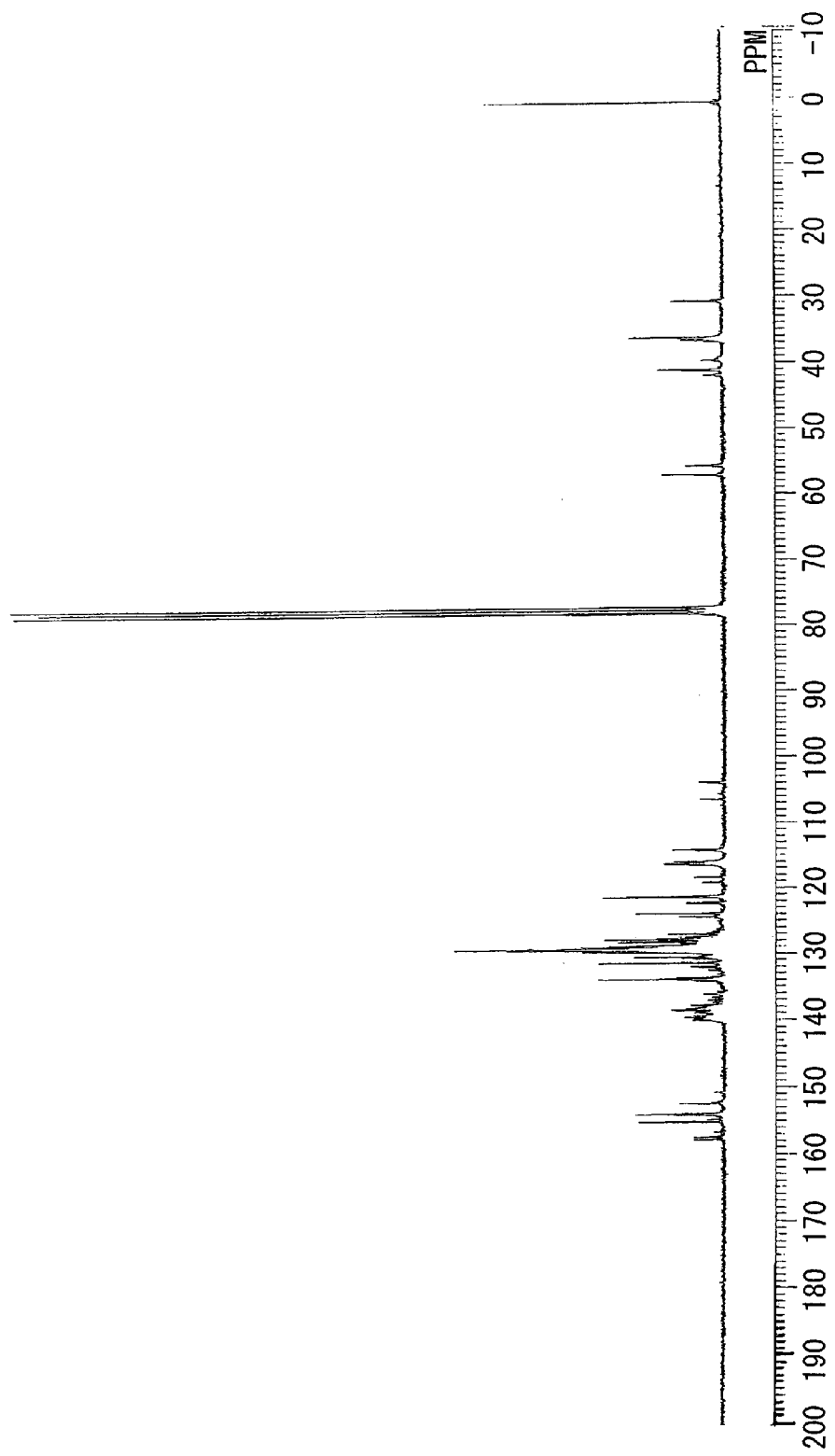
FIG. 21 is a graph showing a $^{13}$C-NMR spectrum of a phenol resin obtained in Example 10.
Figure 22:
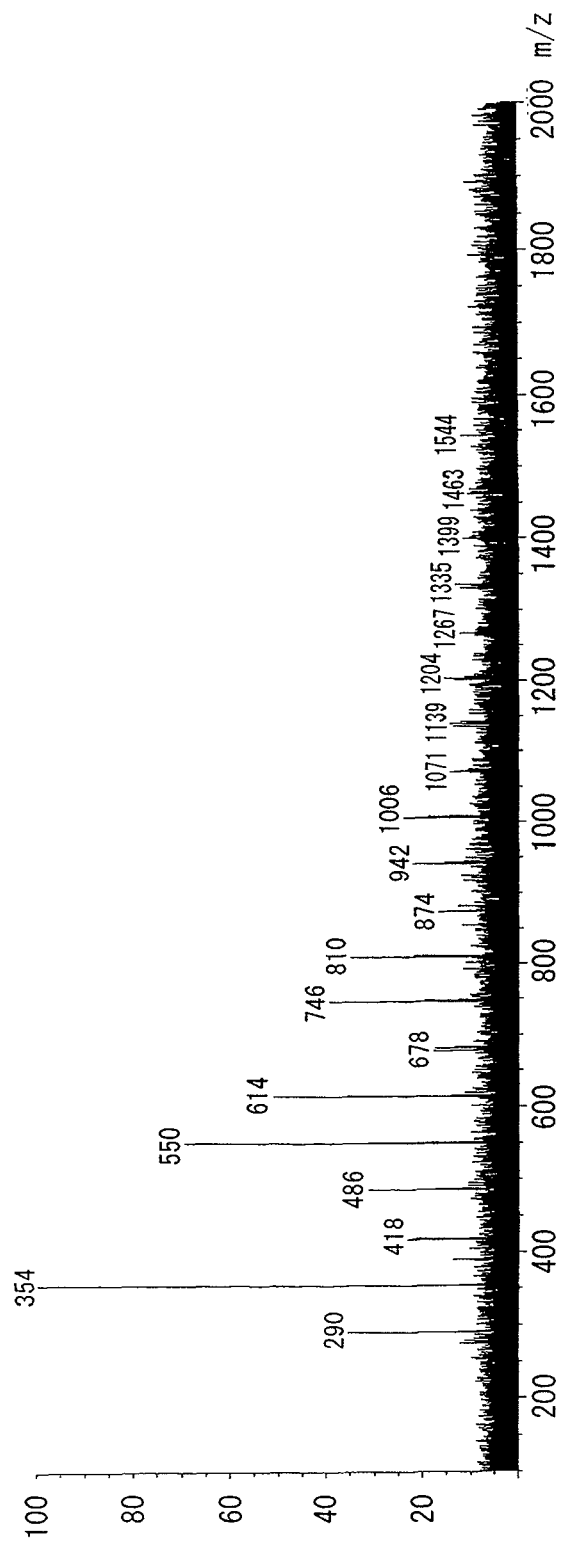
FIG. 22 is a graph showing a mass spectrum of a phenol resin obtained in Example 10.

The resulting phenol resin had a softening point of 70° C. (B&R method), a melt viscosity (measuring method: ICI viscometer method, measuring temperature: 150° C.) of 1.3 dPa·s, and a hydroxyl group equivalent of 300 g/eq. A GPC chart of the resulting phenol resin is shown in FIG. 20, a $C^{13}$ NMR chart is shown in FIG. 21, and a MS spectrum is shown in FIG. 22. A signal assignable to a methoxy group observed at 55 ppm in NMR and a hydroxyl group equivalent revealed that the methoxy group in the compound is not decomposed.

Synthesis Example 1

Synthesis of Compound Described in Japanese Unexamined Patent Application, First Publication No. Hei 8-301980

In a 500 ml four-necked flask, 166 g (1.0 mols) of p-xylene glycol dimethyl ether, 44.5 g (0.25 mols) of anthracene and 8.4 g of p-toluenesulfonic acid were charged and then reacted with stirring in a nitrogen atom at 150° C. Methanol produced during the reaction was removed out of the system. When 16 g of methanol was produced after about 2 hours, 216 g (2 mols) of o-cresol was added and the reaction was further conducted at 150° C. for 2 hours. Subsequently, methanol produced during the reaction was removed out of the system. After the completion of the production of methanol, the reaction solution was neutralized with sodium carbonate and excess o-cresol was distilled off under reduced pressure to obtain 200 g of a phenol resin (A'-1) having the following structural formula.

The resulting phenol resin had a softening point of 84° C. (B&R method), a melt viscosity (measuring method: ICI viscometer method, measuring temperature: 150° C.) of 4.4 dPa·s and a hydroxyl group equivalent of 252 g/eq.

Synthesis Example 2

Synthesis of Compound Described in Japanese Unexamined Patent Application, First Publication No. Hei 8-301980

In a 500 ml four-necked flask, 166 g (1.0 mols) of p-xylene glycol dimethyl ether, 42.5 g (0.25 mols) of diphenyl ether and 12.5 g of p-toluenesulfonic acid were charged and then reacted with stirring in a nitrogen atom at 150° C. Methanol produced during the reaction was removed out of the system. When 16 g of methanol was produced after about 3 hours, 202.5 g (1.88 mols) of o-cresol was added and the reaction was further conducted at 150° C. for 2 hours. Subsequently, methanol produced during the reaction was removed out of the system. After the completion of the pro-

[Chemical Formula 30]

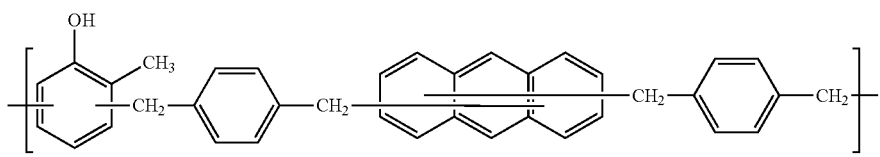

duction of methanol, the reaction solution was neutralized with sodium carbonate and excess o-cresol was distilled off under reduced pressure to obtain 237.5 g of a phenol resin (A'-2) having the following structural formula.

[Chemical Formula 31]

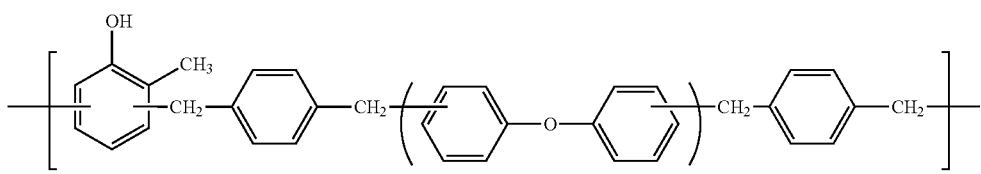

The resulting phenol resin had a softening point of 100° C. (B&R method), a melt viscosity (measuring method: ICI viscometer method, measuring temperature: 150° C.) of 19 dPa·s and a hydroxyl group equivalent of 249 g/eq.

Synthesis Example 3

Synthesis of Compound Described in Japanese Unexamined Patent Application, First Publication No. 2004-010700

In a reaction vessel, 108.0 g (1.0 mol) of ortho-cresol and 132.0 g (2.2 mol) of an aqueous 50% formalin solution were charged and 133.3 g (1.0 mol) of an aqueous 30% sodium hydroxide solution was added dropwise under cooling over one hour while maintaining at 30° C. or lower. After the completion of dropwise addition, the mixture was heated to 40° C. and then reacted for 2 hours reaction. Then, 126.0 g (1.0 mol) of methyl sulfate was added dropwise at 40° C. for one hour. After heating to 60° C., the reaction was conducted for 2 hours, thereby to synthesize a resol resin in which a phenolic hydroxyl group is methoxylated. After the completion of the reaction, the aqueous layer was separated and 282.0 g (3.0 mol) of phenol and 9.1 g of 35% hydrochloric acid were added, followed by the reaction at 90° C. for 4 hours. After the completion of the reaction, the reaction solution was neutralized with 6.0 g of an aqueous 25% ammonia solution and a neutral salt was removed by washing with water. The unreacted phenol was removed by heating to 200° C. under 60 mmHg to obtain a phenol resin (A'-3) having a structural unit represented by the following structural formula.

[Chemical Formula 32]

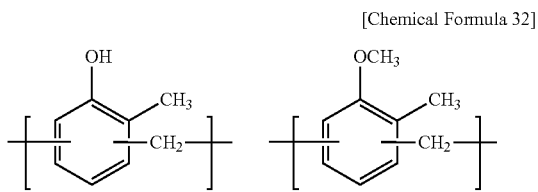

The resulting phenol resin had a softening point of 77° C. (B&R method), a melt viscosity (measuring method: ICI viscometer method, measuring temperature: 150° C.) of 0.8 dPa·s and a hydroxyl group equivalent of 160 g/eq.

Synthesis Example 4

In a flask equipped with a thermometer, a dropping funnel, a cooling tube and a stirrer, 168 parts of Milex XLC-4L manufactured by Mitsui Chemicals, Inc., 463 g (5.0 mols) of epichlorohydrin, 139 g of n-butanol and 2 g of tetraethylbenzyl ammonium chloride were charged and dissolved while purging with a nitrogen gas. After heating to 65° C. and reducing the pressure to an azeotropic pressure, 90 g (1.1 mols) of an aqueous 49% sodium hydroxide solution was added dropwise over 5 hours. Then, stirring was continued under the same conditions for 0.5 hours. The distillate produced by azeotropy during stirring was separated by a Dean-Stark trap and the aqueous layer was removed, and also the reaction was conducted while returning the oil layer into the reaction system. Then, the unreacted epichlorohydrin was distilled off by vacuum distillation. The resulting crude epoxy resin was dissolved in 590 g of methyl isobutyl ketone and 177 g of n-butanol. To the solution, 10 g of an aqueous 10% sodium hydroxide solution was added and the reaction was conducted at 80° C. for 2 hours. Then, the reaction solution was washed with 150 g of water three times until the washing is neutralized. After dehydrating by azeotropy in the reaction system, precise filtration was conducted and the solvent was distilled off under reduced pressure to obtain an epoxy resin (B-1) having a structural unit represented by the following structural formula.

[Chemical Formula 33]

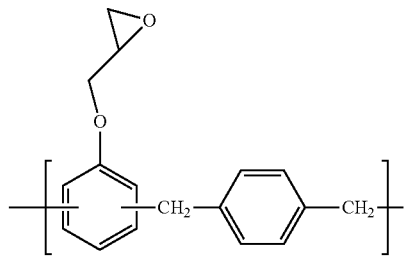

The epoxy resin had an epoxy equivalent of 241 g/eq.

Synthesis Example 5

Synthesis of Epoxy Resin Described in Japanese Unexamined Patent Application, First Publication No. 2003-201333

In a 1 liter four-necked flask equipped with a stirrer and a heater, 152 g (1.0 mols) of trimethylhydroquinone was dissolved in a solvent mixture of 500 g of toluene and 200 g of ethylene glycol monoethyl ether. To the solution, 4.6 g of paratoluenesulfonic acid was added and 64 g (0.6 mols) of 41% benzaldehyde was added dropwise while paying attention to heat generation, followed by stirring at 100 to 120° C. for 15 hours while distilling off moisture. After cooling, the precipitated crystal was removed by filtration, and the filtrate was repeatedly washed with water until it is neutralized and then dried to obtain 175 g of a phenol resin (GPC purity: 99%).

In a flask equipped with a thermometer, a dropping funnel, a cooling tube and a stirrer, 175 g of a phenol resin, 463 g (5.0 mols) of epichlorohydrin, 53 g of n-butanol and 2.3 g of tetraethylbenzyl ammonium chloride were charged and dissolved while purging with a nitrogen gas. After heating to 65° C. and reducing the pressure to an azeotropic pressure, 82 g (1.0 mols) of an aqueous 49% sodium hydroxide solution was added dropwise over 5 hours, followed by continuous stirring under the same conditions for 0.5 hours.

The distillate produced by azeotropy during stirring was separated by a Dean-Stark trap and the aqueous layer was removed, and also the reaction was conducted while returning the oil layer into the reaction system. Then, the unreacted epichlorohydrin was distilled off by vacuum distillation. The resulting crude epoxy resin was dissolved in 550 g of methyl isobutyl ketone and 55 g of n-butanol. To the solution, 15 g of an aqueous 10% sodium hydroxide solution was added and the reaction was conducted at 80° C. for 2 hours. Then, the reaction solution was washed with 100 g of water three times until the washing is neutralized. After dehydrating by azeotropy in the reaction system, precise filtration was conducted and the solvent was distilled off under reduced pressure to obtain an epoxy resin (B-2) having a structural unit represented by the following structural formula.

[Chemical Formula 34]

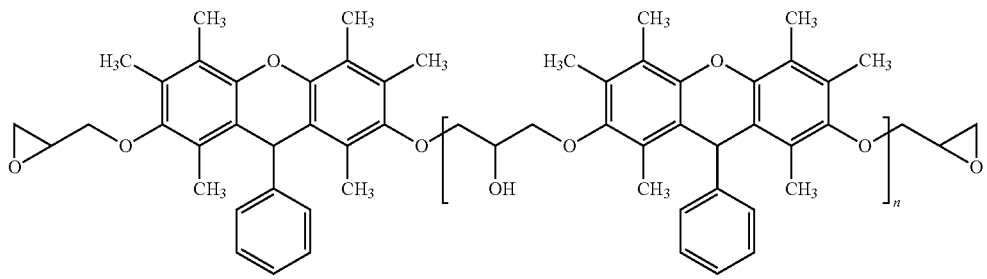

The epoxy resin had an epoxy equivalent of 262 g/eq.

Examples 11 to 25 and Comparative Examples 1 to 3

The above epoxy resins (B-1) to (B-2), YX-4000H manufactured by Japan Epoxy Resin Co., Ltd. (tetramethylbiphenol type epoxy resin, epoxy equivalent: 188 g/eq), NC-3000 manufactured by Nippon Kayaku Co., Ltd. (biphenylaralkyl type epoxy resin, epoxy equivalent: 274 g/eq) and EXA-4700 manufactured by Dainippon Ink and Chemicals, Incorporated (naphthalene type epoxy resin, epoxy equivalent: 164 g/eq) as epoxy resins, the above phenol resins (A-1) to (A-7) as polyhydric phenol compounds, the above phenol resins (A'-1) to (A'-3) as comparative curing agents, triphenylphosphine (TPP) as a curing accelerator, condensed phosphoric acid ester (PX-200 manufactured by Daihachi Chemical Industry Co., Ltd.) and magnesium hydroxide (ECOMAG Z-10 manufactured by Air Water Inc.) as flame retardants, spherical silica (S-COL manufactured by Micron Co., Ltd.) as an inorganic filler, γ-glycidoxytriethoxysilane (KBM-403 manufactured by Shin-Etsu Chemical Co., Ltd.) as a silane coupling agent, carnauba wax (PEARL WAX No. 1-P manufactured by Cerarica Noda Co. Ltd.) and carbon black were mixed according to the formulations shown in Tables 1 to 3 and then melt-kneaded at a temperature of 85° C. for 5 minutes using a twin roll to obtain the objective compositions and curability was evaluated. Physical properties of a cured article were evaluated as follows. That is, samples for evaluation were made from the above compositions by the following procedures, and then heat resistance, flame retardancy and dielectric characteristics were measured by the following procedures. The results are shown in Tables 1 to 2.

<Heat Resistance>
Glass transition temperature: The glass transition temperature was measured by using a viscoelasticity measuring apparatus (solid viscoelasticity measuring apparatus RSAII manufactured by Rheometric Co., double cantilever method: frequency of 1 Hz, heating rate: 3° C./min)

<Curability>
0.15 g of an epoxy resin composition was placed on a cure plate (manufactured by THERMO ELECTRIC Co.) heated to 175° C. and clocking starts using a stop watch. A sample was uniformly stirred by a tip of a bar and the stop watch was stopped when the sample is separated into threads and left on the plate. The time required for the sample to be separated into threads and left on the plate was defined as a gel time.

<Flame Retardancy>
A sample for evaluation having a width of 12.7 mm, a length of 127 mm and a thickness of 1.6 mm was made by molding at a temperature of 175° C. for 90 seconds using a transfer molding machine and post-curing at a temperature of 175° C. for 5 hours. The resulting five samples having a thickness of 1.6 mm were subjected to a combustion test in accordance with UL-94.

<Measurement of Dielectric Characteristics>
A sample for evaluation having a width of 25 mm, a length of 75 mm and a thickness of 2.0 mm was made by molding at a temperature of 175° C. for 90 seconds using a transfer molding machine and post-curing at a temperature of 175° C. for 5 hours. The resulting sample was subjected to a bone dry treatment and stored in a room at 23° C. and a humidity of 50% for 24 hours. Then, a dielectric constant and a dielectric dissipation factor at a frequency of 100 MHz of the resulting cured article were measured by the method defined in JIS-C-6481 using Impedance Material Analyzer "HP4291B" manufactured by Agilent Technology Co., Ltd.

TABLE 1

Formulation table of epoxy resin composition (parts by mass) and evaluation results

| Examples | | 11 | 12 | 13 | 14 | 15 | 16 | 17 | 18 | 19 | 20 | 21 |
|---|---|---|---|---|---|---|---|---|---|---|---|---|
| Epoxy resins | B-1 | 68 | 65 | 69 | 60 | | | | | | 60 | |
| | B-2 | | | | | 76 | | | | | | |
| | YX-4000H | | | | | | 34 | 35 | | | | 38 |
| | NC-3000 | | | | | | | | 72 | | | |
| | EXA-4700 | | | | | | | | | 53 | | |
| Curing agents | A-1 | 66 | | | | | | | | 62 | | |
| | A-2 | | 69 | | | | | | | | 81 | 64 |
| | A-3 | | | 65 | | | | | | | | 46 |
| | A-4 | | | | 74 | | | | | | | |
| | A-5 | | | | | 58 | | | | | | |
| | A-6 | | | | | | 50 | | | | | |
| | A-7 | | | | | | | 49 | | | | |
| Condensed phosphoric acid ester | | | | | | | | | | | | 30 |
| Magnesium hydroxide | | | | | | | | | | | 20 | |
| TPP | | 3 | 3 | 3 | 3 | 3 | 3 | 3 | 3 | 3 | 3 | 3 |

TABLE 1-continued

Formulation table of epoxy resin composition (parts by mass) and evaluation results

| Examples | 11 | 12 | 13 | 14 | 15 | 16 | 17 | 18 | 19 | 20 | 21 |
|---|---|---|---|---|---|---|---|---|---|---|---|
| Fused silica | 850 | 850 | 850 | 850 | 850 | 900 | 900 | 850 | 850 | 840 | 870 |
| Coupling agent | 5 | 5 | 5 | 5 | 5 | 5 | 5 | 5 | 5 | 5 | 5 |
| Carnauba wax | 5 | 5 | 5 | 5 | 5 | 5 | 5 | 5 | 5 | 5 | 5 |
| Carbon black | 3 | 3 | 3 | 3 | 3 | 3 | 3 | 3 | 3 | 3 | 3 |
| Curability | 19 | 23 | 30 | 23 | 33 | 33 | 47 | 21 | 20 | 23 | 44 |
| Heat resistance | 107 | 100 | 116 | 134 | 139 | 101 | 116 | 116 | 132 | 100 | 110 |
| Combustion test class | V-0 | V-0 | V-0 | V-0 | V-0 | V-0 | V-0 | V-0 | V-0 | V-0 | V-0 |
| 1* | 2 | 3 | 2 | 3 | 2 | 4 | 4 | 3 | 4 | 2 | 2 |
| 2* | 16 | 19 | 17 | 19 | 11 | 21 | 23 | 13 | 18 | 12 | 9 |
| Dielectric constant | 2.83 | 2.82 | 2.85 | 2.78 | 2.82 | 2.83 | 2.86 | 2.77 | 2.89 | 2.79 | 2.90 |
| Dielectric dissipation factor ($\times 10^{-4}$) | 86 | 80 | 85 | 75 | 88 | 88 | 94 | 77 | 99 | 80 | 98 |

TABLE 2

Formulation table of epoxy resin composition (parts by mass) and evaluation results

| Examples | | 22 | 23 | 24 | 25 |
|---|---|---|---|---|---|
| Epoxy resins | B-1 | 60 | | | |
| | NC-3000 | | 64 | | 71 |
| | EXA-4700 | | | 47 | |
| Curing agents | A-9 | | | | 63 |
| | A-10 | 74 | 70 | 87 | |
| Condensed phosphoric acid ester | | | | | |
| Magnesium hydroxide | | | | | |
| TPP | | | | | |
| Fused silica | | | | | |
| Coupling agent | | | | | |
| Carnauba wax | | | | | |
| Carbon black | | | | | |
| Curability | | 35 | 39 | 29 | 37 |
| Heat resistance | | 104 | 111 | 140 | 130 |
| Combustion test class | | V-0 | V-0 | V-0 | V-0 |
| 1* | | 3 | 2 | 4 | 3 |
| 2* | | 12 | 7 | 15 | 14 |
| Dielectric constant | | 2.77 | 2.76 | 2.83 | 2.78 |
| Dielectric dissipation factor ($\times 10^{-4}$) | | 64 | 60 | 83 | 70 |

TABLE 3

Formulation table of epoxy resin composition (parts by mass) and evaluation results

| Comparative Examples | | 1 | 2 | 3 |
|---|---|---|---|---|
| Epoxy resins | B-1 | 66 | 66 | 81 |
| | B-2 | | | |
| | YX-4000H | | | |
| | NC-3000 | | | |
| | EXA-4700 | | | |
| Curing agents | A'-1 | 68 | | |
| | A'-2 | | 68 | |
| | A'-3 | | | 53 |
| TPP | | 3 | 3 | 3 |
| Fused silica | | 850 | 850 | 850 |
| Coupling agent | | 5 | 5 | 5 |
| Carnauba wax | | 5 | 5 | 5 |
| Carbon black | | 3 | 3 | 3 |
| Curability | | 55 | 54 | 54 |
| Heat resistance | | 110 | 112 | 125 |
| Combustion test class | | V-1 | V-1 | *3 |
| 1* | | 18 | 22 | 37 |
| 2* | | 98 | 113 | 143 |

TABLE 3-continued

Formulation table of epoxy resin composition (parts by mass) and evaluation results

| Comparative Examples | 1 | 2 | 3 |
|---|---|---|---|
| Dielectric constant | 3.11 | 3.13 | 3.27 |
| Dielectric dissipation factor ($\times 10^{-4}$) | 108 | 117 | 135 |

Note of Tables 1 and 2:

*1: maximum combustion time (second) in one flame contact

*2: total combustion time (second) of 5 samples

*3: flame retardancy required to V-1 which does not satisfy the relationships ($\Sigma F \leqq 250$ seconds and $F_{max} \leqq 30$ seconds), but causes no combustion (flame does not reach clamp), resulting in quenching of flame.

Example 26

Synthesis of Epoxy Resin (E-1)

In a flask equipped with a thermometer, a dropping funnel, a cooling tube and a stirrer, 233 g of the phenol resin (A-1) obtained in Example 1 (hydroxyl group: 1 equivalent), 463 g (5.0 mols) of epichlorohydrin, 139 g of n-butanol and 2 g of tetraethylbenzyl ammonium chloride were charged and dissolved while purging with a nitrogen gas. After heating to 65° C. and reducing the pressure to an azeotropic pressure, 90 g (1.1 mols) of an aqueous 49% sodium hydroxide solution was added dropwise over 5 hours, followed by continuous stirring under the same conditions for 0.5 hours. The distillate produced by azeotropy during stirring was separated by a Dean-Stark trap and the aqueous layer was removed, and also the reaction was conducted while returning the oil layer into the reaction system. Then, the unreacted epichlorohydrin was distilled off by vacuum distillation. The resulting crude epoxy resin was dissolved in 590 g of methyl isobutyl ketone and 177 g of n-butanol. To the solution, 10 g of an aqueous 10% sodium hydroxide solution was added and the reaction was conducted at 80° C. for 2 hours. Then, the reaction solution was washed with 150 g of water three times until the washing is neutralized. After dehydrating by azeotropy in the reaction system, precise filtration was conducted and the solvent was distilled off under reduced pressure to obtain 260 g of an epoxy resin (E-1) having a structural unit represented by the following structural formula.

[Chemical Formula 35]

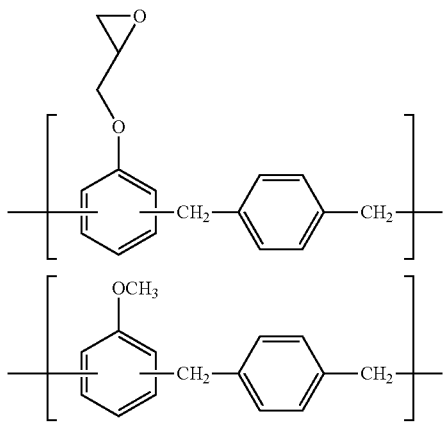

The resulting epoxy resin had a softening point of 65° C. (B&R method), a melt viscosity (measuring method: ICI viscometer method, measuring temperature: 150° C.) of 4.0 dPa·s and an epoxy equivalent of 303 g/eq.

Figure 23:
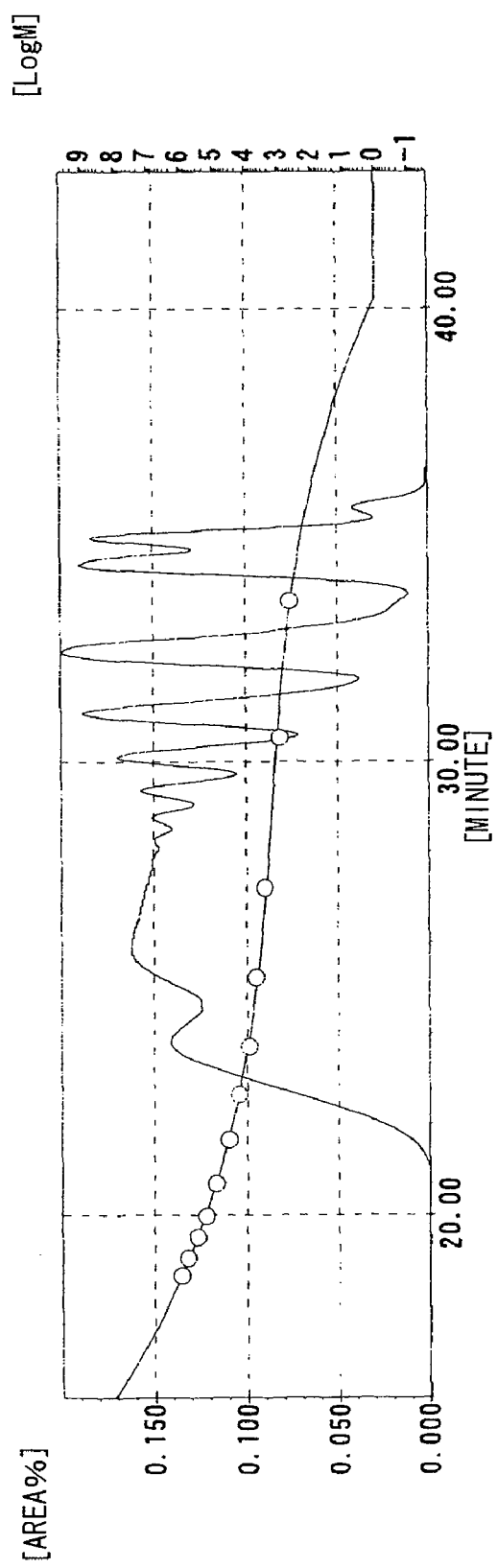
FIG. 23 is a graph showing a GPC chart of an epoxy resin obtained in Example 26.
Figure 24:
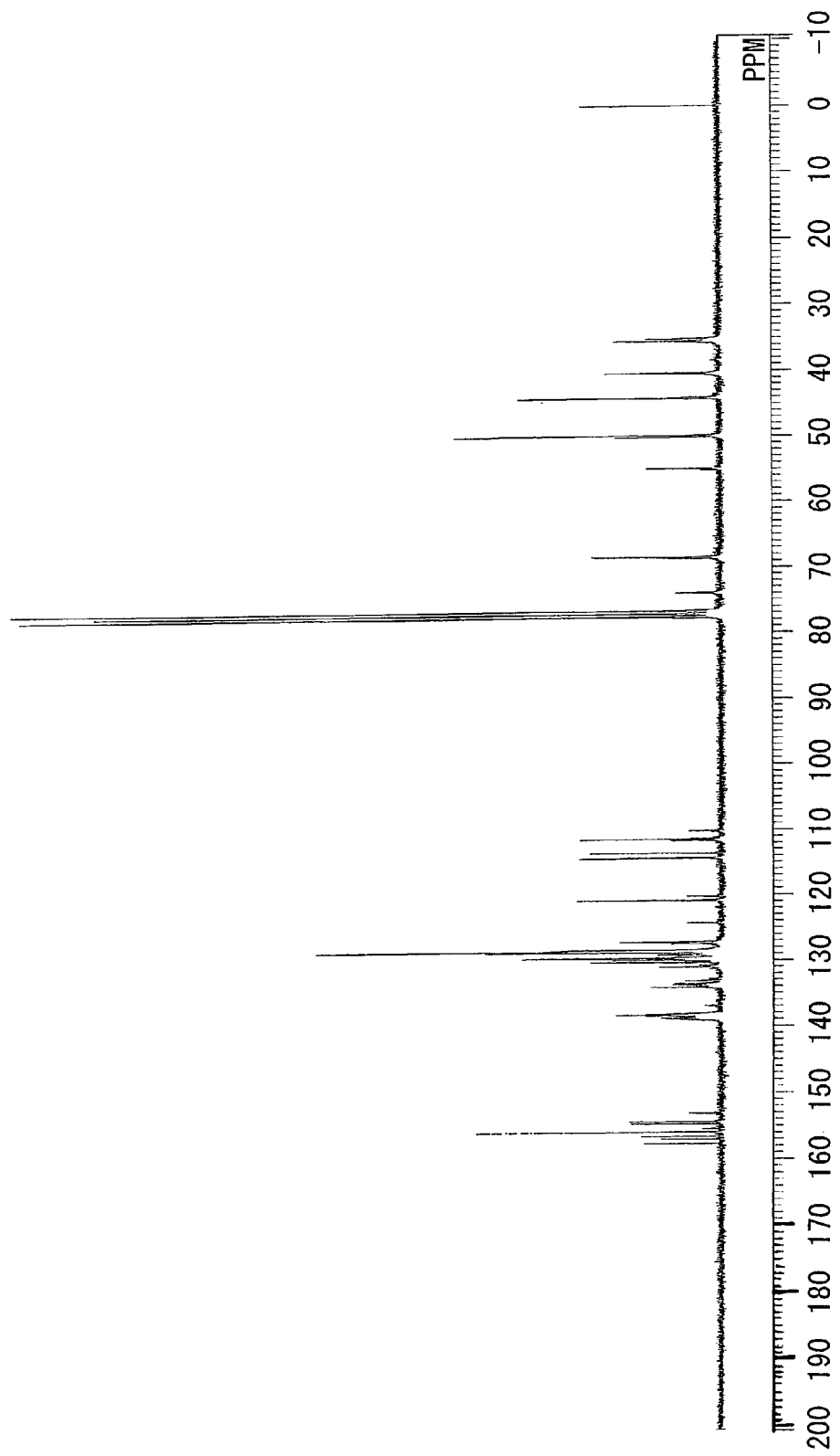
FIG. 24 is a graph showing a $^{13}$C-NMR spectrum of an epoxy resin obtained in Example 26.
Figure 25:
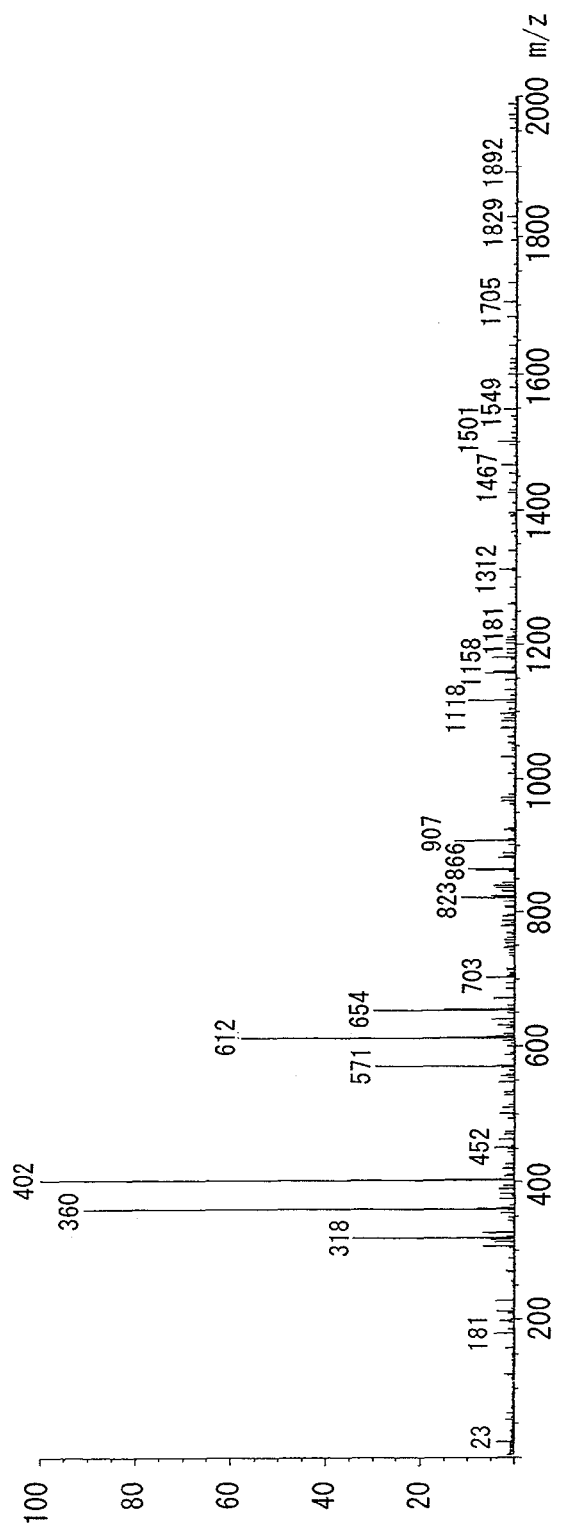
FIG. 25 is a graph showing a mass spectrum of an epoxy resin obtained in Example 26.

A GPC chart of the resulting epoxy resin is shown in FIG. 23, a $C^{13}$ NMR chart is shown in FIG. 24, and a MS spectrum is shown in FIG. 25. A signal assignable to a methoxy group observed at 55 ppm in NMR and a hydroxyl group equivalent revealed that the methoxy group in the compound is not decomposed. A molar ratio of a structural unit of a glycidyloxy group-containing aromatic hydrocarbon group to a structural unit of a methoxy group-containing aromatic hydrocarbon group in the epoxy resin was determined from the measurement results of the weight of the recovered unreacted phenol and anisole in the production of the phenol resin (A-1), and the measurement results of a hydroxyl group of the resulting phenol resin. As a result, the former/the latter was 76/24.

Example 27

Synthesis of Epoxy Resin (E-2)

In the same manner as in Example 26, the epoxidation reaction was conducted, except that the phenol resin (A-1) was replaced by 254 g of the phenol resin (A-2) obtained in Example 2 (hydroxyl group: 1 equivalent) in Example 1, to obtain 277 g of an epoxy resin (E-2) having a structural unit represented by the following structural formula.

[Chemical Formula 36]

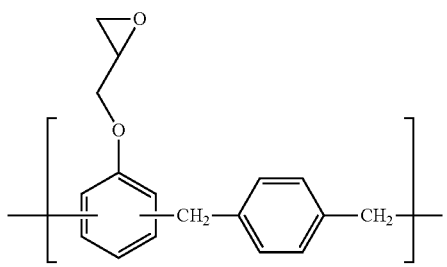

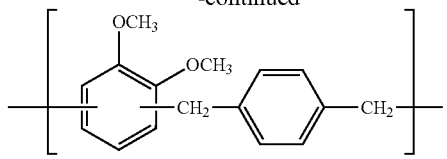

-continued

The resulting epoxy resin had a softening point of 56° C. (B&R method), a melt viscosity (measuring method: ICI viscometer method, measuring temperature: 150° C.) of 1.2 dPa·s and an epoxy equivalent of 328 g/eq.

Figure 26:
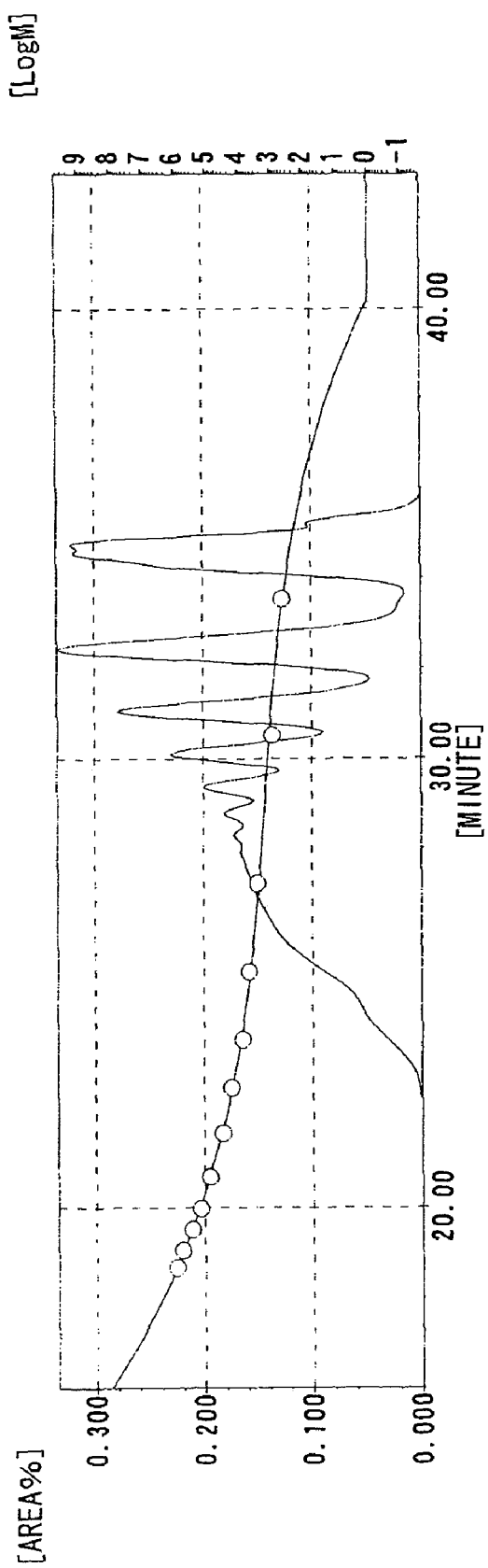
FIG. 26 is a graph showing a GPC chart of an epoxy resin obtained in Example 27.
Figure 27:
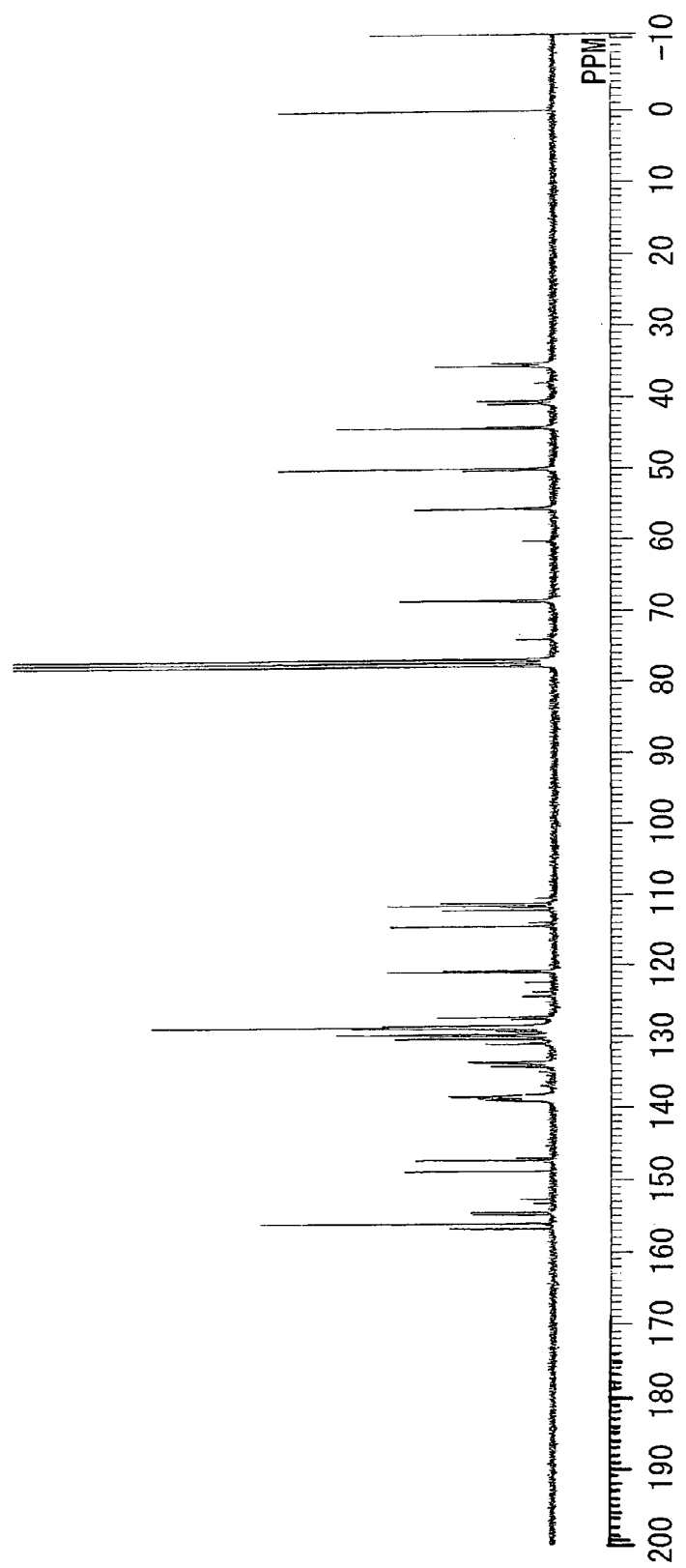
FIG. 27 is a graph showing a $^{13}$C-NMR spectrum of an epoxy resin obtained in Example 27.
Figure 28:
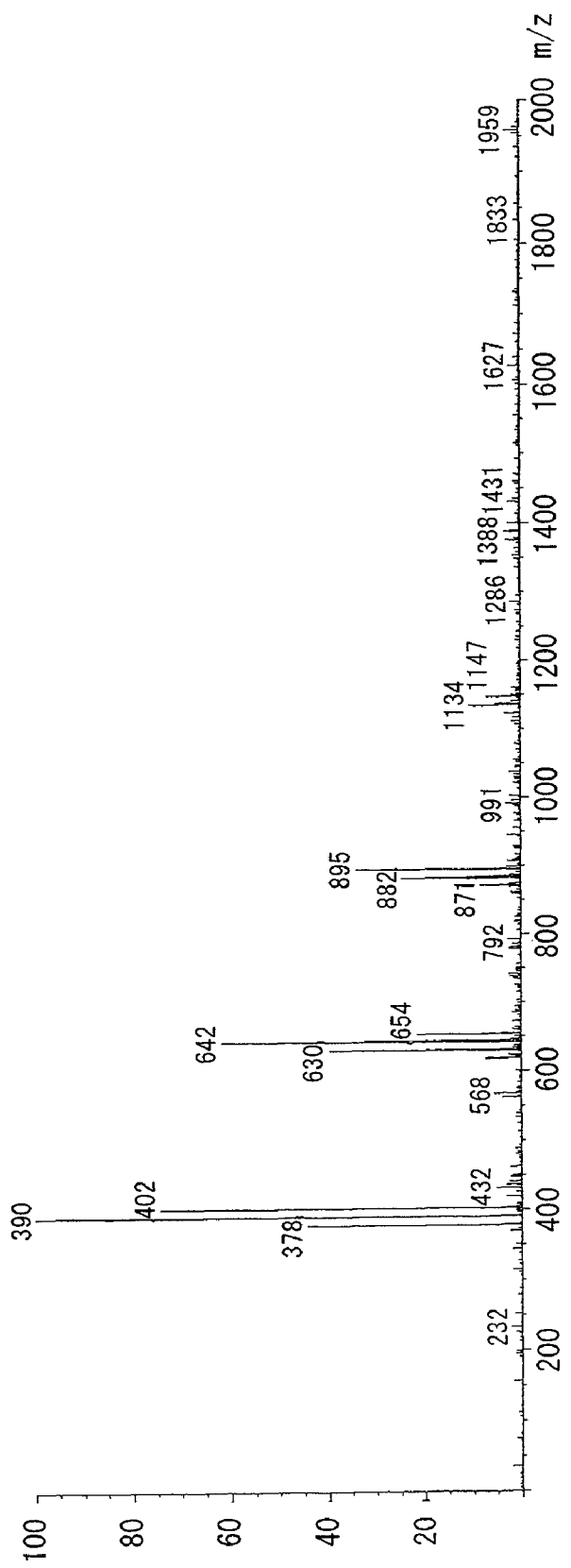
FIG. 28 is a graph showing a mass spectrum of an epoxy resin obtained in Example 27.

A GPC chart of the resulting epoxy resin is shown in FIG. 26, a $C^{13}$ NMR chart is shown in FIG. 27, and a MS spectrum is shown in FIG. 28. A signal assignable to a methoxy group observed at 55 ppm in NMR and a hydroxyl group equivalent revealed that the methoxy group in the compound is not decomposed. A molar ratio of a structural unit of a glycidyloxy group-containing aromatic hydrocarbon group to a structural unit of a methoxy group-containing aromatic hydrocarbon group in the epoxy resin was determined from the measurement results of the weight of the recovered unreacted phenol and 1,2-dimethoxybenzene in the production of the phenol resin (A-2), and the measurement results of a hydroxyl group of the resulting phenol resin. As a result, the former/the latter was 67/33.

Example 28

Synthesis of Epoxy Resin (E-3)

In the same manner as in Example 26, the epoxidation reaction was conducted, except that the phenol resin (A-1) was replaced by 230 g of the phenol resin (A-3) obtained in Example 3 (hydroxyl group: 1 equivalent), 250 g of an epoxy resin (E-3) having a structural unit represented by the following structural formula was obtained.

[Chemical Formula 37]

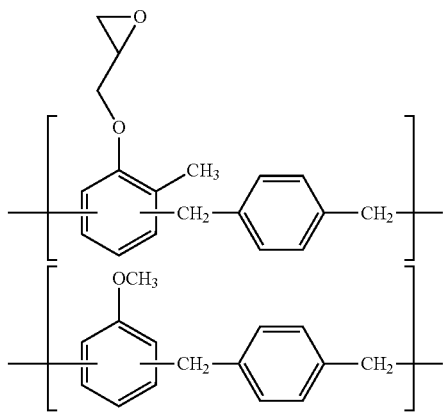

The resulting epoxy resin had a softening point of 57° C. (B&R method), a melt viscosity (measuring method: ICI viscometer method, measuring temperature: 150° C.) of 2.4 dPa·s and an epoxy equivalent of 297 g/eq.

Figure 29:
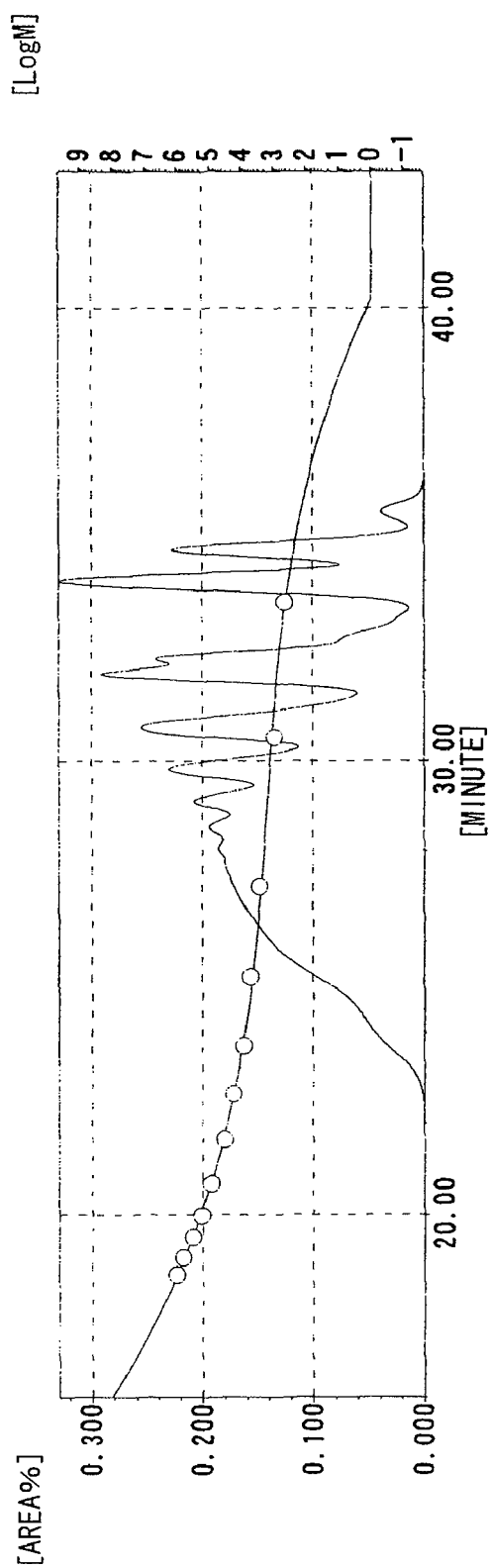
FIG. 29 is a graph showing a GPC chart of an epoxy resin obtained in Example 28.
Figure 30:
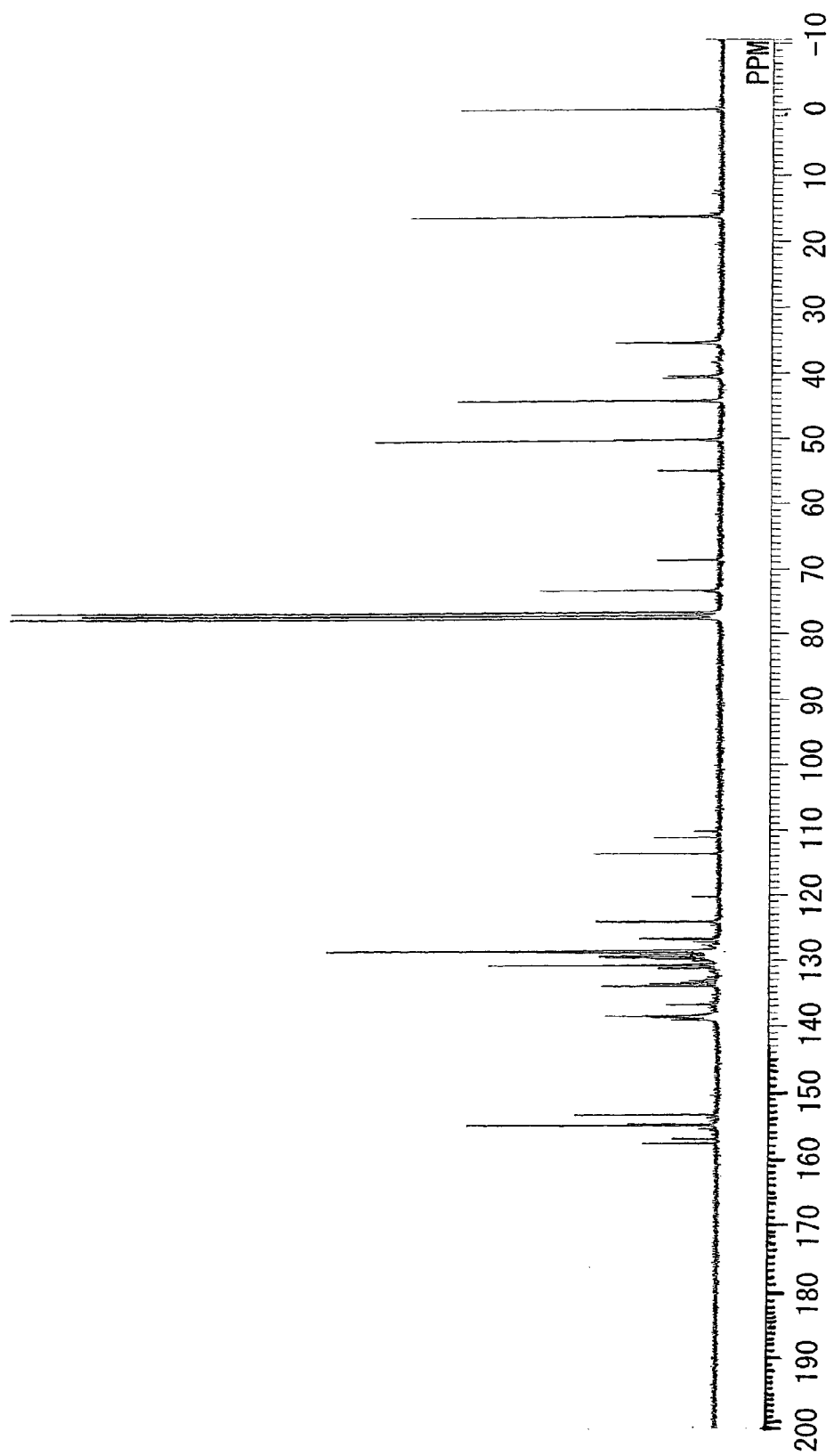
FIG. 30 is a graph showing a $^{13}$C-NMR spectrum of an epoxy resin obtained in Example 28.
Figure 31:
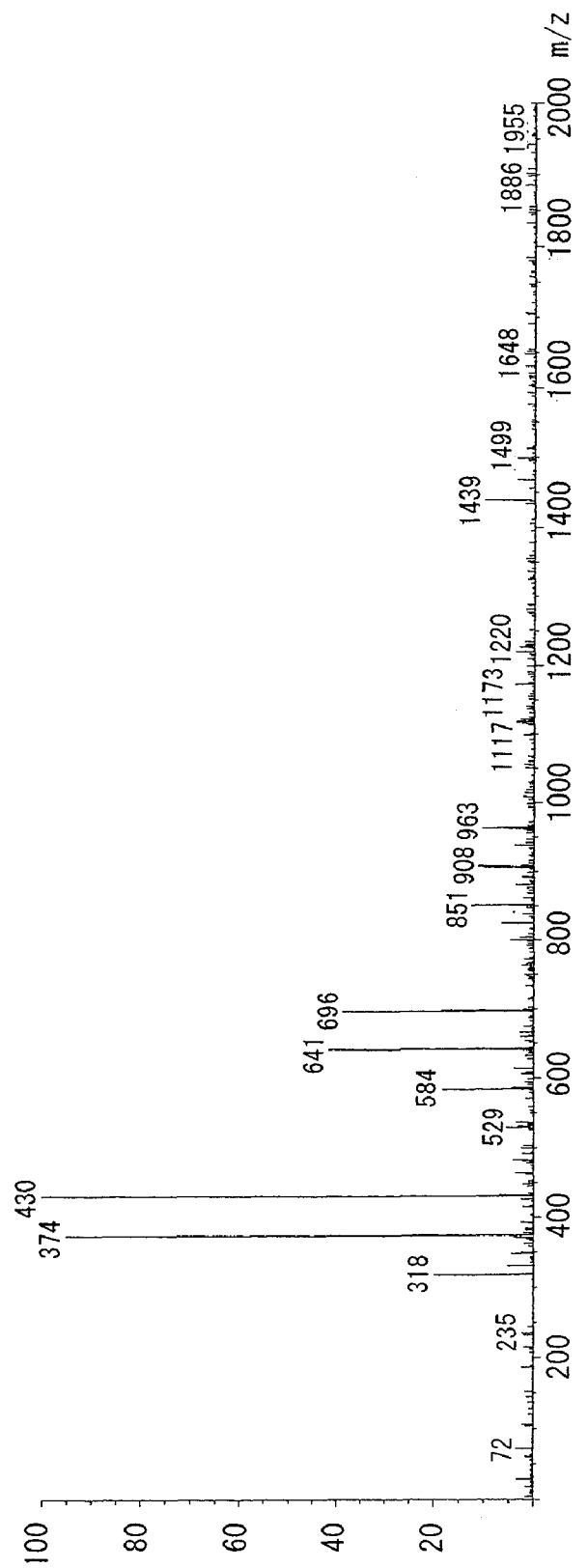
FIG. 31 is a graph showing a mass spectrum of an epoxy resin obtained in Example 28.

A GPC chart of the resulting epoxy resin is shown in FIG. 29, a $C^{13}$ NMR chart is shown in FIG. 30, and a MS spectrum is shown in FIG. 31. A signal assignable to a methoxy group observed at 55 ppm in NMR and a hydroxyl group equivalent revealed that the methoxy group in the compound is not decomposed. A molar ratio of a structural unit of a glycidyloxy group-containing aromatic hydrocarbon group to a structural unit of a methoxy group-containing aromatic hydrocarbon group in the epoxy resin was determined from the measurement results of the weight of the recovered unreacted o-cresol and anisole in the production of the phenol resin (A-3), and the measurement results of a hydroxyl group of the resulting phenol resin. As a result, the former/the latter was 81/19.

Example 29

Synthesis of Epoxy Resin (E-4)

In the same manner as in Example 26, the epoxidation reaction was conducted, except that the phenol resin (A-1) was replaced by 296 g of the phenol resin (A-4) obtained in Example 4 (hydroxyl group: 1 equivalent), 320 g of an epoxy resin (E-4) having a structural unit represented by the following structural formula was obtained.

[Chemical Formula 38]

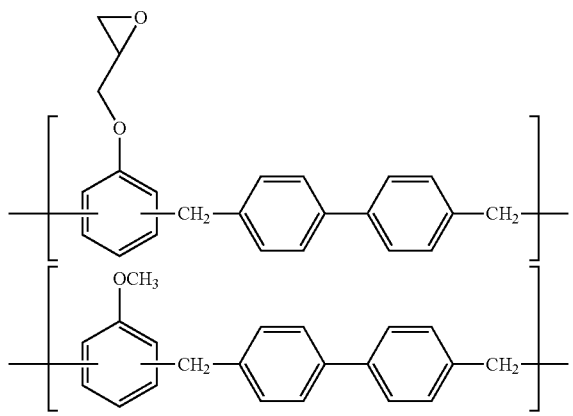

The resulting epoxy resin had a softening point of 85° C. (B&R method), a melt viscosity (measuring method: ICI viscometer method, measuring temperature: 150° C.) of 13.2 dPa·s and an epoxy equivalent of 370 g/eq.

Figure 32:
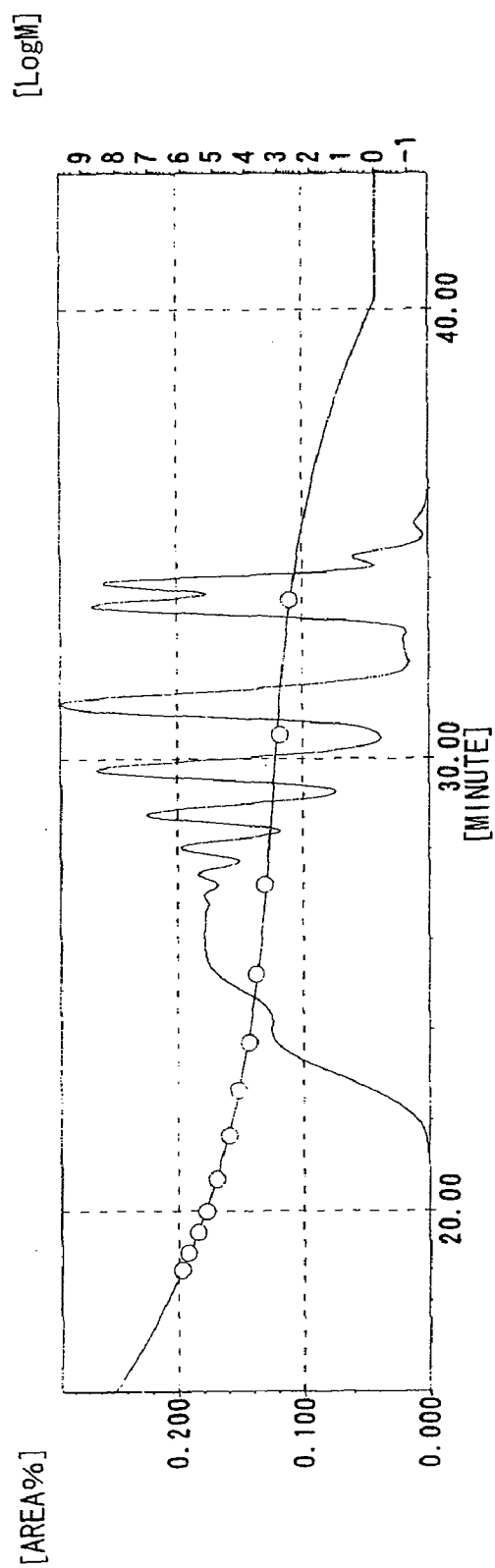
FIG. 32 is a graph showing a GPC chart of an epoxy resin obtained in Example 29.
Figure 33:
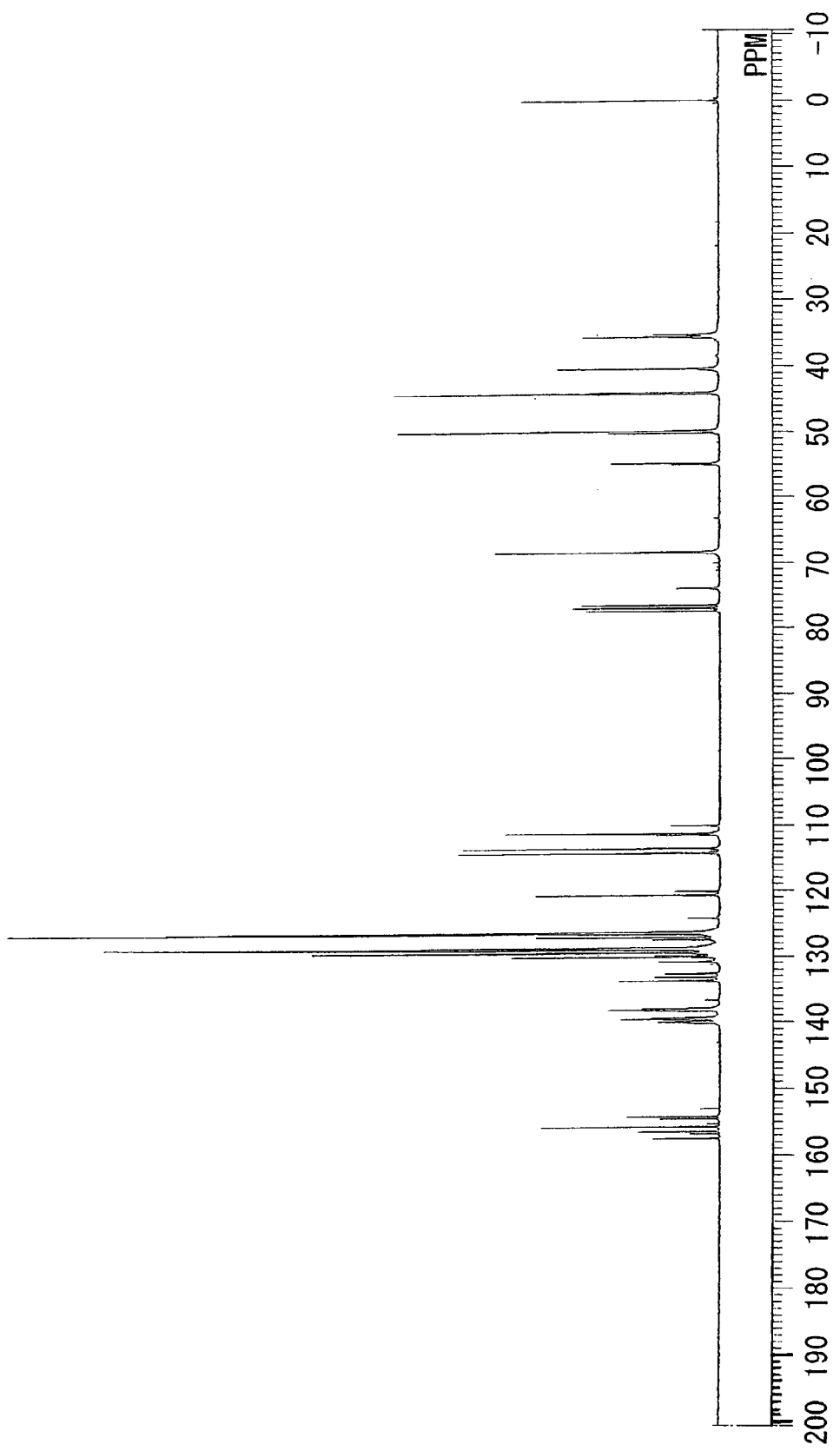
FIG. 33 is a graph showing a $^{13}$C-NMR spectrum of an epoxy resin obtained in Example 29.
Figure 34:
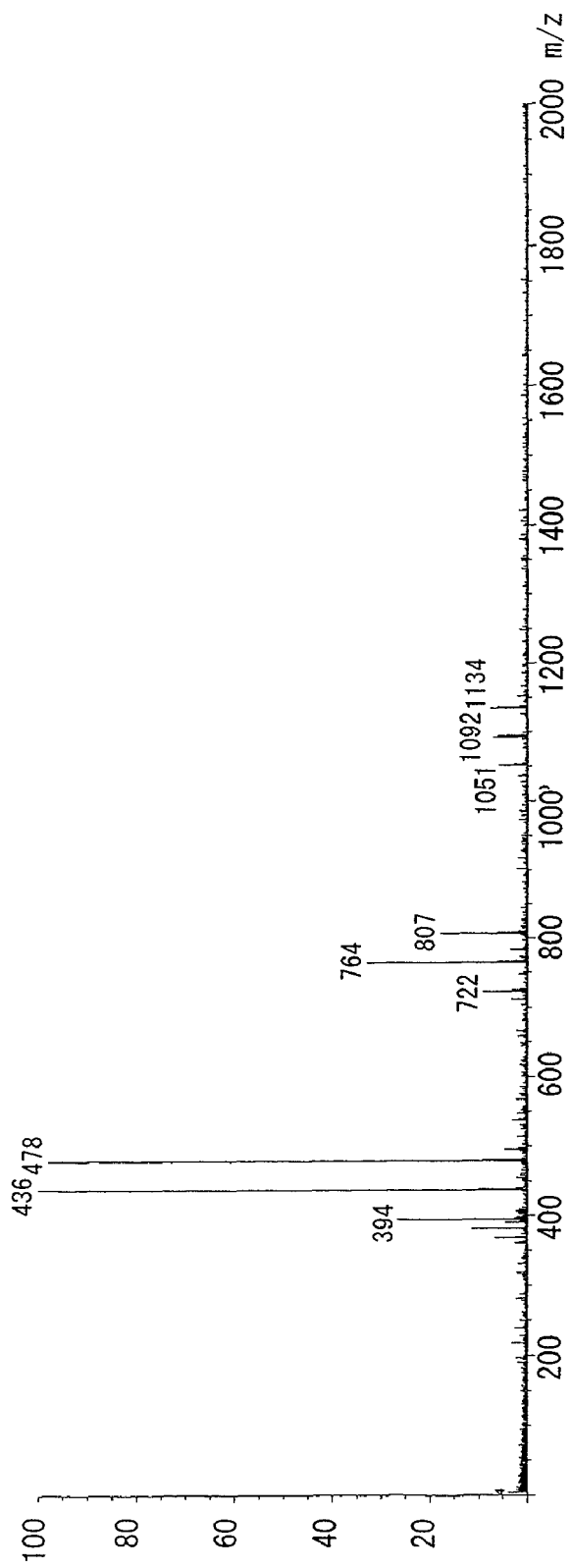
FIG. 34 is a graph showing a mass spectrum of an epoxy resin obtained in Example 29.

A GPC chart of the resulting epoxy resin is shown in FIG. 32, a $C^{13}$ NMR chart is shown in FIG. 33, and a MS spectrum is shown in FIG. 34. A signal assignable to a methoxy group observed at 55 ppm in NMR and a hydroxyl group equivalent revealed that the methoxy group in the compound is not decomposed. A molar ratio of a structural unit of a glycidyloxy group-containing aromatic hydrocarbon group to a structural unit of a methoxy group-containing aromatic hydrocarbon group in the epoxy resin was determined from the measurement results of the weight of the recovered unreacted phenol and anisole in the production of the phenol resin (A-4), and the measurement results of a hydroxyl group of the resulting phenol resin. As a result, the former/the latter was 75/25.

Example 30

Synthesis of Epoxy Resin (E-5)

In the same manner as in Example 26, the epoxidation reaction was conducted, except that the phenol resin (A-1) was replaced by 279 g of the phenol resin (A-6) obtained in Example 6 (hydroxyl group: 1 equivalent), 301 g of an epoxy resin (E-5) having a structural unit represented by the following structural formula was obtained.

[Chemical Formula 39]

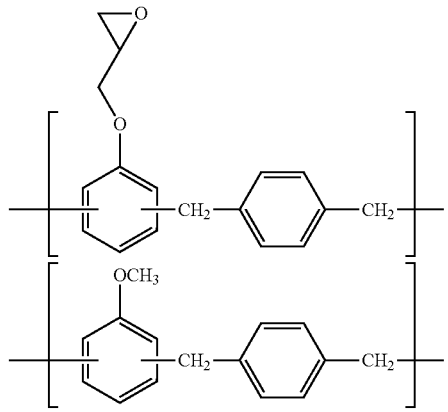

Figure 35:
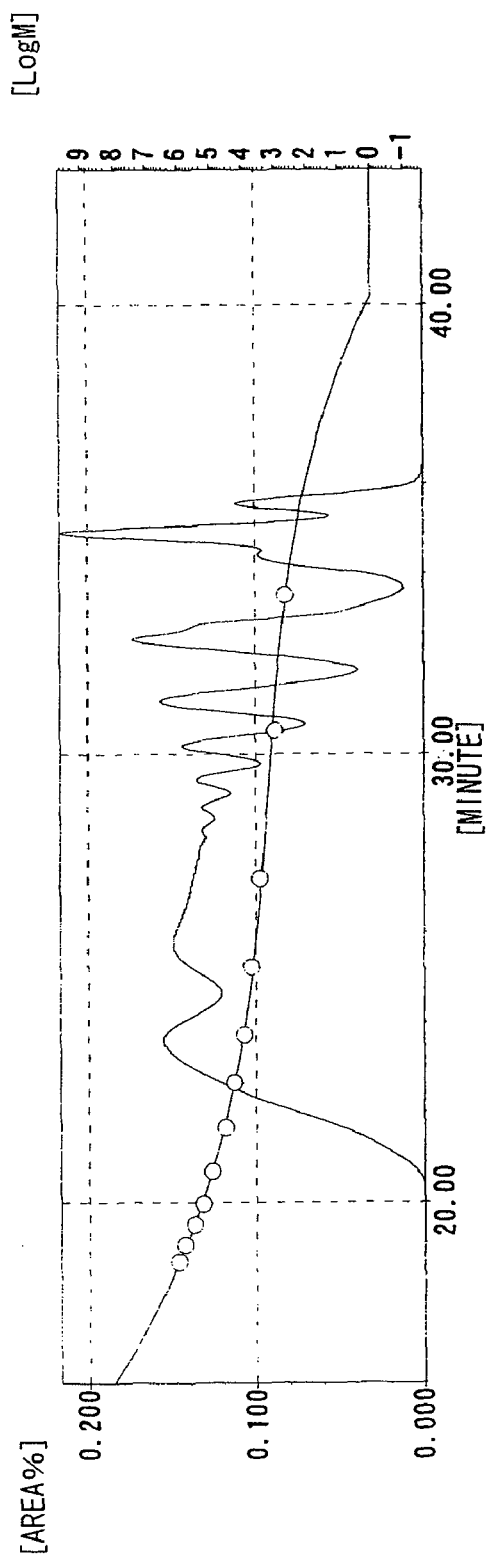
FIG. 35 is a graph showing a GPC chart of an epoxy resin obtained in Example 30.

The resulting epoxy resin had a softening point of 68° C. (B&R method), a melt viscosity (measuring method: ICI viscometer method, measuring temperature: 150° C.) of 5.6 dPa·s and an epoxy equivalent of 355 g/eq. A molar ratio of a structural unit represented by the general formula (3) to a structural unit of represented by the general formula (4) in the compound was determined from the measurement results of the weight of the recovered unreacted phenol and anisole in the production of the phenol resin (A-6), and the measurement results of a hydroxyl group of the resulting phenol resin. As a result, the former/the latter was 53/47. A GPC chart of the resulting phenol resin is shown in FIG. 35.

Example 31

Synthesis of Epoxy Resin (E-6)

In the same manner as in Example 1, the epoxidation reaction was conducted, except that the phenol resin (A-1) was replaced by 240 g of the phenol resin (A-9) obtained in Example 9, to obtain 270 g of an epoxy resin (E-6) having a structural unit represented by the following structural formula.

[Chemical Formula 40]

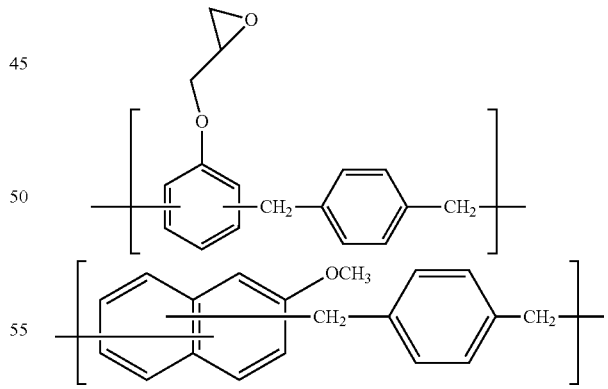

The resulting epoxy resin had a softening point of 60° C. (B&R method), a melt viscosity (measuring method: ICI viscometer method, measuring temperature: 150° C.) of 1.2 dPa·s and an epoxy equivalent of 319 g/eq.

Figure 36:
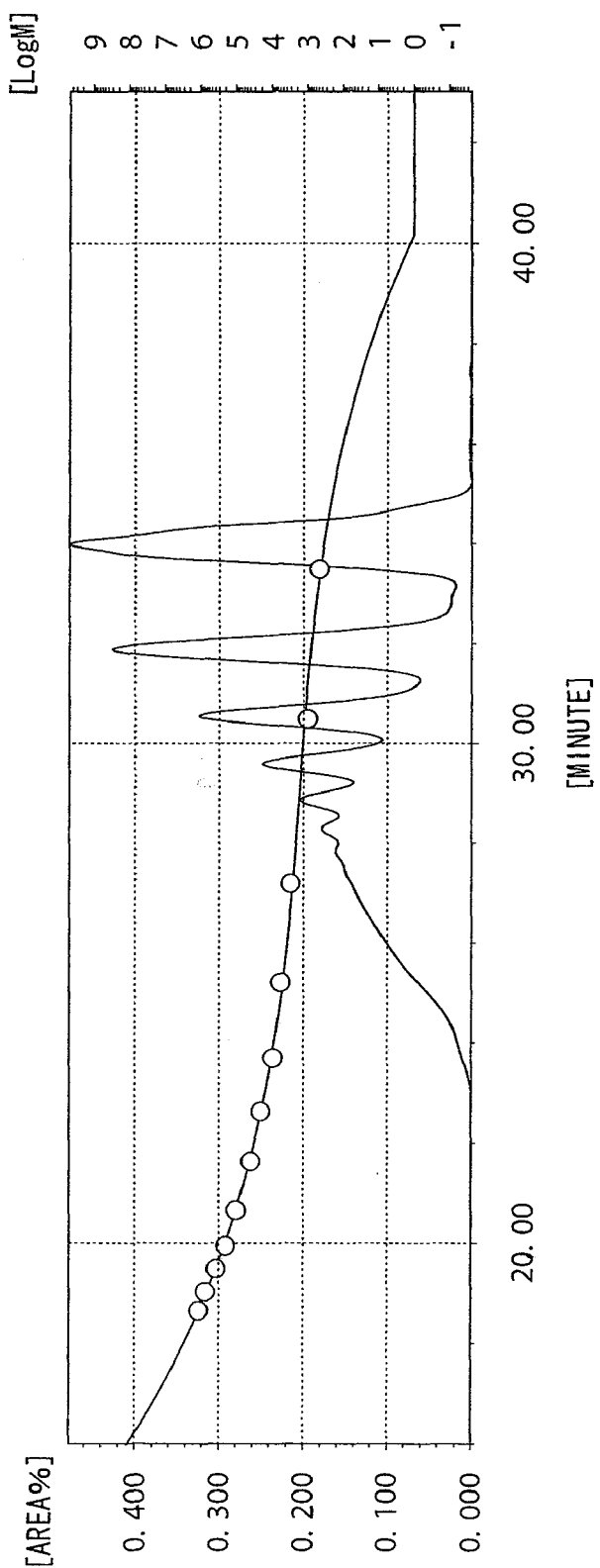
FIG. 36 is a graph showing a GPC chart of an epoxy resin obtained in Example 31.
Figure 37:
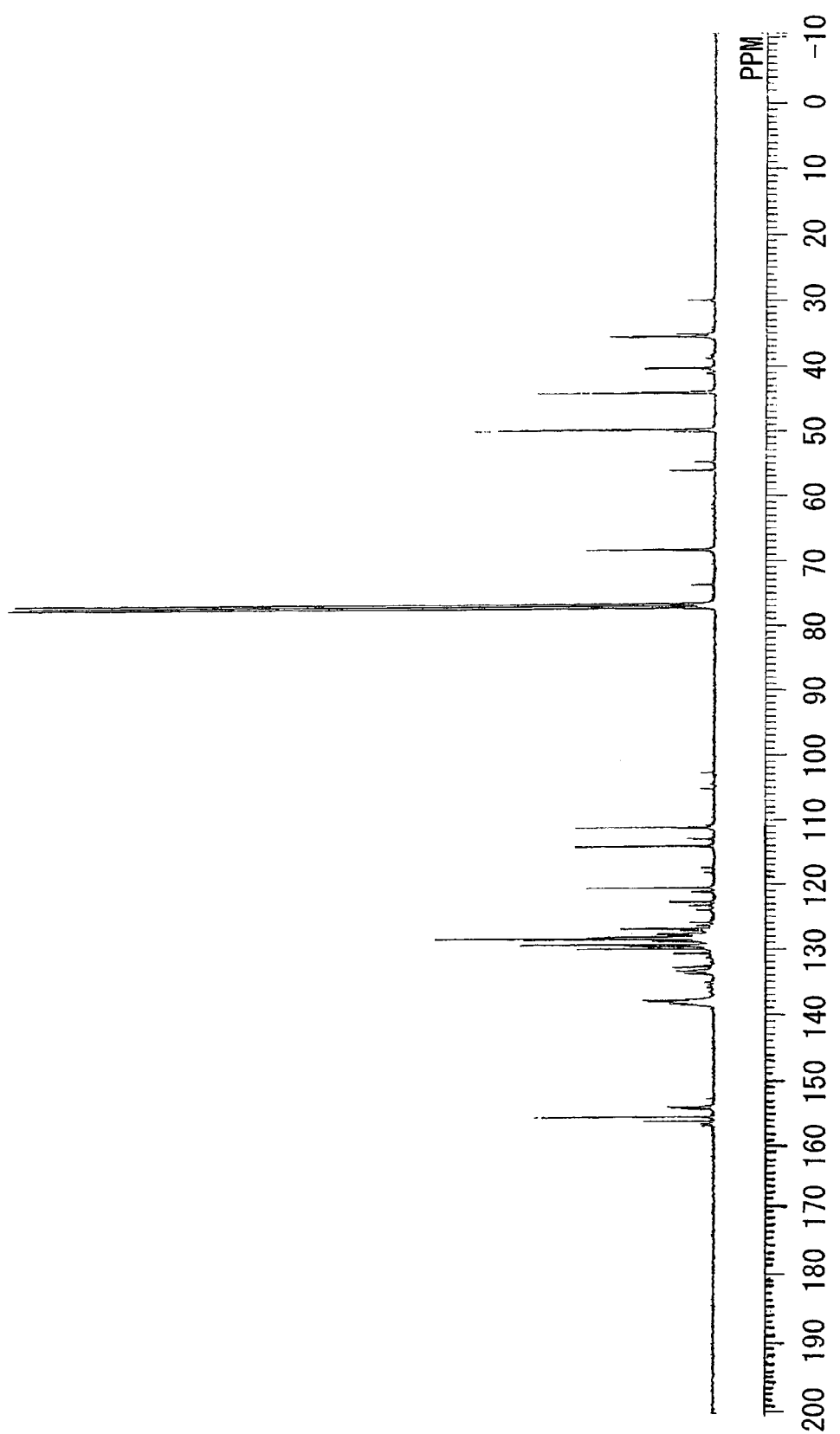
FIG. 37 is a graph showing a $^{13}$C-NMR spectrum of an epoxy resin obtained in Example 31.
Figure 38:
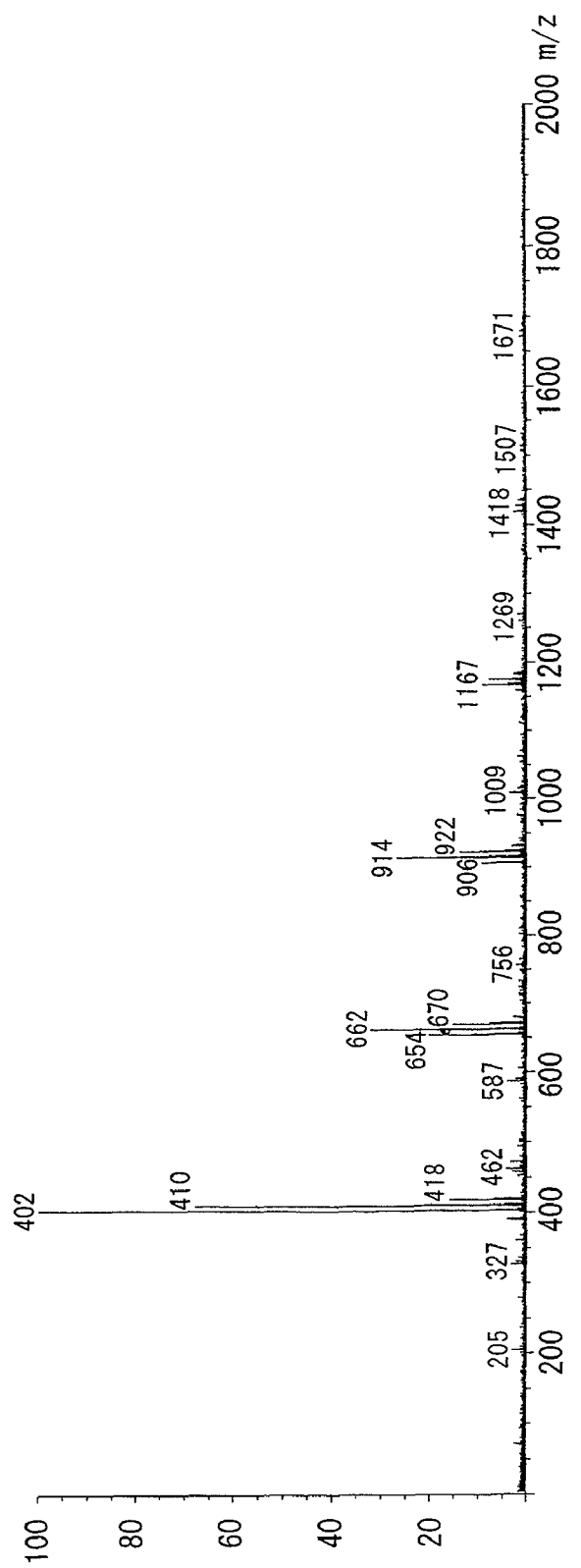
FIG. 38 is a graph showing a mass spectrum of an epoxy resin obtained in Example 31.

A GPC chart of the resulting epoxy resin is shown in FIG. 36, a $C^{13}$ NMR chart is shown in FIG. 37, and a MS spectrum is shown in FIG. 38. A signal assignable to a methoxy group observed at 55 ppm in NMR and a hydroxyl group equivalent revealed that the methoxy group in the compound is not decomposed. A molar ratio of a structural unit of a glycidyloxy group-containing aromatic hydrocarbon group to a structural unit of a methoxy group-containing aromatic hydrocarbon group in the epoxy resin was determined from the measurement results of the weight of the recovered unreacted phenol and anisole in the production of the phenol resin (A-9), and the measurement results of a hydroxyl group of the resulting phenol resin. As a result, the former/the latter was 72/28.

Synthesis Example 7

Synthesis of Epoxy Resin Described in Japanese Unexamined Patent Application, First Publication No. Hei 8-301980

In the same manner as in Example 26, the epoxidation reaction was conducted, except that the phenol resin (A-1) was replaced by the phenol resin (A'-2) obtained in Synthesis Example 2, to obtain an epoxy resin (E'-1) having a structural unit represented by the following structural formula.

The resulting epoxy resin had a softening point of 79° C. (B&R method) and an epoxy equivalent of 421 g/eq.

Example 32 to 44 and Comparative Examples 4 to 5

The above epoxy resins (E-1) to (E-5) as epoxy resins, the epoxy resin (B-2) obtained in Synthesis Example 5 as an epoxy resin to be used in combination, the epoxy resins (E'-1) and (E'-2) as comparative epoxy resins, the phenol resin (A-1) obtained in Example 1, the phenol resin (A-2) obtained in Example 2, the phenol resin (A-4) obtained in Example 4 and XLC-LL manufactured by Mitsui Chemicals, Inc. (Xylok resin, hydroxyl group equivalent: 176 g/eq) as curing agents, triphenylphosphine (TPP) as a curing accelerator, condensed phosphoric acid ester (PX-200 manufactured by Daihachi Chemical Industry Co., Ltd.) and magnesium hydroxide (ECOMAG Z-10 manufactured by Air Water Inc.) as flame retardants, spherical silica (S-COL manufactured by Micron Co., Ltd.) as an inorganic filler, γ-glycidoxytriethoxysilane (KBM-403 manufactured by Shin-Etsu Chemical Co., Ltd.)

[Chemical Formula 41]

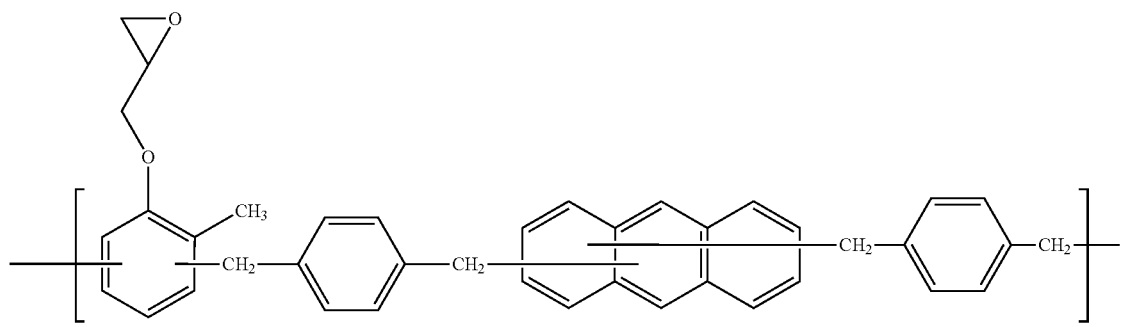

The resulting epoxy resin had a softening point of 61° C. (B&R method) and an epoxy equivalent of 324 g/eq.

Synthesis Example 8

Synthesis of Epoxy Resin Described in Japanese Unexamined Patent Application, First Publication No. Hei 8-301980

In the same manner as in Example 26, the epoxidation reaction was conducted, except that the phenol resin (A-1) was replaced by the phenol resin (A'-3) obtained in Synthesis Example 2, to obtain an epoxy resin (E'-2) having a structural unit represented by the following structural formula.

as a silane coupling agent, carnauba wax (PEARL WAX No. 1-P manufactured by Cerarica Noda Co. Ltd.) and carbon black were mixed according to the formulations shown in Tables 4 to 6 and then melt-kneaded at a temperature of 85° C. for 5 minutes using a twin roll to obtain epoxy compositions of the present invention and curability was evaluated. Physical properties of a cured article were evaluated as follows. That is, samples for evaluation were made from the above compositions by the following procedures, and then heat resistance, flame retardancy and dielectric characteristics were measured by the following procedures.
<Heat Resistance>
Glass transition temperature: The glass transition temperature was measured by using a viscoelasticity measuring appa-

[Chemical Formula 42]

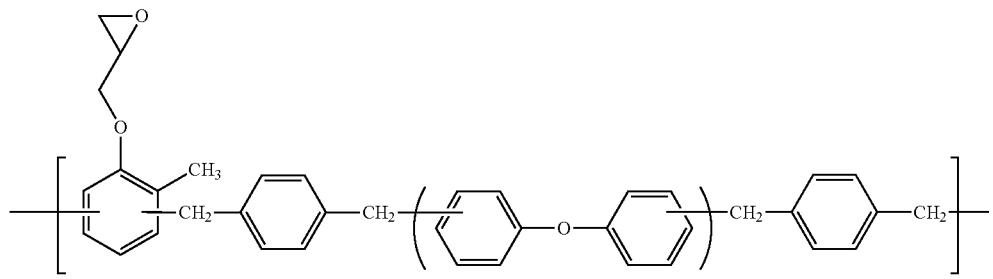

ratus (solid viscoelasticity measuring apparatus RSAII manufactured by Rheometric Co., double cantilever method: frequency of 1 Hz, heating rate: 3° C./min)

<Curability>

0.15 g of an epoxy resin composition was placed on a cure plate (manufactured by THERMO ELECTRIC Co.) heated to 175° C. and clocking starts using a stop watch. A sample was uniformly stirred by a tip of a bar and the stop watch was stopped when the sample is separated into threads and left on the plate. The time required for the sample to be separated into threads and left on the plate was defined as a gel time.

<Flame Retardancy>

A sample for evaluation having a width of 12.7 mm, a length of 127 mm and a thickness of 1.6 mm was made by molding at a temperature of 175° C. for 90 seconds using a transfer molding machine and post-curing at a temperature of 175° C. for 5 hours. The resulting five samples having a thickness of 1.6 mm were subjected to a combustion test in accordance with UL-94.

<Measurement of Dielectric Characteristics>

A sample for evaluation having a width of 25 mm, a length of 75 mm and a thickness of 2.0 mm was made by molding at a temperature of 175° C. for 90 seconds using a transfer molding machine and post-curing at a temperature of 175° C. for 5 hours. The resulting sample was subjected to a bone dry treatment and stored in a room at 23° C. and a humidity of 50% for 24 hours. Then, a dielectric constant and a dielectric dissipation factor at a frequency of 100 MHz of the resulting cured article were measured by the method defined in JIS-C-6481 using Impedance Material Analyzer "HP4291B" manufactured by Agilent Technology Co., Ltd.

TABLE 4

Formulation table of epoxy resin composition (parts by mass) and evaluation results

| Examples | | 32 | 33 | 34 | 35 | 36 | 37 | 38 | 39 |
|---|---|---|---|---|---|---|---|---|---|
| Epoxy resins | E-1 | 85 | 81 | | | | | | |
| | E-2 | | | 87 | 81 | | | | |
| | E-3 | | | | | 84 | 72 | | |
| | E-4 | | | | | | | 91 | |
| | E-5 | | | | | | | | 86 |
| | B-2 | | | | | | | | |
| Curing agents | A-1 | | | | | | | | |
| | A-2 | | | | | | 62 | | |
| | A-4 | | | | 73 | | | | |
| | A'-1 | | 53 | | | | | | 48 |
| | XLC-LL | 49 | | 47 | | 50 | | 43 | |
| Condensed phosphoric acid ester | | | | | | | | | |
| Magnesium hydroxide | | | | | | | | | |
| TPP | | 3 | 3 | 3 | 3 | 3 | 3 | 3 | 3 |
| Fused silica | | 850 | 850 | 850 | 830 | 850 | 850 | 850 | 850 |
| Curability | | 20 | 30 | 22 | 29 | 26 | 33 | 23 | 29 |
| Heat resistance | | 125 | 115 | 105 | 158 | 130 | 100 | 148 | 101 |
| Coupling agent | | 5 | 5 | 5 | 5 | 5 | 5 | 5 | 5 |
| Carnauba wax | | 5 | 5 | 5 | 5 | 5 | 5 | 5 | 5 |
| Carbon black | | 3 | 3 | 3 | 3 | 3 | 3 | 3 | 3 |
| Combustion test class | | V-0 | V-0 | V-0 | V-0 | V-0 | V-0 | V-0 | V-0 |
| 1* | | 4 | 4 | 3 | 3 | 5 | 2 | 3 | 4 |
| 2* | | 21 | 17 | 18 | 14 | 23 | 12 | 15 | 20 |
| Dielectric constant | | 2.83 | 2.82 | 2.85 | 2.75 | 2.87 | 2.80 | 2.83 | 2.78 |
| Dielectric dissipation factor ($\times 10^{-4}$) | | 86 | 78 | 77 | 75 | 86 | 72 | 76 | 74 |

TABLE 5

Formulation table of epoxy resin composition (parts by mass) and evaluation results

| Examples | | 40 | 41 | 42 | 43 | 44 |
|---|---|---|---|---|---|---|
| Epoxy resins | E-1 | | 78 | | | |
| | E-2 | 87 | | | | |
| | E-3 | | | 41 | | |
| | E-6 | | | | 86 | 76 |
| | B-2 | | | 41 | | |
| Curing agents | A-9 | | | | | 58 |
| | XLC-LL | 47 | 46 | 50 | 48 | |
| Condensed phosphoric acid ester | | | 30 | | | |
| Magnesium hydroxide | | 30 | | | | |
| TPP | | 3 | 3 | 3 | | |
| Fused silica | | 820 | 830 | 850 | | |
| Coupling agent | | 5 | 5 | 5 | | |
| Carnauba wax | | 5 | 5 | 5 | | |
| Carbon black | | 3 | 3 | 3 | | |
| Curability | | 20 | 30 | 31 | 20 | 130 |
| Heat resistance | | 105 | 115 | 145 | 30 | 114 |
| Combustion test class | | V-0 | V-0 | V-0 | V-0 | V-0 |
| 1* | | 4 | 2 | 4 | 3 | 2 |
| 2* | | 17 | 11 | 18 | 16 | 7 |

TABLE 5-continued

Formulation table of epoxy resin composition (parts by mass) and evaluation results

| Examples | 40 | 41 | 42 | 43 | 44 |
|---|---|---|---|---|---|
| Dielectric constant | 2.85 | 2.97 | 3.16 | 2.81 | 2.77 |
| Dielectric dissipation factor ($\times 10^{-4}$) | 81 | 99 | 107 | 79 | 65 |

TABLE 6

Formulation table of epoxy resin composition (parts by mass) and evaluation results

| | Comparative Examples | 4 | 5 |
|---|---|---|---|
| Epoxy resins | E'-1 | 87 | |
| | E'-2 | | 94 |
| | E'-3 | | |
| | E'-4 | | |
| Curing agents | A'-1 | | |
| | XLC-LL | 47 | 40 |
| TPP | | 3 | 3 |
| Fused silica | | 850 | 850 |
| Coupling agent | | 5 | 5 |
| Carnauba wax | | 5 | 5 |
| Carbon black | | 3 | 3 |
| Curability | | 30 | 50 |
| Heat resistance | | 125 | 120 |
| Combustion test class | | V-1 | V-1 |
| 1* | | 16 | 18 |
| 2* | | 88 | 107 |
| Dielectric constant | | 3.07 | 3.05 |
| Dielectric dissipation factor ($\times 10^{-4}$) | | 106 | 103 |

Note of Tables 1 and 2:
*1: maximum combustion time in one flame contact (second)
*2: total combustion time (second) of 5 samples

INDUSTRIAL APPLICABILITY

The present invention is applicable to an epoxy resin composition which is excellent in heat resistance and dielectric characteristics of the resulting cured article as well as curability during the curing reaction and also can be preferably used for semiconductor sealing materials, printed circuit boards, coating materials and castings, and to a cured article thereof, a phenol resin and a method for producing the same, and an epoxy resin and a method for producing the same.

The invention claimed is:

1. An epoxy resin composition comprising an epoxy resin and a curing agent as essential components,
wherein the epoxy resin has each structure of a glycidyloxy group-containing aromatic hydrocarbon group (E), an alkoxy group-containing aromatic hydrocarbon group (B) and a divalent aralkyl group (X), and also has, in a molecular structure, a structure in which the glycidyloxy group-containing aromatic hydrocarbon group (E) and the alkoxy group-containing aromatic hydrocarbon group (B) are bonded to another glycidyloxy group-containing aromatic hydrocarbon group (E) or alkoxy group-containing aromatic hydrocarbon group (B) via the divalent aralkyl group (X),
wherein the alkoxy group-containing aromatic hydrocarbon group (B) is a divalent or trivalent aromatic hydrocarbon group formed from a molecular structure selected from methoxybenzene, methoxynaphthalene, ethoxybenzene, ethoxynaphthalene, and a compound having a methyl group as a substituent on the aromatic nucleus of them,
wherein the divalent aralkyl group (X) is a divalent hydrocarbon group having a structure represented by the following structural formula (1):

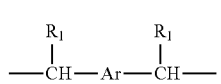

(1)

wherein $R_1$ represents a hydrogen atom or a methyl group, and Ar represents a phenylene group, a biphenylene group or a diphenyl ether-4,4'-diyl group, and
wherein the glycidyloxy group-containing aromatic hydrocarbon group (E) is a divalent or trivalent aromatic hydrocarbon group formed from a molecular structure selected from glycidyloxybenzene, glycidyloxynaphthalene, and a compound having a methyl group as a substituent on the aromatic nucleus of them.

2. The epoxy resin composition according to claim 1, wherein an abundance ratio of the glycidyloxy group-containing aromatic hydrocarbon group (E) to the alkoxy group-containing aromatic hydrocarbon group (B), the former/the latter is within a range from 30/70 to 98/2.

3. The epoxy resin composition according to claim 1, wherein the epoxy resin has an epoxy equivalent of 200 to 700 g/eq.

4. The epoxy resin composition according to claim 1, wherein the curing agent comprises a phenol resin which has each structural moiety of a phenolic hydroxyl group-containing aromatic hydrocarbon group (P), an alkoxy group-containing aromatic hydrocarbon group (B) and a divalent aralkyl group (X), and also has, in a molecular structure, a structure in which the phenolic hydroxyl group-containing aromatic hydrocarbon group (P) and the alkoxy group-containing aromatic hydrocarbon group (B) are bonded to another phenolic hydroxyl group-containing aromatic hydrocarbon group (P) or alkoxy group-containing aromatic hydrocarbon group (B) via the divalent aralkyl group (X).

5. A semiconductor sealing material comprising the epoxy resin composition according to claim 1, the epoxy resin composition further comprising 70 to 95% by mass of an inorganic filler, in addition to the epoxy resin and the curing agent.

6. An epoxy resin cured article obtained by a curing reaction of the epoxy resin composition according to claim 1.

* * * * *